(12) United States Patent
Cable

(10) Patent No.: US 11,984,933 B2
(45) Date of Patent: May 14, 2024

(54) SYSTEMS AND METHODS FOR PHOTONIC MULTIPLEXING

(71) Applicant: Psiquantum, Corp., Palo Alto, CA (US)

(72) Inventor: Hugo Cable, San Mateo, CA (US)

(73) Assignee: Psiquantum, Corp., Palo Alto, CA (US)

( * ) Notice: Subject to any disclaimer, the term of this patent is extended or adjusted under 35 U.S.C. 154(b) by 521 days.

(21) Appl. No.: 17/227,179

(22) Filed: Apr. 9, 2021

(65) Prior Publication Data

US 2021/0325924 A1 Oct. 21, 2021

Related U.S. Application Data

(60) Provisional application No. 63/007,726, filed on Apr. 9, 2020, provisional application No. 63/007,858, filed on Apr. 9, 2020.

(51) Int. Cl.
*H04B 10/70* (2013.01)
*G02B 6/12* (2006.01)
*G02F 3/00* (2006.01)
*G06E 1/00* (2006.01)

(52) U.S. Cl.
CPC ......... *H04B 10/70* (2013.01); *G02B 6/12016* (2013.01); *G02F 3/00* (2013.01); *G02B 2006/12152* (2013.01); *G02B 2006/12159* (2013.01); *G02B 2006/12164* (2013.01); *G06E 1/00* (2013.01)

(58) Field of Classification Search
None
See application file for complete search history.

(56) References Cited

U.S. PATENT DOCUMENTS

| | | | |
|---|---|---|---|
| 7,346,166 B2 | 3/2008 | Inoue et al. |
| 7,373,059 B2 | 5/2008 | Spillane et al. |
| 8,983,303 B2 | 3/2015 | Meyers et al. |
| 9,030,731 B2 | 5/2015 | Arahira |
| 9,151,851 B2 | 10/2015 | Fries et al. |
| 9,800,399 B2 | 10/2017 | Tanzilli et al. |
| 10,158,481 B2 | 12/2018 | Bunandar et al. |
| 10,551,719 B2 | 2/2020 | Kim et al. |
| 10,677,965 B2 | 6/2020 | Chen et al. |

(Continued)

FOREIGN PATENT DOCUMENTS

| | | |
|---|---|---|
| CN | 103959704 A | 7/2014 |
| CN | 103959704 B | 12/2016 |

(Continued)

OTHER PUBLICATIONS

Azuma, et al., "All-Photonic Quantum Repeaters", Nature Communications, vol. 6, No. 6787, Apr. 15, 2015, pp. 1-7.

(Continued)

*Primary Examiner* — Robert E. Tallman
(74) *Attorney, Agent, or Firm* — Kilpatrick Townsend & Stockton LLP

(57) ABSTRACT

Optical circuits support reconfigurable spatial rearrangement (also referred to as "spatial multiplexing") for a group of photons propagating in waveguides. According to some embodiments, a set of 2×2 muxes can be used to rearrange a pattern of photons on a first set of waveguides into a usable input pattern for a downstream optical circuit.

17 Claims, 31 Drawing Sheets

(56) References Cited

U.S. PATENT DOCUMENTS

| | | | |
|---|---|---|---|
| 2005/0094818 | A1 | 5/2005 | Inoue et al. |
| 2008/0075410 | A1 | 3/2008 | Spillane et al. |
| 2013/0108215 | A1 | 5/2013 | Ticknor et al. |
| 2013/0258453 | A1 | 10/2013 | Arahira |
| 2013/0308956 | A1 | 11/2013 | Meyers et al. |
| 2014/0126030 | A1 | 5/2014 | Crespi et al. |
| 2014/0355998 | A1* | 12/2014 | Tanzilli ................. H04L 7/0075 398/154 |
| 2015/0055961 | A1 | 2/2015 | Meyers et al. |
| 2016/0245639 | A1* | 8/2016 | Mower .................. B82Y 20/00 |
| 2016/0352515 | A1 | 12/2016 | Bunandar et al. |
| 2018/0114138 | A1 | 4/2018 | Monroe et al. |
| 2019/0196100 | A1 | 6/2019 | Nickerson et al. |
| 2021/0141609 | A1 | 5/2021 | Huang et al. |
| 2023/0380302 | A1* | 11/2023 | Yohannes ............... H01L 24/05 |

FOREIGN PATENT DOCUMENTS

| | | | |
|---|---|---|---|
| CN | 108650088 | A | 10/2018 |
| EP | 2761803 | B1 | 7/2015 |
| FR | 2980933 | A1 | 4/2013 |
| GB | 1525492 | A | 9/1978 |
| JP | 2004187268 | A | 7/2004 |
| JP | 4173422 | B2 | 10/2008 |
| JP | 2013205711 | A | 10/2013 |
| JP | 2014534455 | A | 12/2014 |
| JP | 5867232 | B2 | 2/2016 |
| JP | 5963869 | B2 | 8/2016 |
| WO | 2013045674 | A1 | 4/2013 |
| WO | 2016191679 | A1 | 12/2016 |
| WO | 2019006039 | A1 | 1/2019 |

OTHER PUBLICATIONS

Bartolucci, et al., "Switch Networks for Photonic Fusion-Based Quantum Computing", Available Online At: https://arxiv.org/pdf/2109.13760.pdf, Sep. 28, 2021, pp. 1-31.

Bonneau, et al., "Effect of Loss on Multiplexed Single-Photon Sources", New Journal of Physics, vol. 17, No. 4, Apr. 29, 2015, pp. 1-18.

Bovina, "Intrasystem Entanglement Generator and Unambiguos Bell States Discriminator on Chip", International Conference on Acoustics, Speech and Signal Processing (ICASSP), May 2019, pp. 7993-7997.

Earnshaw, et al., "8 X 8 Optical Switch Matrix using Generalized Mach-Zehnder Interferometers", IEEE Photonics Technology Letters, vol. 15, Issue 6, Jun. 2003, pp. 810-812.

Gimeno-Segovia, et al., "From Three-Photon GHZ States to Universal Ballistic Quantum Computation", Physical Review Letters, vol. 115, Feb. 26, 2015, pp. 1-9.

Gimeno-Segovia, et al., "Relative Multiplexing for Minimising Switching in Linear-Optical Quantum Computing", New Journal of Physics, vol. 19, Available Online at: https://iopscience.iop.org/article/10.1088/1367-2630/aa7095, Jun. 6, 2017, pp. 1-13.

Hunter, "Planar Optical Space Switch Architectures", In Optical Switching, Edited by T.S. El-Bawab (Springer US, Boston, MA), Jan. 2006, pp. 275-305.

Imany, et al., "High-Dimensional Optical Quantum Logic in Large Operational Spaces", NPJ, Quantum Information, Available Online At: https://doi.org/10.1038/s41534-019-0173-8, Jul. 11, 2019, pp. 1-10.

Kong, et al., "Manipulation of Eight-Dimensional Bell-Like States", Science Advances, vol. 5, Issue 6; eaat9206, Jun. 14, 2019, pp. 1-7.

Lagali, "The Generalized Mach-Zehnder Interferometer Using Multimode Interference Couplers for Optical Communications Networks", Ph.D. Thesis, University of Alberta, 2000, 155 pages.

Meyer-Scott, et al., "Single-Photon Sources: Approaching the Ideal through Multiplexing", Review of Scientific Instruments, vol. 91, No. 4, Apr. 1, 2020, pp. 1-36.

Miller, "Arbitrary And Reconfigurable Optics—New Opportunities For Integrated Photonics", Frontiers in Optics, 2017, 1 page.

Miller, "Reconfigurable Add-Drop Multiplexer for Spatial Modes", Optics Express, vol. 21, No. 17, Aug. 26, 2013, pp. 20220-20229.

Miller, "Self-Configuring Universal Linear Optical Component", Photonics Research, vol. 1, No. 1, Jun. 2013, pp. 1-15.

Pai, et al., "Matrix Optimization on Universal Unitary Photonic Devices", Photonic Computing Available Online At : arXiv: 1808.00458v3 [eess.SP], May 22, 2019, pp. 1-18.

Tan, et al., "The Resurgence of the Linear Optics Quantum Interferometer Recent Advances & Applications", Reviews in Physics, vol. 4, Mar. 2019, pp. 1-18.

Varnava, et al., "How Good Must Single Photon Sources and Detectors Be for Efficient Linear Optical Quantum Computation?", Physical Review Letters, vol. 100, No. 6, Feb. 15, 2008, pp. 060502-1-060502-4.

Wang, et al., "Quantum Photonic Interconnect", Available Online At: https://arxiv.org/pdf/1508.03214.pdf, Sep. 26, 2015, pp. 1-12.

Zhang, et al., "Demonstration of a Scheme for the Generation of "Event-Ready" Entangled Photon Pairs from a Single-Photon Source", Physical Review, A, vol. 77, No. 6, Jun. 2008, pp. 062316-1-062316-4.

U.S. Appl. No. 17/227,192, "Notice of Allowance", dated Dec. 16, 2022, 9 pages.

* cited by examiner

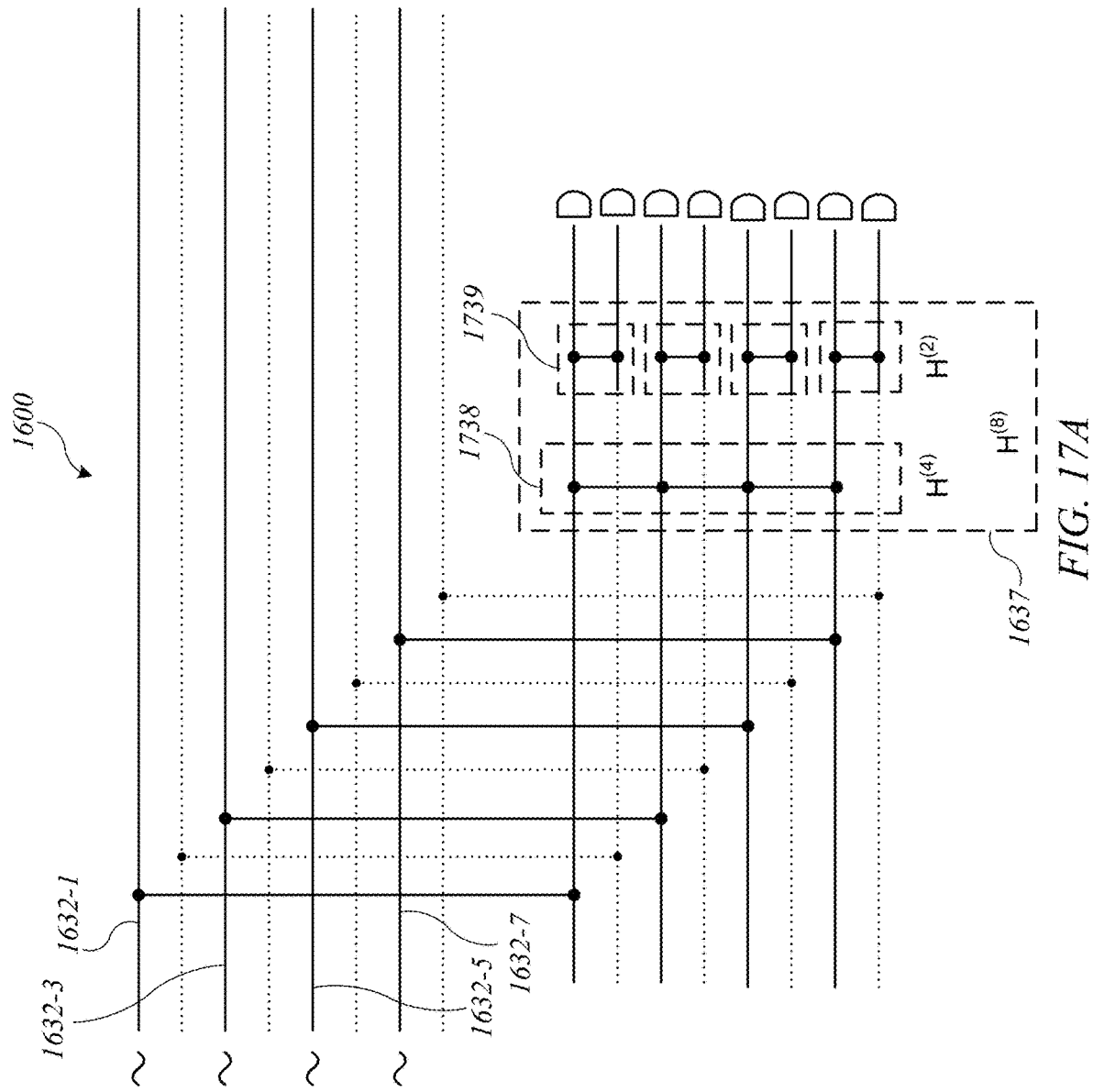

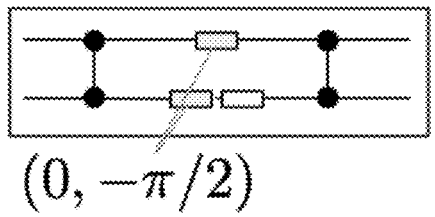
*FIG. 22A*
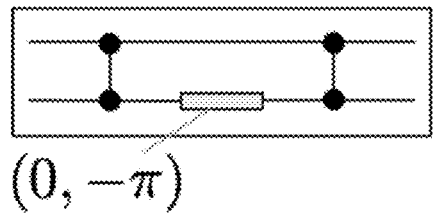
*FIG. 22B*
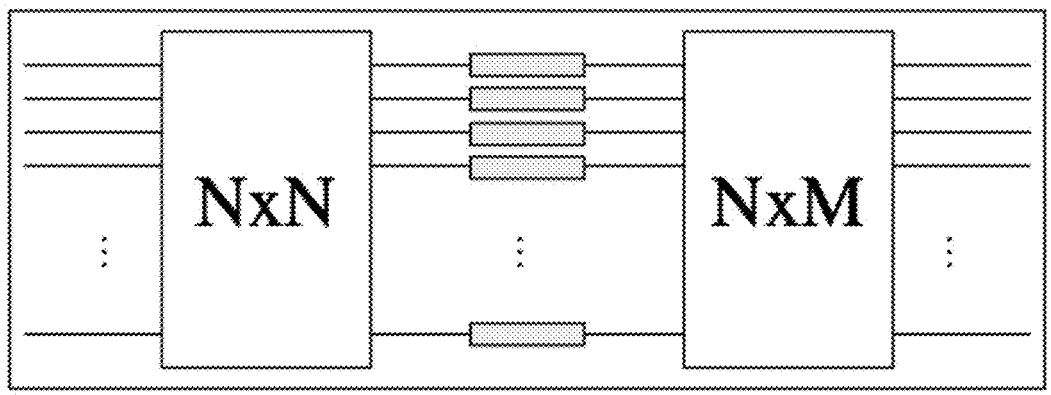
Circuit notation
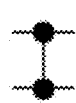 2-mode beamsplitter/directional coupler
(transfer matrix is 2x2 Hadamard matrix)
*FIG. 22C*

$$\begin{aligned} W &= \left(S_{N/n_1,n_1} I^{(N/n_1)} \otimes W^{(n_1)}\right)\left(I^{(n_1)} \otimes W^{(n_2)} \otimes I^{(N/(n_1 n_2))}\right) \cdots \left(I^{(N/n_r)} \otimes W^{(n_r)}\right) \\ &= \left(W^{(n_1)} \otimes I^{(N/n_1)}\right)\left(I^{(n_1)} \otimes S^{t}_{N/n_1,n_1}\right)\left(I^{(n_1)} \otimes W^{(n_2)} \otimes I^{(N/(n_1 n_2))}\right)\left(I^{(n_1 n_2)} \otimes S^{t}_{N/(n_1 n_2),n_2} I^{(N/n_2)} \otimes W^{(n_2)}\right) \cdots \\ &\quad \left(I^{(N/n_r)} \otimes W^{(n_r)}\right) \end{aligned}$$

*FIG. 27*

(i) N=16 Hadamard-type GMZI construction (ii) Simplified GMZI for use as a 16-to-1 mux Circuit notation $N=2^n$ N-mode Hadamard interferometer
(transfer matrix is NxN Hadamard matrix)

SYSTEMS AND METHODS FOR PHOTONIC MULTIPLEXING

CROSS-REFERENCES TO RELATED APPLICATIONS

This application claims the benefit of U.S. Application No. 63/007,726, filed Apr. 9, 2020, and of U.S. Application No. 63/007,858, filed Apr. 9, 2020, the disclosures of which are incorporated herein by reference.

BACKGROUND

In photonic circuits and systems, photons may be generated at different times and propagated through different waveguides. For various operations, it may be desirable to rearrange photons spatially onto different waveguides and/or to synchronize photons propagating on different waveguides so that they arrive at a particular location within the circuit with a particular timing (e.g., multiple photons arriving at a particular location within a single time bin).

SUMMARY

Disclosed herein are examples (also referred to as "embodiments") of circuits and methods that implement reconfigurable spatial rearrangement (also referred to as "spatial multiplexing") for a group of photons propagating in waveguides. According to some embodiments, a set of 2×2 muxes can be used to rearrange a pattern of photons on a first set of waveguides into a usable input pattern for a downstream optical circuit.

According to some embodiments, an optical circuit can include an entanglement circuit, a set of 2×2 muxes, and control logic. The entanglement circuit can be configured to generate an entangled state on a set of output waveguides from an input state received on a set of input waveguides, wherein an input state corresponds to a pattern of photons in the input waveguides, wherein a set of usable input states for the entanglement circuit is defined such that each usable state corresponds to an input state that is usable to generate the entangled state, and wherein the set of usable input states for the entanglement circuit includes fewer than all possible input states. Each 2×2 mux in the set can have two inputs and two outputs, each input of each 2×2 mux in the set being coupled to a different one of a plurality of upstream circuits, and each output of each 2×2 mux in the set being coupled to a different one of the input waveguides of the entanglement circuit. The control logic can be configured to control the 2×2 muxes in the set to provide a usable input state based on a pattern of photons provided to the inputs of the 2×2 muxes in the set and on the set of usable input states for the entanglement circuit. In some embodiments, multiple sets (or layers) of 2×2 muxes can be used at different stages of generating an entangled state, to selectably route photons to different inputs of an entanglement circuit and/or to inputs of different parallel instances of an entanglement circuit. Examples of entanglement circuits include Bell state generators, 3-GHZ generators and other circuits that can produce entangled multiphoton states.

Also disclosed herein are examples of circuits and methods that implement an expanded photonic Bell state generator. An expanded photonic Bell state generator includes more than four output modes and a correspondingly larger number of input modes and directional couplers. Some expanded Bell state generators can receive inputs on any four of a set of 2m input modes. Subsets of the m output modes can be multiplexed to reduce the number of modes to four. According to some embodiments, a set of 2×2 muxes can be used to rearrange the output modes prior to reducing the number of modes.

The following detailed description, together with the accompanying drawings, will provide a better understanding of the nature and advantages of the claimed invention.

BRIEF DESCRIPTION OF THE DRAWINGS

FIGS. 17A and 17B show examples of operation of the expanded Bell state generator of FIG. 16 according to some embodiments.

FIGS. 22A and 22B show building blocks of composite switch networks that can be used in some embodiments.

FIG. 22C shows a N-to-M GMZI that can be used in some embodiments.

FIG. 27 shows an equation for a type of specific decomposition of GMZI networks that can be used in some embodiments.

DETAILED DESCRIPTION

Figure 1:
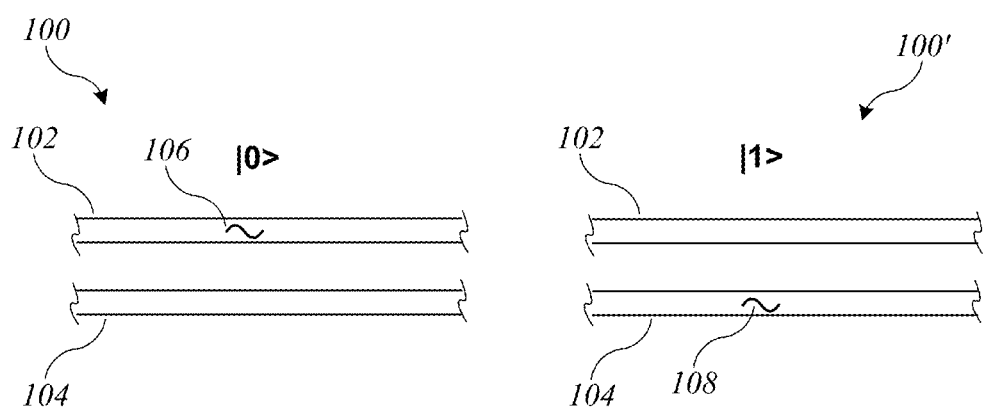
FIG. 1 shows two representations of a portion of a pair of waveguides corresponding to a dual-rail-encoded photonic qubit.

Disclosed herein are examples (also referred to as "embodiments") of circuits and methods that implement reconfigurable spatial rearrangement (also referred to as "spatial multiplexing") for a group of photons propagating in waveguides. According to some embodiments, a set of 2×2 muxes can be used to rearrange a pattern of photons on a first set of waveguides into a usable input pattern for a downstream optical circuit.

Circuits and methods of the kind described herein can be used in a variety of applications where temporal and/or spatial multiplexing are desired. To facilitate understanding of the disclosure, an overview of relevant concepts and terminology is provided in Section 1. Section 2 introduces spatial multiplexing techniques for photons in waveguides. Sections 3 and 4 describe examples of circuits that implement a set of 2×2 muxes to increase the probability of providing a usable input state to a downstream circuit. Although embodiments are described with specific detail to facilitate understanding, those skilled in the art with access to this disclosure will appreciate that the claimed invention can be practiced without these details.

1. OVERVIEW OF QUANTUM COMPUTING

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

For the case of photons propagating in a waveguide, it is convenient to express the state of the photon as one of a set of discrete spatio-temporal modes. For example, the spatial mode k of the photon is determined according to which one of a finite set of discrete waveguides the photon is propagating in, and the temporal mode $t_j$ is determined by which one of a set of discrete time periods (referred to herein as "bins") the photon is present in. In some photonic implementations, the degree of temporal discretization can be provided by a pulsed laser which is responsible for generating the photons. As used herein, terms such as "simultaneous" or "concurrent" refer to events occurring within the same time bin, and terms such as "synchronous" (or "synchronized") refer to events separated by a predictable, constant number of time bins, which can but need not be zero. The term "path" is used herein to refer to a set of one or more waveguides representing spatial modes, and depending on how the photons are being used, a path may include one or more waveguides. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multimode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1_3\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of molecules, atoms, ions, nuclei, or photons. Other examples include other engineered quantum systems such as flux qubits, phase qubits, or charge qubits (e.g., formed from a superconducting Josephson junction); topological qubits (e.g., Majorana fermions); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \qquad (1)$$

$$|1\rangle_L = |01\rangle_{1,2} \qquad (2)$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.2. Entangled States

Many of the advantages of quantum computing relative to "classical" computing (e.g., conventional digital computers using binary logic) stem from the ability to create entangled states of multi-qubit systems. In mathematical terms, a state $|\psi\rangle$ of n quantum objects is a separable state if $|\psi\rangle = |\psi_1\rangle \otimes \ldots \otimes |\psi_n\rangle$, and an entangled state is a state that is not separable. One example is a Bell state, which, loosely speaking, is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L|0\rangle_L + |1\rangle_L|1\rangle_L}{\sqrt{2}} = \frac{|10\rangle|10\rangle + |01\rangle|01\rangle}{\sqrt{2}} \qquad (3)$$

$$|\Phi^-\rangle = \frac{|0\rangle_L|0\rangle_L - |1\rangle_L|1\rangle_L}{\sqrt{2}} = \frac{|10\rangle|10\rangle - |01\rangle|01\rangle}{\sqrt{2}} \qquad (4)$$

$$|\Psi^+\rangle = \frac{|0\rangle_L|1\rangle_L + |1\rangle_L|0\rangle_L}{\sqrt{2}} = \frac{|10\rangle|01\rangle + |01\rangle|10\rangle}{\sqrt{2}} \qquad (5)$$

$$|\Psi^-\rangle = \frac{|0\rangle_L|1\rangle_L - |1\rangle_L|0\rangle_L}{\sqrt{2}} = \frac{|10\rangle|01\rangle - |01\rangle|10\rangle}{\sqrt{2}} \qquad (6)$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \qquad (7)$$

where the kets above refer to the logical basis. For example, for qubits encoded by single photons in pairs of modes (a dual-rail encoding), a 3-GHZ state can be written:

$$|GHZ\rangle = \qquad (8)$$
$$\frac{|0\rangle_L|0\rangle_L|0\rangle_L - |1\rangle_L|1\rangle_L|1\rangle_L}{\sqrt{2}} = \frac{|10\rangle|10\rangle|10\rangle + |01\rangle|01\rangle|01\rangle}{\sqrt{2}}$$

where the kets above refer to photon occupation number in six respective modes (with mode subscripts omitted).

1.3. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104, and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel. In the context of optical circuits operating on qubits, a "path" may refer to a set of (one or more) waveguides that provides a set of spatial modes for one qubit. In a dual-rail encoding, a path includes a pair of waveguides. Since each waveguide in a dual-rail encoding corresponds to a (spatial) mode, the term "mode" is sometimes used interchangeably with "waveguide" in descriptions of circuits for dual-rail encoded qubits. Other encodings may use a different number of waveguides. For instance, a polarization encoding may use a single waveguide for each path.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SFWM and SPDC, such as optomechanical systems and the like. For purposes of the present disclosure, the precise type of photon source used is not critical and any type of heralded single photon source, employing any process, such as SPFW, SPDC, or any other process, can be used.

In such cases, operation of the photon source may be non-deterministic (also sometimes referred to as "stochastic") such that a given pump pulse may or may not produce a photon pair. In some embodiments, when a heralded single photon source generates a pair of photons, one photon of the pair can be propagated into a "signaling" (or "propagation") waveguide of an optical circuit, and the other photon (sometimes referred to as a "heralding photon") can be propagated into a different waveguide, which can be coupled to a single-photon detector. The single-photon detector can generate a signal (e.g., a digital logic signal) indicating when a photon has been detected by the detector. Any type of photodetector that has sensitivity to single photons can be used. In some embodiments, detection of a photon in a particular heralding waveguide indicates presence of a photon in a corresponding signaling waveguide. Accordingly, it can be known when and where a photon is generated.

In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like. In some embodiments, use of multirail encoding allows the probability of a band having one mode become occupied during a given pulse cycle to approach 1 without active multiplexing. Specific examples of multiplexing operations that can be applied to non-deterministic photon sources are described below.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $a_1|10\rangle + a_2|01\rangle$, where $|a_1|^2 + |a_2|^2 = 1$. In some embodiments, operations of this kind can be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 2A:
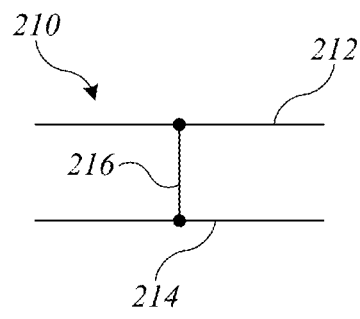
FIG. 2A shows a schematic diagram for coupling of two modes.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}}\begin{pmatrix} 1 & i \\ i & 1 \end{pmatrix}, \quad (9)$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}}\begin{pmatrix} 1 & -i \\ -i & 1 \end{pmatrix}\begin{pmatrix} a_1^\dagger \\ a_2^\dagger \end{pmatrix}_{output}, \quad (10)$$

where subscripts on the creation operators indicate the mode that is operated on, the subscripts input and output identify the form of the creation operators before and after the beam splitter, respectively and where:

$$a_i |n_i, n_j\rangle = \sqrt{n_i}|n_i-1, n_j\rangle$$
$$a_j |n_i, n_j\rangle = \sqrt{n_j}|n_i, n_j-1\rangle$$
$$a_j^\dagger |n_i, n_j\rangle = \sqrt{n_j+1}|n_i, n_j+1\rangle \quad (11)$$

For example, the application of the mode coupler shown in FIG. 2A leads to the following mappings:

$$a_{1_{input}}^\dagger \mapsto \frac{1}{\sqrt{2}}\left(a_{1_{output}}^\dagger - i a_{2_{output}}^\dagger\right) \quad (12)$$
$$a_{2_{input}}^\dagger \mapsto \frac{1}{\sqrt{2}}\left(-i a_{1_{output}}^\dagger + a_{2_{output}}^\dagger\right)$$

Thus, the action of the mode coupler described by Eq. (9) is to take the input states $|10\rangle$, $|01\rangle$, and $|11\rangle$ to $$|10\rangle \mapsto \frac{|10\rangle - i|01\rangle}{\sqrt{2}} \quad (13)$$
$$|01\rangle \mapsto \frac{-i|10\rangle + |01\rangle}{\sqrt{2}}$$
$$|11\rangle \mapsto \frac{-i}{2}(|20\rangle + |02\rangle)$$

Figure 2B:
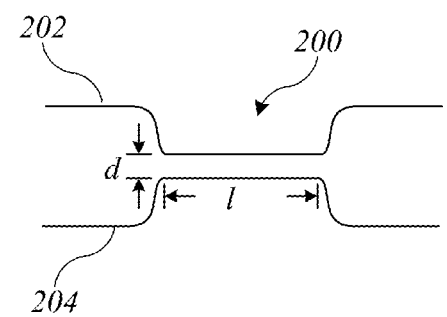
FIG. 2B shows, in schematic form, a physical implementation of mode coupling in a photonic system that can be used in some embodiments.

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length l of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \quad (14)$$
$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 3A:
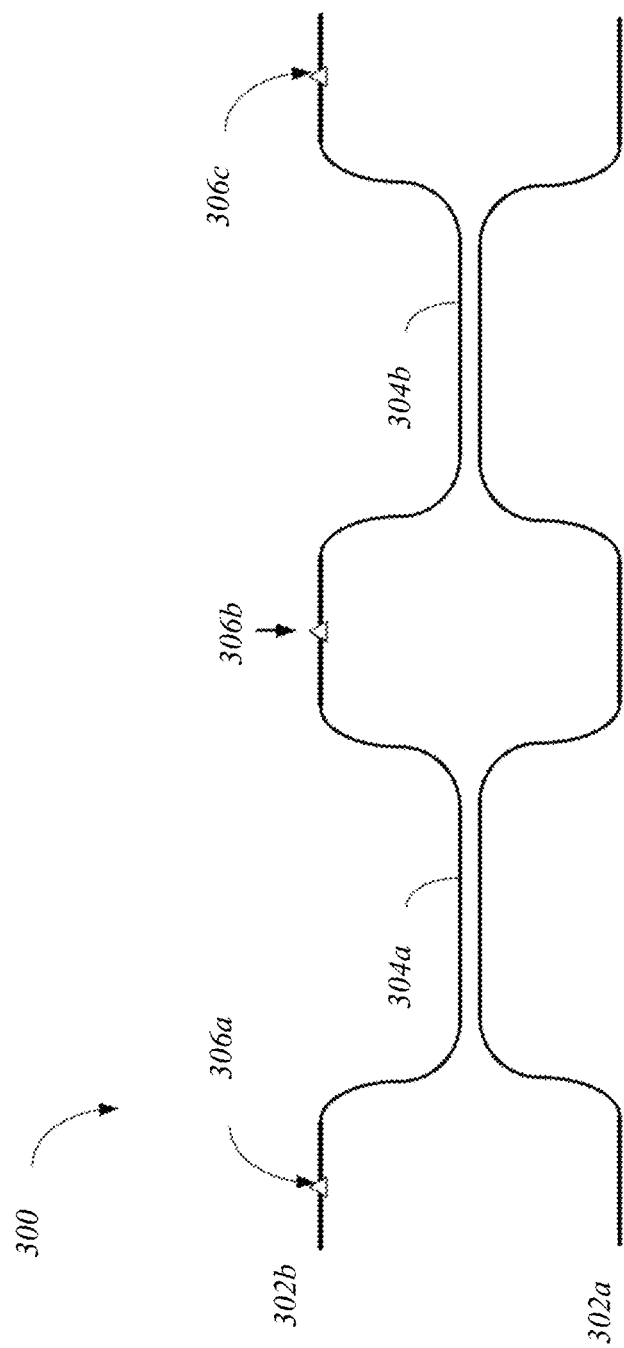
FIGS. 3A and 3B show, in schematic form, examples of physical implementations of a Mach-Zehnder Interferometer (MZI) configuration that can be used in some embodiments.
Figure 3B:
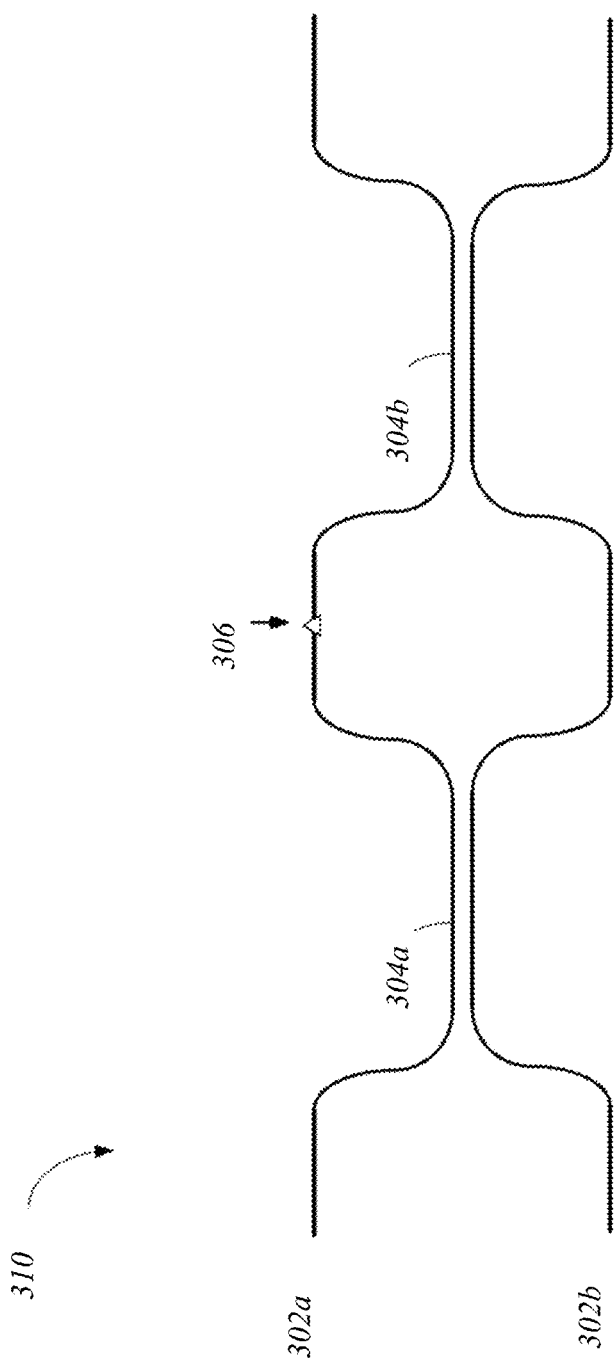

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302a, 302b in dual rail encoding can be achieved by varying the phases imparted by phase shifters 306a, 306b, and 306c and the length and proximity of coupling regions 304a and 304b. FIG. 3B shows a slightly simpler example of a MZI 310 that allows for a variable transmissivity between modes 302a, 302b by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
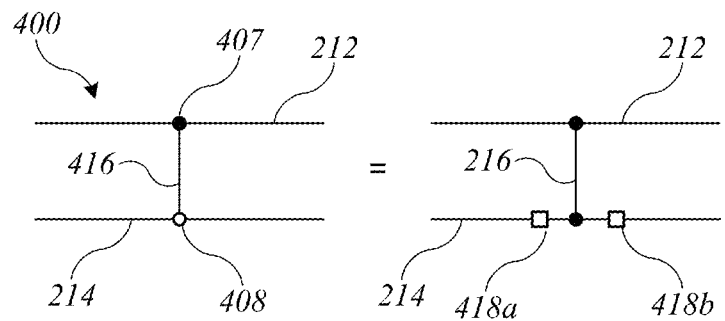
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}}\begin{pmatrix} 1 & 1 \\ 1 & -1 \end{pmatrix}. \quad (15)$$

Thus, mode coupler 400 applies the following mappings:

$$|10\rangle \mapsto \frac{|10\rangle + |01\rangle}{\sqrt{2}} \quad (16)$$

$$|01\rangle \mapsto \frac{|10\rangle + |01\rangle}{\sqrt{2}}$$

$$|11\rangle \mapsto \frac{1}{2}(|20\rangle + |02\rangle).$$

Figure 4B:
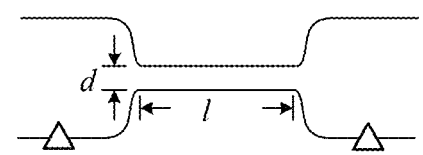
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r$=sTs, and, as shown at the right-hand side of FIG. 4A, mode coupler 416 can be implemented using mode coupler 216 (as described above), with a preceding and following phase shift (denoted by open squares 418a, 418b). Thus, the transfer matrix $T_r$ can be implemented by the physical beam splitter shown in FIG. 4B, where the open triangles represent +i phase shifters.

Figure 5:
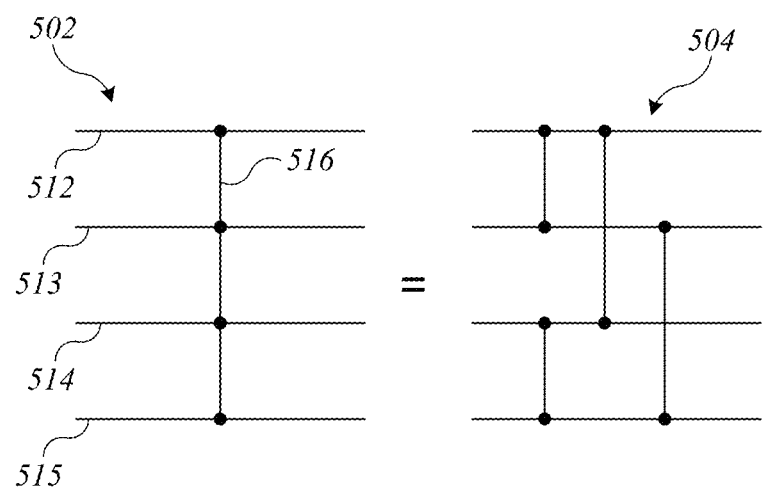
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation that can be applied to a set of $2^q$ modes for integer q.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
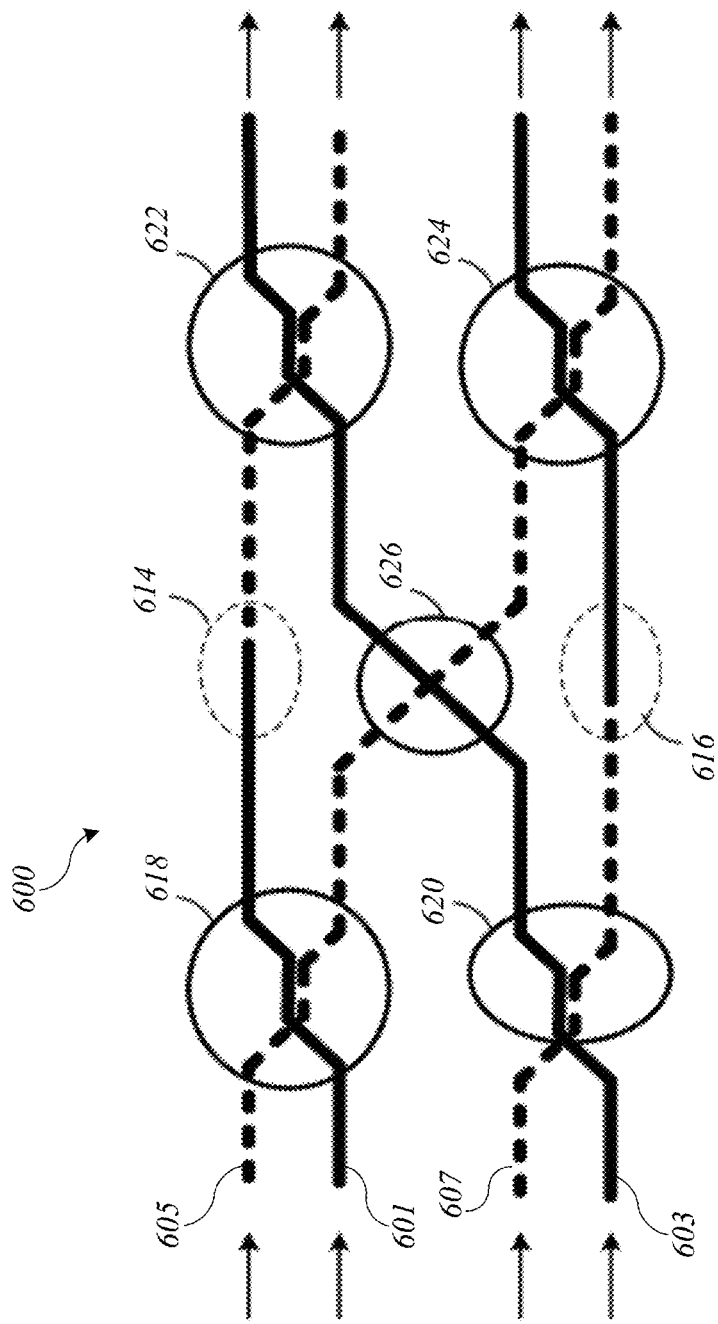
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
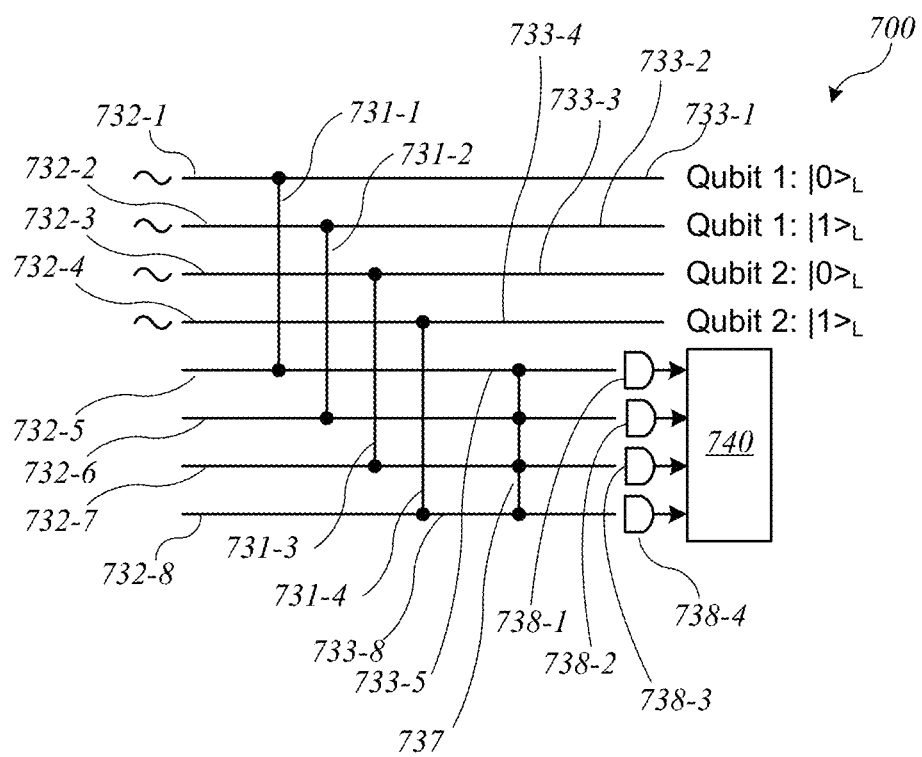
FIG. 7 shows a circuit diagram for a dual-rail-encoded Bell state generator that can be used in some embodiments.

In some embodiments, entangled states of multiple photonic qubits can be created by coupling (spatial) modes of two (or more) qubits and performing measurements on other modes. By way of example, FIG. 7 shows a circuit diagram for a Bell state generator 700 that can be used in some dual-rail-encoded photonic embodiments. In this example, waveguides (or modes) 732-1 through 732-4 are initially each occupied by a photon (indicated by a wavy line); waveguides (or modes) 732-5 through 732-8 are initially vacuum (unoccupied) modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731-1-731-4, with each mode coupler 731 having one input waveguide receiving a photon and one input waveguide receiving vacuum. Mode couplers 731 can be, e.g., 50/50 beam splitters so that, for example, a photon entering on waveguide 732-1 (or a photon entering on waveguide 732-5) has a 50% probability of emerging on either output of mode coupler 731-1. In the following description, mode couplers 731 may also be referred to as "directional couplers." Thereafter, a mode-information erasure coupling (e.g., implementing a four-mode mode spreading transform as shown in FIG. 5 or a second-order Hadamard transfer matrix) is performed on one output mode of each directional coupler 731 (in this example, waveguides 733-5 through 733-8 provide inputs to the mode-information erasure coupling), as shown by mode coupler 737. In the following description, mode coupler 737 may also be referred to as a "mode coupler network" or "Hadamard network." Waveguides 733-5 through 733-8 act as "heralding" modes that are measured and used to determine whether a Bell state was successfully generated on the four output waveguides 733-1 through 733-4. For instance, detectors 738-1 through 738-4 can be coupled to the waveguides 733-5 through 733-8 after second-order mode coupler 737. Each detector 738-1 through 738-4 can output a classical data signal (e.g., a voltage level on a conductor) indicating whether it detected a photon (or the number of photons detected). These outputs can be coupled to classical decision logic circuit 740, which determines whether a Bell state is present on the other four waveguides 733-1 through 733-4. For example, decision logic circuit 740 can be configured such that a Bell state is confirmed (also referred to as "success" of the Bell state generator) if and only if a single photon was detected by each of exactly two of detectors 738-1 through 738-4. In some embodiments, output modes (or waveguides) 733-1 through 733-4 can be mapped to the logical states of two qubits (Qubit 1 and Qubit 2), as indicated in FIG. 7. Specifically, in this example, the logical state of Qubit 1 is based on occupancy of modes 733-1 and 733-2, and the logical state of Qubit 2 is based on occupancy of modes 733-3 and 733-4. It should be noted that generation of a Bell state by Bell state generator 700 is a non-deterministic (or stochastic) process; that is, inputting four photons as shown does not guarantee that a Bell state will be created on modes 733-1 through 733-4. In one implementation, the probability of success is 4/32; in another implementation, the success probability is 3/16. It should also be noted that there are six detection patterns with one photon in each of two of detectors 738, and that Bell state generator 700 can be expected to produce a Bell state in all six possible arrangements of the four output modes. For a given choice of assignment of modes to dual-rail qubits (e.g., as shown in FIG. 7), Bell state generator 700 can produce any of the four two-qubit Bell states defined in Eqs. (3)-(6) above, as well as a "non-qubit" maximally entangled state. Different detection patterns at detectors 738 can correspond to different types of Bell states being produced. In some embodiments, based on the particular detection pattern at detectors 738, mode swaps can be selectably applied to modes 733 in order to cast the Bell state into a particular type (e.g., a particular one of the four two-qubit Bell states defined above). In some embodiments, the mode swap can be subsumed into subsequent operations without the need for active optical switches to implement selectable mode swapping at the output of Bell state generator 700.

The following sections describe examples of optical circuits and techniques that can be used to provide multiple photons as inputs to an optical circuit such as Bell state generator 700. Such circuits and techniques can be applied in a wide variety of photonic systems and circuits.

Figure 8:
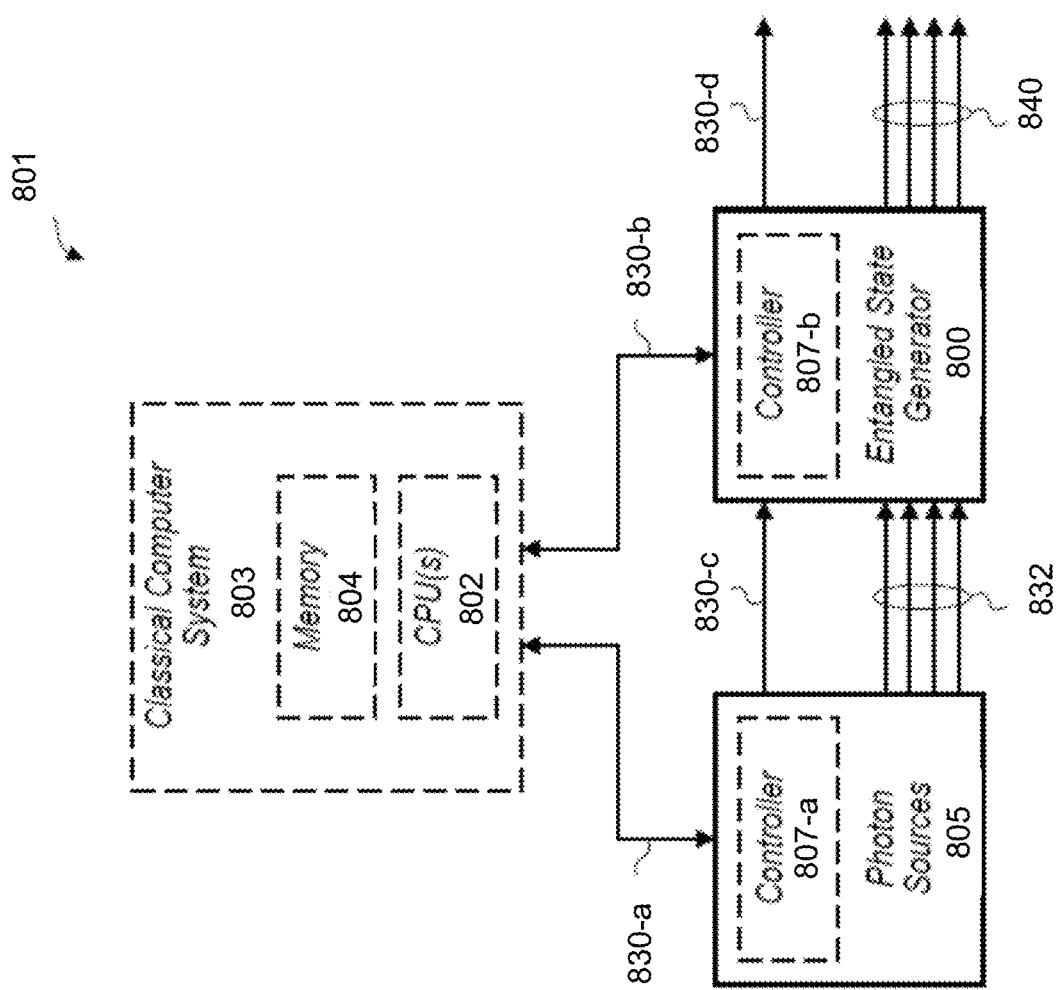
FIG. 8 illustrates an example of a qubit entangling system in accordance with some embodiments.

FIG. 8 illustrates an example of a qubit entangling system 801 in accordance with some embodiments. Such a system can be used to generate qubits (e.g., photons) in an entangled state (e.g., a GHZ state, Bell pair, and the like), in accordance with some embodiments.

In an illustrative photonic architecture, qubit entangling system 801 can include a photon source module 805 that is optically connected to entangled state generator 800. Both the photon source module 805 and the entangled state generator 800 may be coupled to a classical processing system 803 such that the classical processing system 803 can communicate and/or control (e.g., via the classical information channels 830a-b) the photon source module 805 and/or the entangled state generator 800. Photon source module 805 may include a collection of single-photon sources that can provide output photons to entangled state generator 800 by way of interconnecting waveguides 832. Entangled state generator 800 may receive the output photons and convert them to one or more entangled photonic states and then output these entangled photonic states into output waveguides 840. In some embodiments, output waveguide 840 can be coupled to some downstream circuit that may use the entangled states for performing a quantum computation. For example, the entangled states generated by the entangled state generator 800 may be used as resources for a downstream quantum optical circuit (not shown).

In some embodiments, system 801 may include classical channels 830 (e.g., classical channels 830-a through 830-d) for interconnecting and providing classical information between components. It should be noted that classical channels 830-a through 830-d need not all be the same. For example, classical channel 830-a through 830-c may comprise a bi-directional communication bus carrying one or more reference signals, e.g., one or more clock signals, one or more control signals, or any other signal that carries classical information, e.g., heralding signals, photon detector readout signals, and the like.

In some embodiments, qubit entangling system 801 includes the classical computer system 803 that communicates with and/or controls the photon source module 805 and/or the entangled state generator 800. For example, in some embodiments, classical computer system 803 can be used to configure one or more circuits, e.g., using system clock that may be provided to photon sources 805 and entangled state generator 800 as well as any downstream quantum photonic circuits used for performing quantum computation. In some embodiments, the quantum photonic circuits can include optical circuits, electrical circuits, or any other types of circuits. In some embodiments, classical computer system 803 includes memory 804, one or more processor(s) 802, a power supply, an input/output (I/O) subsystem, and a communication bus or interconnecting these components. The processor(s) 802 may execute modules, programs, and/or instructions stored in memory 804 and thereby perform processing operations.

In some embodiments, memory 804 stores one or more programs (e.g., sets of instructions) and/or data structures. For example, in some embodiments, entangled state generator 800 can attempt to produce an entangled state over successive stages, any one of which may be successful in producing an entangled state. In some embodiments, memory 804 stores one or more programs for determining whether a respective stage was successful and configuring the entangled state generator 800 accordingly (e.g., by configuring entangled state generator 800 to switch the photons to an output if the stage was successful, or pass the photons to the next stage of the entangled state generator 800 if the stage was not yet successful). To that end, in some embodiments, memory 804 stores detection patterns (described below) from which the classical computing system 803 may determine whether a stage was successful. In addition, memory 804 can store settings that are provided to the various configurable components (e.g., switches) described herein that are configured by, e.g., setting one or more phase shifts for the component.

In some embodiments, some or all of the above-described functions may be implemented with hardware circuits on photon source module 805 and/or entangled state generator 800. For example, in some embodiments, photon source module 805 includes one or more controllers 807-*a* (e.g., logic controllers) (e.g., which may comprise field programmable gate arrays (FPGAs), application specific integrated circuits (ASICS), a "system on a chip" that includes classical processors and memory, or the like). In some embodiments, controller 807-*a* determines whether photon source module 805 was successful (e.g., for a given attempt on a given clock cycle, described below) and outputs a reference signal indicating whether photon source module 805 was successful. For example, in some embodiments, controller 807-*a* outputs a logical high value to classical channel 830-*a* and/or classical channel 830-*c* when photon source module 805 is successful and outputs a logical low value to classical channel 830-*a* and/or classical channel 830-*c* when photon source module 805 is not successful. In some embodiments, the output of control 807-*a* may be used to configure hardware in controller 807-*b*.

Similarly, in some embodiments, entangled state generator 800 includes one or more controllers 807-*b* (e.g., logical controllers) (e.g., which may comprise field programmable gate arrays (FPGAs), application specific integrated circuits (ASICS), or the like) that determine whether a respective stage of entangled state generator 800 has succeeded, perform the switching logic described above, and output a reference signal to classical channels 830-*b* and/or 830-*d* to inform other components as to whether the entangled state generator 400 has succeeded.

In some embodiments, a system clock signal can be provided to photon source module 805 and entangled state generator 800 via an external source (not shown) or by classical computing system 803 generates via classical channels 830-*a* and/or 830-*b*. In some embodiments, the system clock signal provided to photon source module 805 triggers photon source module 805 to attempt to output one photon per waveguide. In some embodiments, the system clock signal provided to entangled state generator 800 triggers, or gates, sets of detectors in entangled state generator 800 to attempt to detect photons. For example, in some embodiments, triggering a set of detectors in entangled state generator 800 to attempt to detect photons includes gating the set of detectors.

It should be noted that, in some embodiments, photon source module 805 and entangled state generator 800 may have internal clocks. For example, photon source module 805 may have an internal clock generated and/or used by controller 807-*a* and entangled state generator 800 has an internal clock generated and/or used by controller 807-*b*. In some embodiments, the internal clock of photon source module 805 and/or entangled state generator 800 is synchronized to an external clock (e.g., the system clock provided by classical computer system 803) (e.g., through a phase-locked loop). In some embodiments, any of the internal clocks may themselves be used as the system clock, e.g., an internal clock of the photon source may be distributed to other components in the system and used as the master/system clock.

In some embodiments, photon source module 805 includes a plurality of probabilistic photon sources that may be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, a respective photon source may be most likely to, on a respective attempt, produce zero photons (e.g., there may be a 90% probability of producing zero photons per attempt to produce a single-photon). The second most likely result for an attempt may be production of a single-photon (e.g., there may be a 9% probability of producing a single-photon per attempt to produce a single-photon). The third most likely result for an attempt may be production of two photons (e.g., there may be an approximately 1% probability of producing two photons per attempt to produce a single photon). In some circumstances, there may be less than a 1% probability of producing more than two photons.

In some embodiments, the apparent efficiency of the photon sources may be increased by using a plurality of single-photon sources and multiplexing the outputs of the plurality of photon sources.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case the entangled state generator 400 may not be necessary, or alternatively may take the entangled states as input and generate even larger entangled states.

For the sake of illustration, an example which employs spatial multiplexing of several non-deterministic is described as an example of a mux photon source. However, many different spatial mux architectures are possible without departing from the scope of the present disclosure. Temporal muxing can also be implemented instead of or in combination with spatial multiplexing. mux schemes that employ log-tree, generalized Mach-Zehnder interferometers, multimode interferometers, chained sources, chained sources with dump-the-pump schemes, asymmetric multicrystal single photon sources, or any other type of mux architecture can be used. In some embodiments, the photon source can employ a mux scheme with quantum feedback control and the like.

The foregoing description provides an example of how photonic circuits can be used to implement physical qubits and operations on physical qubits using mode coupling between waveguides. In these examples, a pair of modes can be used to represent each physical qubit. Examples described below can be implemented using similar photonic circuit elements.

2. SPATIAL MULTIPLEXING OF PHOTONS

If photons can be reliably generated on demand (e.g., in response to pump pulses as described above), multiple photons can be provided simultaneously to a circuit such as Bell state generator 700 simply by providing an appropriate number of photon sources (four in the case of Bell state generator 700) and pumping (or otherwise triggering) all of the photon sources simultaneously. However, as described above, known single-photon sources operate non-deterministically, and a given photon source may or may not produce a photon pair in response to a given pump pulse. If, for example, four non-deterministic photon sources are used to provide photons to input waveguides 732-1 through 732-4 of Bell state generator 700, even if all four sources are pumped for each time bin, the probability of four photons arriving on input waveguides 732-1 through 732-4 in any given time bin would be less than 1.

Figure 9A:
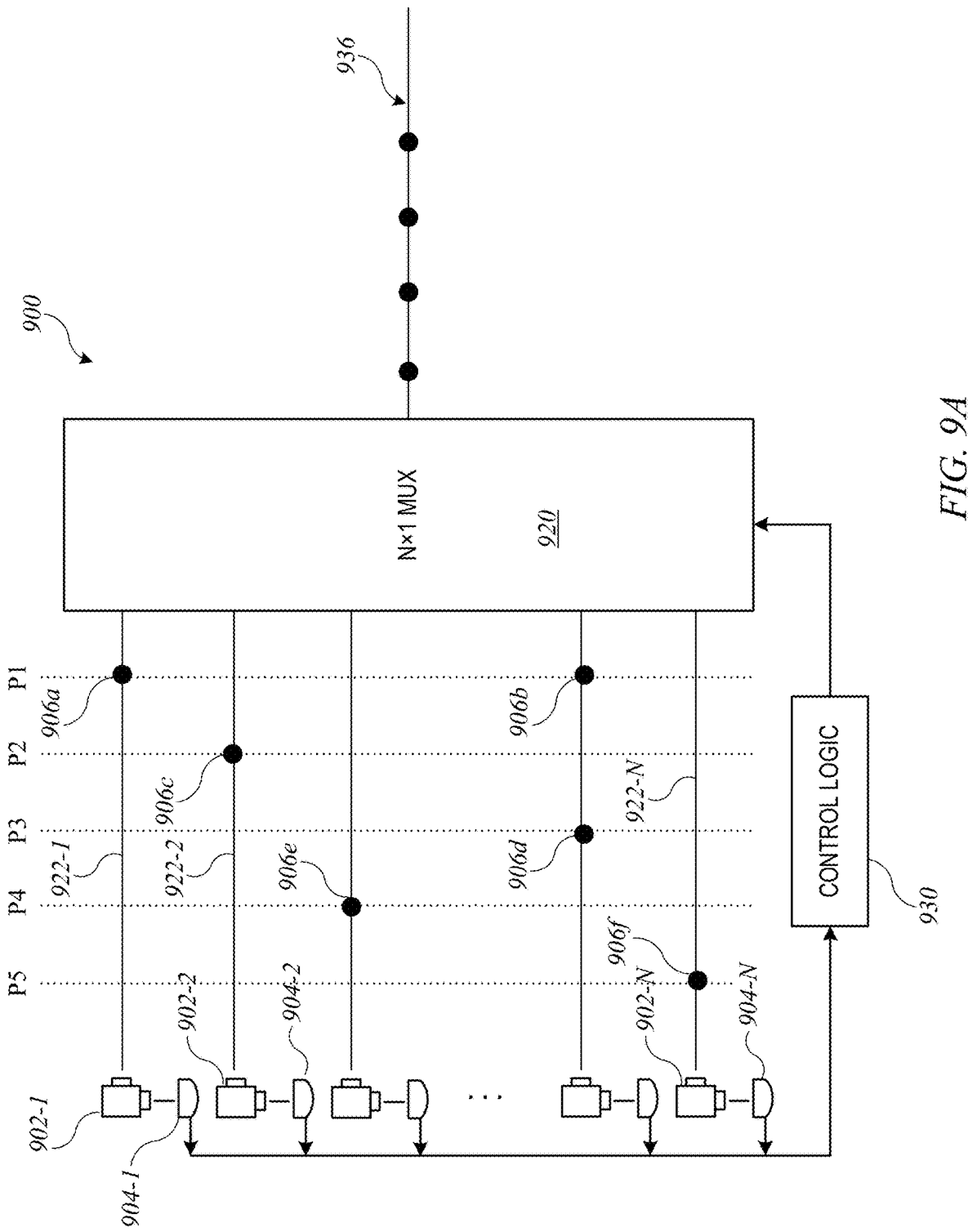
FIG. 9A shows a simplified schematic diagram of a spatial multiplexing circuit for a set of photon sources.

One technique to improve the likelihood of simultaneously obtaining photons from each of a set of non-deterministic photon sources involves spatial multiplexing of multiple photon sources. FIG. 9A shows a simplified schematic diagram of an N×1 (or N-to-1) spatial multiplexing circuit 900 for a set of N photon sources 902-1 through 902-N for some number N, where N≥2. Each photon source 902 is a different physical device that can produce a photon pair in response to a pump pulse. For instance, each photon source 902 can be a heralded single photon source as described above. Photon sources 902 can be pumped repeatedly, and each instance of pumping photon sources 902 can define a time bin (or temporal mode). For each time bin, each photon source 902 might or might not produce a photon pair. Each photon source 902 has an associated detector 904 and an associated signaling waveguide 922. In any time bin where a particular photon source 902 does produce a photon pair, one photon propagates through the associated signaling waveguide 922 while the other photon is detected by the associated detector 904.

In each time bin, each photon source 902 might or might not generate a photon. Dots 906a-906f show an example of photons that might be generated during different time bins P1-P5. FIG. 9A can be regarded as a snapshot view, with photons 906 produced during different time bins appearing at different locations along the waveguides 922.

An N×1 multiplexer (or "mux") 920 can be an active optical switching circuit that selectably couples one of N input waveguides 922 to an output waveguide 936. Selectable optical coupling can be provided using active optical switches or other active optical components that can be controlled to either allow or block propagation of photons. For example, N×1 mux 920 can be implemented as an N×1 generalized Mach-Zehnder interferometer (GMZI). An N×M (or N-to-M) GMZI is an optical circuit that can receive photons on a set of N input waveguides and control a set of active phase shifters to selectably couple M of the received photons to a set of M output waveguides. (In the case of mux 920, M=1.) Additional description of GMZI circuit implementations can be found below. Other optical switching networks can be substituted for a GMZI. N×1 mux 920 can be controlled by control logic 930, which can be implemented using a conventional electronic logic circuit (e.g., as described above with reference to controllers 807-a and 807-b of FIG. 8). Control logic 930 can receive signals from each of detectors 904 that indicate, for each time bin, whether a photon was or was not detected by each detector 904. Accordingly, control logic 930 can determine which photon sources 902 produced photons during a given time bin (and therefore which input waveguides 934 are carrying photons for that time bin). For each time bin, control logic 930 can control N×1 mux 920 to couple one input waveguide that has a photon to output waveguide 936. For example, a GMZI includes a set of active phase shifters that can be controlled to apply variable phase shifts along different optical paths, creating either constructive or destructive interference, and control logic 930 can generate control signals to set the state of each active phase shifter in a GMZI implementing N×1 mux 920 to provide the desired coupling.

The time bin can be as long or short as desired, based on characteristics of the optical circuit, variability in the timing of generating photons in single photon sources 902, etc. In some instances, an interval between time bins may be determined based on the speed at which N×1 mux 920 can be switched, on a recovery time for photon sources 902 and/or detectors 904, operating speed of circuits downstream of N×1 mux 920, or other design considerations to allow each time bin to be treated as an independent temporal mode.

As noted above, the behavior of photon sources 902 may be non-deterministic. That is, during a given time bin, the probability of a photon being generated by a given photon source 902 can be represented as $p_s$, where $p_s<1$. For photon sources of this type, multiplexing as shown in FIG. 9A provides the ability to increase the probability of successfully producing a photon in a given time bin. As shown in FIG. 9A, if N non-deterministic single-photon sources are used, with one photon source coupled to each input of N×1 mux 920, and if each photon source has probability $p_s$ of generating a photon (for a given time bin), then the probability that N×1 mux 920 receives at least one photon is $p_{mux}=1-(1-p_s)^N$. Thus, for a given type of photon source 902, a desired probability $p_{mux}$ of providing one photon per time bin to output waveguide 936 can, at least in principle, be achieved by a suitable choice of N. (As a practical matter, some combinations of $p_s$ and $p_{mux}$ may require a prohibitively large number N of photon sources.)

Figure 9B:
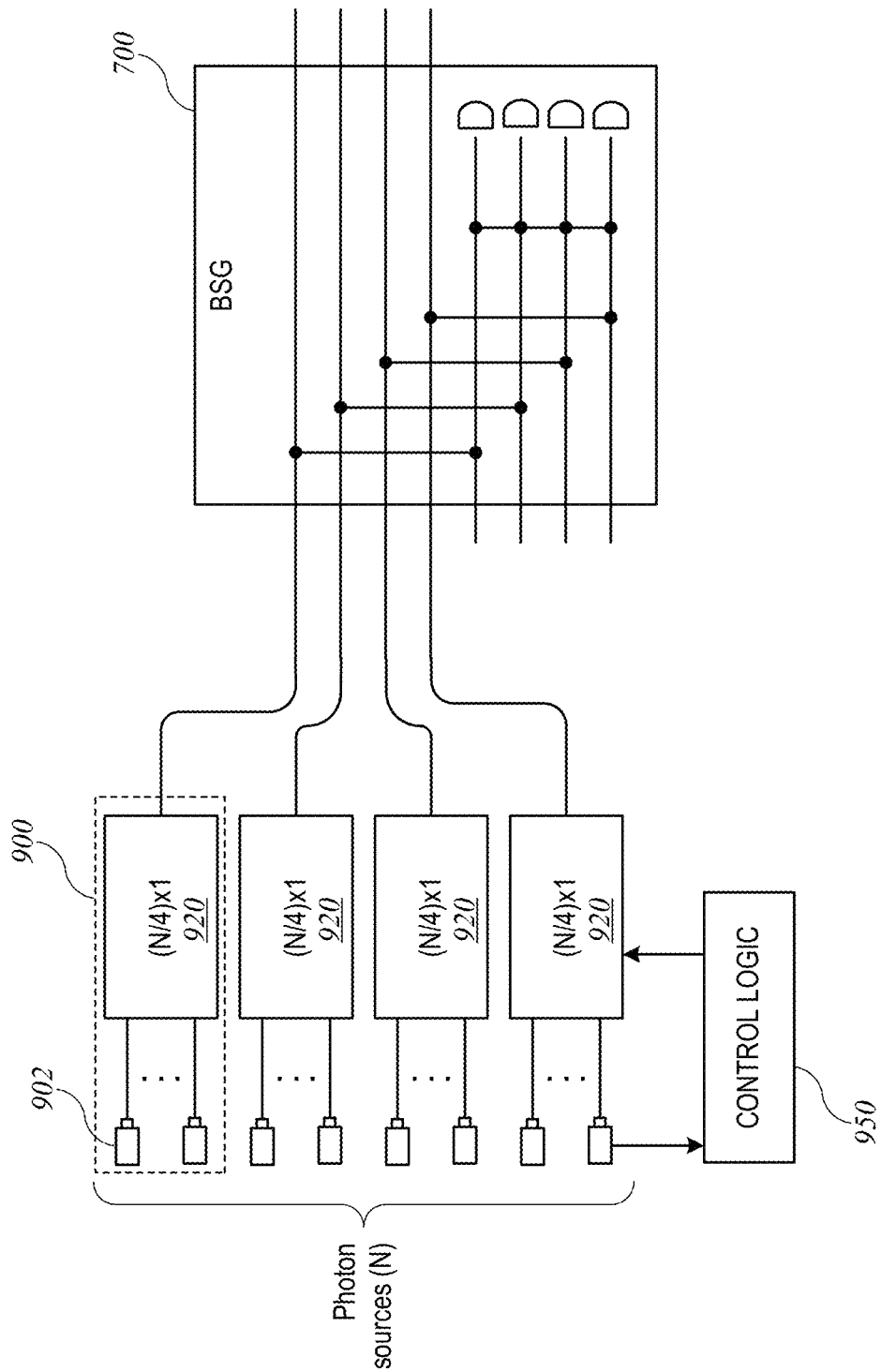
FIG. 9B shows a simplified schematic diagram of a Bell state generator that receives photons from four instances of a multiplexed source circuit.

In some applications, a downstream circuit may operate on multiple photons. For example, Bell state generator 700 of FIG. 7 can produce a Bell state if four photons are input simultaneously (i.e., in the same time bin). Accordingly, to reliably provide four input photons per pump period to Bell state generator 700, four instances of multiplexed photon-source circuit 900 can be provided, with each instance having an output 936 coupled to a different one of input waveguides 732-1 through 732-4. FIG. 9B shows a simplified schematic diagram of a Bell state generator 700 that receives photons from four instances of multiplexed source circuit 900. The total number of photon sources 902 is represented as N, and each instance of multiplexing circuit 900 includes an (N/4)×1 mux 920 that receives photons from a different subset of N/4 of the N photon sources 902. Control logic 950, which can be implemented using a conventional electronic logic circuit (e.g., as described above with reference to controllers 807-a and 807-b of FIG. 8), can receive heralding signals from each photon source 902 and determine the configuration of each multiplexing circuit 920, similarly to control logic 930 of FIG. 9A. Although not all signal paths are shown, it should be understood that control logic 950 can receive heralding signals from each instance of photon source 900 and can send control signals to each (N/4)×1 mux 920. It should also be understood that the selection of an active input waveguide for each (N/4)×1 mux 920 can be made independently. As used herein, a "usable input state" for an optical circuit such as Bell state generator 700 refers to a distribution (or pattern) of photons across the input waveguides of the optical circuit that allows the optical circuit to produce the desired output state. For example, referring to FIG. 7, an input state in which one photon is present on each of waveguides 732-1 through 732-4 and no photons are present on any of waveguides 732-5 through 732-8 is a usable input state for Bell state generator 700. Accordingly, the circuit of FIG. 9B provides a usable input state for Bell state generator 700 in time bins for which each of (N/4)×1 muxes 920 produces a photon. Since the circuit of FIG. 9B does not provide input photons to input waveguides 732-5 through 732-8, only one usable input state can be provided using the circuit of FIG. 9B. Assuming N is at least 8, multiplexers 920 increase the probability that the usable input state will be provided by providing (N/4) opportunities to produce each input photon but do not increase the number of usable input states for Bell state generator 700.

It should be understood that providing a usable input state does not guarantee that the desired output state will be produced. For example, as described above, generation of a Bell state by Bell state generator 700 is a non-deterministic (or stochastic) process, in which not every instance of providing a usable input state results in a Bell state. Thus, a usable input state may be considered a necessary condition but not a sufficient condition for producing the desired output state.

3. INPUT SWITCHING FOR AN ENTANGLEMENT CIRCUIT

Providing four instances of circuit 900 (as shown in FIG. 9B) to supply photons to Bell state generator 700 can consume a significant amount of area, particularly if the probability of an individual photon source 902 generating a photon pair for a given time bin is low, such that a large number N of photon sources is required to provide high probability that each instance of circuit 900 produces a photon. According to some embodiments, circuit area can be reduced while maintaining comparable success rates by using smaller multiplexers with additional optical switching.

Referring to FIG. 7, one approach to optimization is based on the observation that Bell state generator 700 has more than one usable input state. That is, a photon can enter directional coupler 731-1 on either input waveguide 732-1 or input waveguide 732-5. In either case, the photon has a 50% probability of emerging from directional coupler 731-1 on output waveguide 733-1 and a 50% probability of emerging from directional coupler 731-1 into network of mode couplers 737. The same principle holds for each directional coupler 731-2-731-4, and the selection of one of the two input waveguides 732 for each directional coupler 731 can be made independently. Accordingly, the probability of providing a usable input state from a given number N of photon sources can be increased by using a different multiplexing scheme that allows photons to be provided to either input waveguide 732 of each directional coupler 731. This allows Bell state generator 700 to have $2^4$=16 usable input states instead of just one.

Figure 10:
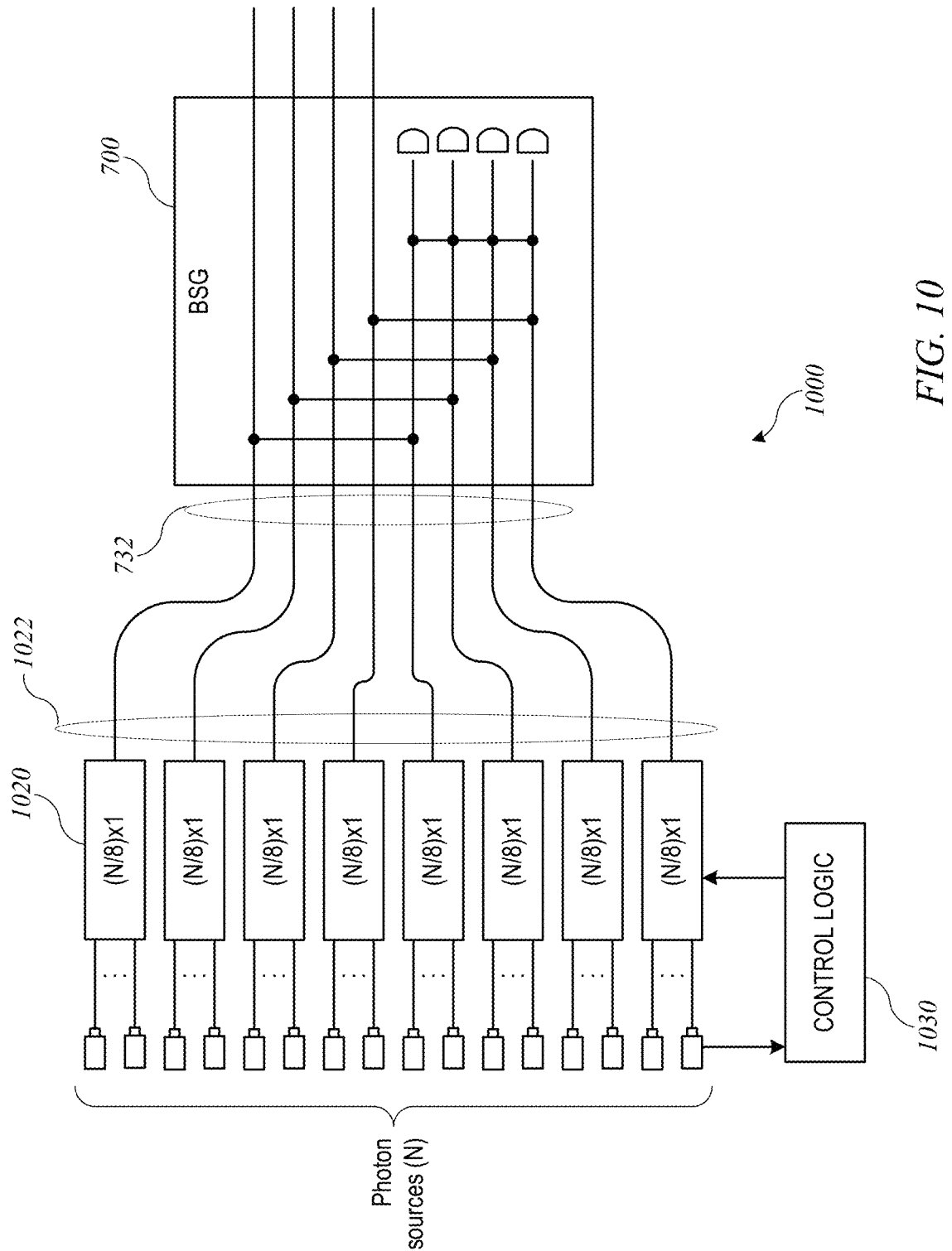
FIG. 10 shows a simplified schematic diagram of an alternative spatial multiplexing scheme for providing inputs to a Bell state generator.

FIG. 10 is a simplified schematic diagram showing an example of an alternative multiplexing scheme for N photon sources providing inputs to Bell state generator 700. A circuit 1000 includes eight (N/8)×1 multiplexing circuits 1020, each receiving inputs from N/8 of the N photon sources 902. Each multiplexing circuit 1020 is coupled to a different one of input waveguides 732 of Bell state generator 700. A usable input state for Bell state generator 700 is produced whenever four of the eight multiplexers 1020 produce photons in one of the 16 patterns corresponding to a usable input state.

It should be noted that, while the circuit of FIG. 9B can output Bell states having three distinct types, the circuit of FIG. 10 can output Bell states having six distinct types, distinguished by phase flips. In some applications, different types of Bell states can be used interchangeably, and the number of types of Bell states that can be produced is of no practical consequence. In some embodiments, depending on the particular detection pattern, additional mode swaps and/or phase corrections can be applied to produce a particular type of Bell state.

It is possible that more than four of multiplexers 1020 can produce photons in the same time bin, and blocking switches (not shown in FIG. 10) can be used at the inputs 732 of Bell state generator 700 (or at the outputs 1022 of mux circuits 1020) so that any extraneous photons are prevented from entering Bell state generator 700. A blocking switch can be implemented using any technique that results in a photon being selectably blocked or allowed to propagate through a waveguide. For example, a blocking switch can be implemented using a (2×2) Mach-Zehnder interferometer and "dumping" one mode (e.g., by making one waveguide a dead end). As another example, a blocking switch can be implemented by providing dopants in a region of the waveguide that cause the photon to be absorbed or not as a function of an applied voltage. Other implementations may also be used. Control logic to determine the state of each blocking switch can be implemented using the same control logic 1030 that controls (N/8)×1 muxes 1020. In some embodiments, the blocking switches can also be used to block the output of any (N/8)×1 mux 1020 that did not produce a photon, thereby providing "clean" vacuum states at the four inputs of Bell state generator 700 that are not receiving photons.

Circuit 1000 can produce a usable input state for Bell state generator 700 when (N/8)×1 muxes 1020 produce four photons in a pattern corresponding to one of the 16 usable input states. However, there are 70 distinct ways to distribute four photons across eight waveguides, which means that the circuit of FIG. 10 can be expected to produce a usable input state in 16/70 instances where four muxes 1020 produce photons. (It should be understood that the probability of a given mux 1020 producing a photon depends on the number of sources N and on the probability $p_s$ of a source producing a photon, which may be considerably less than 1. Accordingly, in operation, the probability that the circuit of FIG. 10 produces a usable input state for Bell state generator 700 for a given time bin may be less than 16/70.)

Figure 11A:
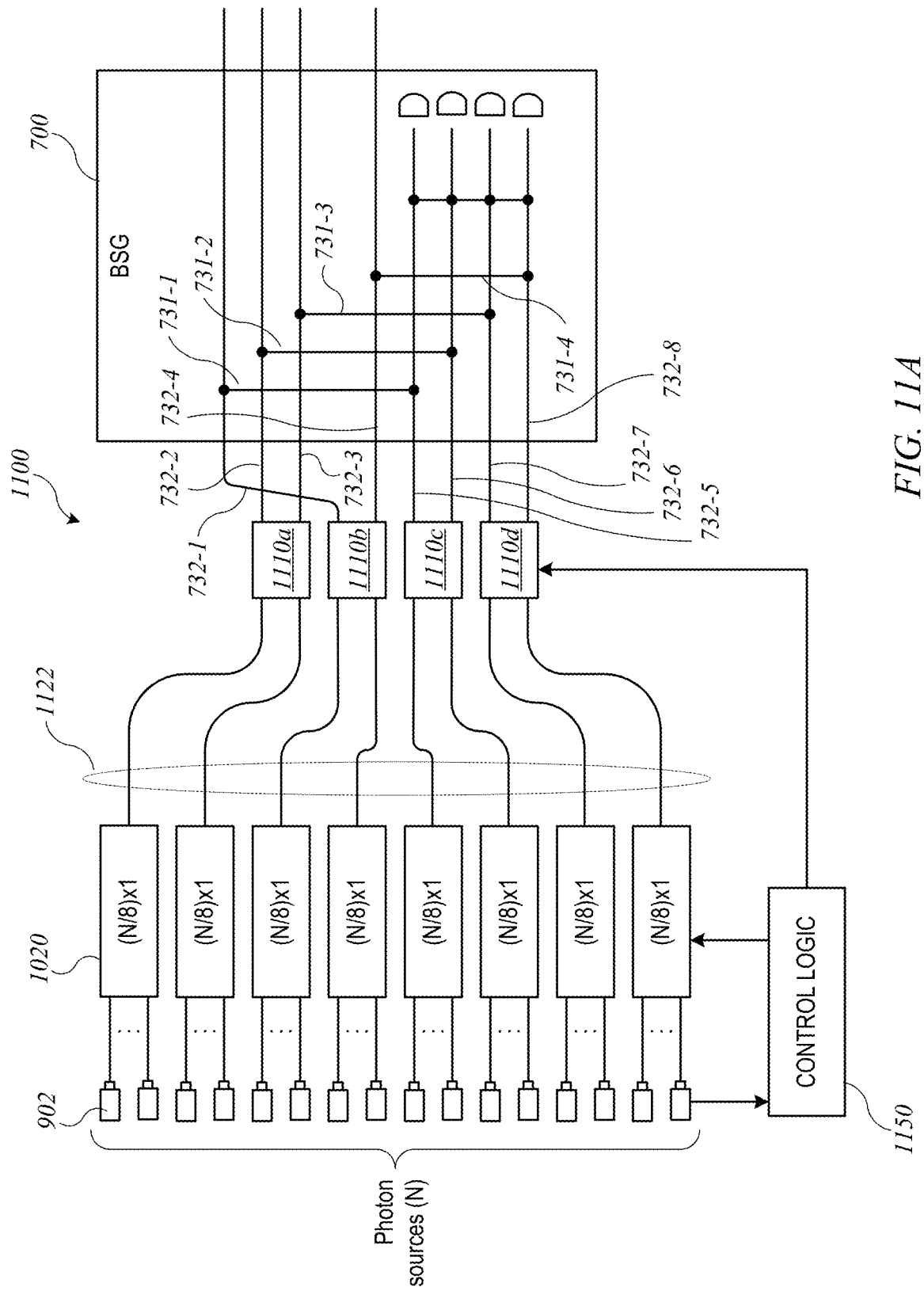
FIG. 11A shows a simplified schematic diagram of an optical circuit according to some embodiments.

According to certain embodiments, the probability of obtaining a usable input state for Bell state generator 700 from a set of eight mux circuits can be increased by adding a set of 2×2 muxes (or 2×2 optical switches) in the optical path between the outputs of multiplexer circuits 1020 and the inputs of Bell state generator 700. FIG. 11A shows a simplified schematic diagram of an optical circuit 1100 according to some embodiments. Circuit 1100 is in some respects similar to the circuit of FIG. 10: a set of N photon sources 902 provide inputs to a set of eight (N/8)×1 multiplexer circuits 1020, and the outputs of multiplexer circuits 1020 are used to provide inputs to Bell state generator 700. However, a set of four 2×2 muxes 1110 are disposed in the optical path between the outputs 1122 of mux circuits 1020 and the inputs 732 of Bell state generator 700. Each 2×2 mux 1110 can be implemented, e.g., using a Mach-Zehnder interferometer (MZI) as described above, and can be configured such that a photon on either of the two input modes can be selectably routed to either of the two output modes. If both input modes receive a photon in the same time bin, then both output modes can propagate a photon. Each 2×2 mux 1110 has inputs coupled to a different pair of multiplexer circuits 1020 and outputs coupled to two input waveguides 732 of Bell state generator 700 that couple to different directional couplers 731. In the example shown in FIG. 11A, mux 1110a couples to input waveguides 732-2 and 732-3. Mux 1110b couples to input waveguides 732-1 and 732-4. Mux 1110c couples to input waveguides 732-5 and 732-6. Mux 1110d couples to input waveguides 732-7 and 732-8.

Muxes 1110 can be used to spatially rearrange a group of photons received from mux circuits 1020, which can increase the probability of providing a usable input state to Bell state generator 700. Each 2×2 mux 1110 can direct a photon to either of two directional couplers 731 of Bell state generator 700, thereby enabling at least some of the 54 possible distributions of four photons at the outputs 1122 of mux circuits 1020 that are not usable input states for Bell state generator 700 to be rearranged into one or another of the 16 usable input states for Bell state generator 700. With the specific configuration shown in FIG. 11A, it can be shown (by exhaustive search) that 66 of the 70 possible distributions of four photons at the outputs 1122 of mux circuits 1020 can be rearranged by operation of 2×2 muxes 1110 to one or another of the 16 usable input states at the Bell state generator inputs 732. Further, every possible distribution of more than four photons can be converted to one or another of the 16 usable input states at Bell state generator inputs 732 by operation of muxes 1110 and the use of blocking switches (which can be disposed, e.g., at the outputs of mux circuits 1020 or at the inputs of Bell state generator 700) to prevent photons from entering on more than four of the Bell state generator inputs 732.

In operation, control logic 1150, which can be implemented using a conventional electronic logic circuit (e.g., as described above with reference to controllers 807-a and 807-b of FIG. 8), can determine which of mux circuits 1020 are producing a photon in a given time bin and can set the states of 2×2 muxes 1110 (and blocking switches that may be present) so that the pattern of photons at outputs 1122 of mux circuits 1020 is rearranged by muxes 1110 into a usable input state for Bell state generator 700. The mapping from each possible pattern of photons at multiplexer outputs 1122 to a pattern of photons at Bell state generator inputs 732 can be determined in advance and stored in a lookup table accessible to control logic 1150. In some embodiments, for patterns of photons at multiplexer outputs 1122 that cannot be rearranged into a usable input state for Bell state generator 700 (including any pattern with fewer than four photons as well as the four 4-photon patterns that cannot be rearranged into a usable input state for Bell state generator 700), muxes 1110 can be set to a default state, on the assumption that the output of Bell state generator 700 will not be useful regardless of the mux settings. In some embodiments where circuit 1100 includes blocking switches (e.g., at the outputs of mux circuits 1020 or the inputs 732 of Bell state generator 700), control logic 1150 can set the blocking switches to block all photons from all mux circuits 1020 if the pattern of photons at multiplexer outputs 1122 is one that cannot be rearranged into a usable input state for Bell state generator 700.

It should be noted that the particular pattern of connections between muxes 1110 and input waveguides 732 of Bell state generator 700 determines how many of the possible distributions of four photons at the outputs 1122 of mux circuits 1020 can yield usable input states at Bell state generator input waveguides 732. As described above, each directional coupler 731 has two inputs, each coupled to a different one of input waveguides 732. Accordingly, the two input waveguides 732 that couple to the same directional coupler 731 can be understood as being paired. Input waveguides 732-1 and 732-5 (the inputs to directional coupler 731-1) are a first pair; input waveguides 732-2 and 732-6 (the inputs to directional coupler 731-2) are a second pair; input waveguides 732-3 and 732-7 (the inputs to directional coupler 731-3) are a third pair; and input waveguides 732-4 and 732-8 (the inputs to directional coupler 731-4) are a fourth pair. With the connections shown in FIG. 11A, 2×2 mux 1110a can deliver photons to input waveguide 732-2 of directional coupler 731-2 and to input waveguide 732-3 of directional coupler 731-3; 2×2 mux 1110b can deliver photons to input waveguide 732-1 of directional coupler 731-1 and to input waveguide 732-4 of directional coupler 731-4; 2×2 mux 1110c can deliver photons to input waveguide 732-5 of directional coupler 731-1 and to input waveguide 732-6 of directional coupler 731-2, and 2×2 mux 1110d can deliver photons to input waveguide 732-7 of directional coupler 731-3 and to input waveguide 732-8 of directional coupler 731-4. In this manner, each directional coupler 731 is thus coupled to two different muxes 1110, and each mux 1110 is coupled to two different upstream circuits (in this case, two different (N/4)×1 multiplexer circuits 1020). This configuration allows a given directional coupler 731 to receive a photon from any one of four different upstream circuits and allows a photon from a given upstream circuit to be delivered to any one of two different directional couplers. Thus, in a case where directional coupler 731-1 would (in the absence of muxes 1110) receive two photons, one of the two photons can be rerouted to either directional coupler 731-4 (using mux 1110a) or directional coupler 731-2 (using mux 1110c), depending on which one of directional couplers 731-4 or 731-2 would not otherwise receive any photon. Similarly, an "extra" photon can be rerouted from directional coupler 731-2 to either directional coupler 731-1 or directional coupler 731-3, and so on. In this manner, 66 of the 70 possible patterns (or distributions) of four photons at the outputs 1122 of mux circuits 1020 can be rearranged by muxes 1110 to provide usable input states at Bell state generator inputs 732. Consequently, for a given number and type of photon sources 902, circuit 1100 of FIG. 11A has a significantly higher probability of generating a Bell state for a given time bin than circuit 1000 of FIG. 10 (which can only use 16/70 possible distributions of four photons at the outputs of mux circuits 1020). It is noted that other arrangements of muxes 1110 can also allow an "extra" photon to be rerouted to either of two different directional couplers, and any such arrangement can be used. In some embodiments, an additional 2×2 mux or switch can be added to allow the remaining four possible distributions of four photons at the outputs 1122 of mux circuits 1020 to be rearranged into a usable input state at Bell state generator inputs 732. As with circuit 1000 of FIG. 10, it should be understood that the probability of a given mux 1020 producing a photon depends on the number of sources N and on the probability $p_s$ of one source producing a photon, which may be considerably less than 1, and that in order to provide a usable input state for Bell state generator 700, at least four photons need to be provided at outputs 1122 of mux circuits 1020. Thus, it is not guaranteed that each time bin (or each instance of triggering photon sources 902) will have four photons, and the probability that the circuit of FIG. 11A produces a usable input state for Bell state generator 700 in a given time bin may be less than 66/70.

Figure 11B:
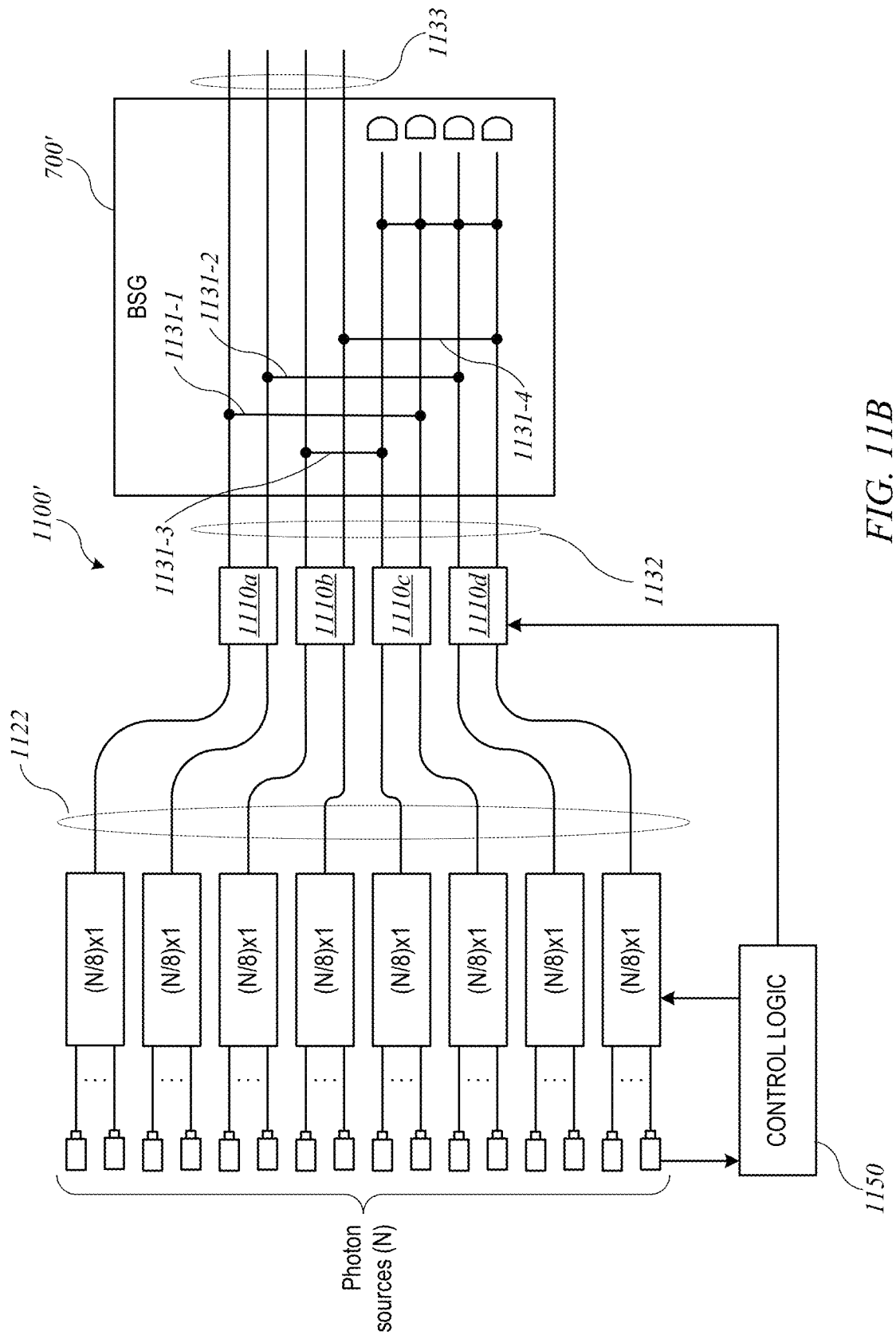
FIG. 11B shows a simplified schematic diagram of an optical circuit according to some embodiments.

As the drawing in FIG. 11A suggests, some implementations of circuit 1100 can involve a waveguide crossing: waveguide 732-1 is shown as crossing over waveguides 732-2 and 732-3. Alternatively, in some embodiments a waveguide crossing can be avoided by a suitable arrangement of the directional couplers within Bell state generator 700. FIG. 11B shows a simplified schematic diagram of an optical circuit 1100' according to some embodiments. Circuit 1100' implements the same behavior as circuit 1100 of FIG. 11A, but without a crossing of waveguides. (It is also noted that the mapping of output waveguides 1133 to qubit logical states may be rearranged relative to circuit 1100.) Instead of crossing waveguides, Bell state generator 700' has directional couplers 1131-1 through 1131-4 that are coupled to the input waveguides in a different pattern that avoids a waveguide crossing while preserving the property that muxes 1110 can reroute an extraneous photon from one directional coupler 1131 to either of two other directional couplers 1131. Accordingly, circuit 1100' also has the property that 66 of the 70 possible distributions of four photons at the outputs 1122 of mux circuits 1020 can yield usable input states at the Bell state generator inputs 1132. In some embodiments, an additional 2×2 mux or switch can be added to allow the remaining four possible distributions of four photons at the outputs 1122 of mux circuits 1020 to be rearranged into a usable input state at Bell state generator inputs 1132.

It will be appreciated that circuits 1100 and 1100' are illustrative and that variations and modifications are possible. Other arrangements of directional couplers and/or other coupling patterns of the switches 1110 can be substituted. In some embodiments, blocking switches can be provided at the inputs of the Bell state generator (or at any point upstream of the inputs of the Bell state generator) so that no more than four input waveguides of the Bell state generator circuit receive photons for any given time bin. Using MZIs to implement 2×2 muxes 1110 can provide lower loss relative to larger switches (e.g., GMZI switches) that might allow any pattern of photons on multiplexer outputs 1122 to be rearranged into a usable input state, while having minimal effect on delay.

Figure 12:
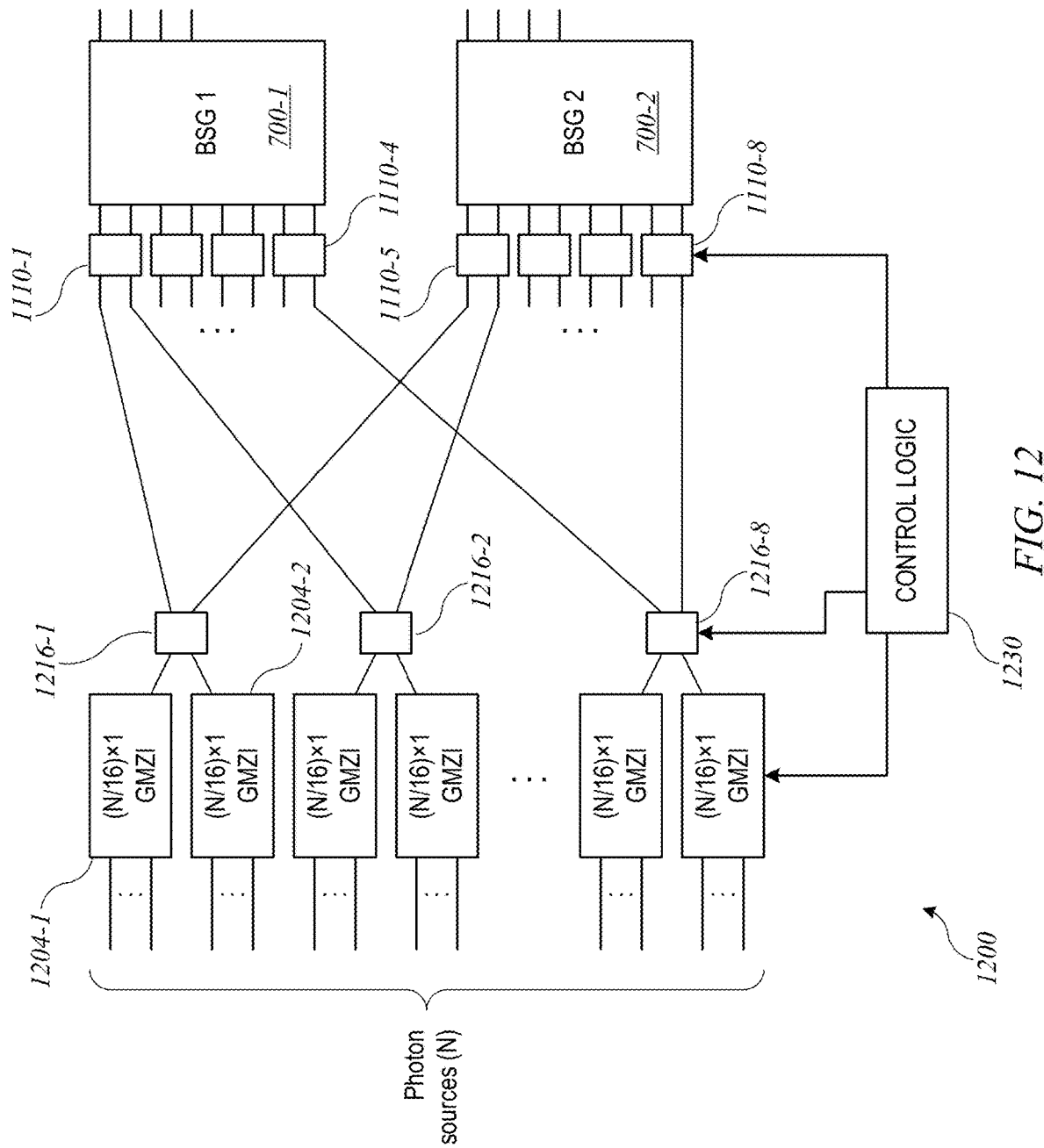
FIG. 12 shows a simplified schematic diagram of an optical circuit according to some embodiments.

In some embodiments, the probability of generating a Bell state using circuit 1100 (or circuit 1100') can be further increased by providing additional selectability of inputs to muxes 1110 as well as additional Bell state generators that can use extra photons that may be generated. FIG. 12 shows a simplified schematic diagram of an optical circuit 1200 according to some embodiments. Circuit 1200 includes two Bell state generators 700-1 and 700-2, each of which can be implemented as described above. (Bell state generator 700' of FIG. 11B or other circuits can be substituted). Bell state generator circuits 700 can operate concurrently on input photons generated by a set of N photon sources (not explicitly shown in FIG. 12). Inputs of each Bell state generator 700 can be coupled to a set of four 2×2 muxes 1110 as described above.

In circuit 1200, the photon sources are coupled to the inputs of sixteen (N/16)×1 multiplexer circuits 1204, each of which can be implemented using a GMZI coupled to a subset of N/16 of the photon sources. A set of eight 2×2 muxes 1216-1 through 1216-8 is disposed between the outputs of multiplexer circuits 1204 and the inputs of 2×2 muxes 1110. Muxes 1216 can each be implemented, e.g., using a Mach-Zehnder interferometer (MZI). Each mux 1216 has inputs coupled to a different pair of multiplexer circuits 1204, a first output coupled to one of muxes 1110-1 through 1110-4 for Bell state generator 700-1, and a second output coupled to a corresponding one of muxes 1110-5 through 1110-8 for Bell state generator 700-2. Thus, for example, switch 1216-1 has inputs coupled to multiplexer circuit 1204-1 and 1204-2, one output coupled to mux 1110-1 (which couples to Bell state generator 700-1) and one output coupled to mux 1110-5 (which couples to Bell state generator 700-2). In this manner, each mux 1216-1 through 1216-8 can supply one photon to each of Bell state generators 700-1 and 700-2, and muxes 1110 for each Bell state generator 700 can rearrange the photons into one of the 16 usable input states for the Bell state generator 700.

Similarly to other control logic circuits described herein, control logic 1230, which can be implemented using a conventional electronic logic circuit (e.g., as described above with reference to controllers 807-a and 807-b of FIG. 8), can receive heralding signals from the N photon sources and can determine, based on the pattern of photon sources that generated photons, which of mux circuits 1204 can provide a photon to each of muxes 1216. Each of muxes 1216 may receive 0, 1, or 2 photons, depending on the pattern of photon sources that generated photons. Based on the pattern of photons received at muxes 1216, control logic 1230 can determine switch settings for muxes 1216 such that photons are delivered to muxes 1110-1 through 1110-4 in a pattern that can be rearranged by muxes 1110-1 through 1110-4 into one of the 16 usable input states for Bell state generator 700-1 and/or such that photons are delivered to muxes 1110-5 through 1110-8 in a pattern that can be rearranged by muxes 1110-5 through 1110-8 into one of the 16 usable input states for Bell state generator 700-2. (Depending on the number of photons generated for a given time bin, four photons may be provided to zero, one, or both of Bell state generators 700-1 and 700-2.) Control logic 1230 can also control muxes 1110 to perform the appropriate rearrangement, as described above. Via an appropriate combination of switch settings for muxes 1216 and 1110, any distribution of four or more photons across the outputs of mux circuits 1204 can be rearranged into a usable input state for at least one of Bell state generators 700. Depending on which photon sources generate photons (and on the non-deterministic production of Bell states by Bell state generators 700-1 and 700-2), circuit 1200 can produce 0, 1 or 2 Bell states for each time bin.

Figure 13:
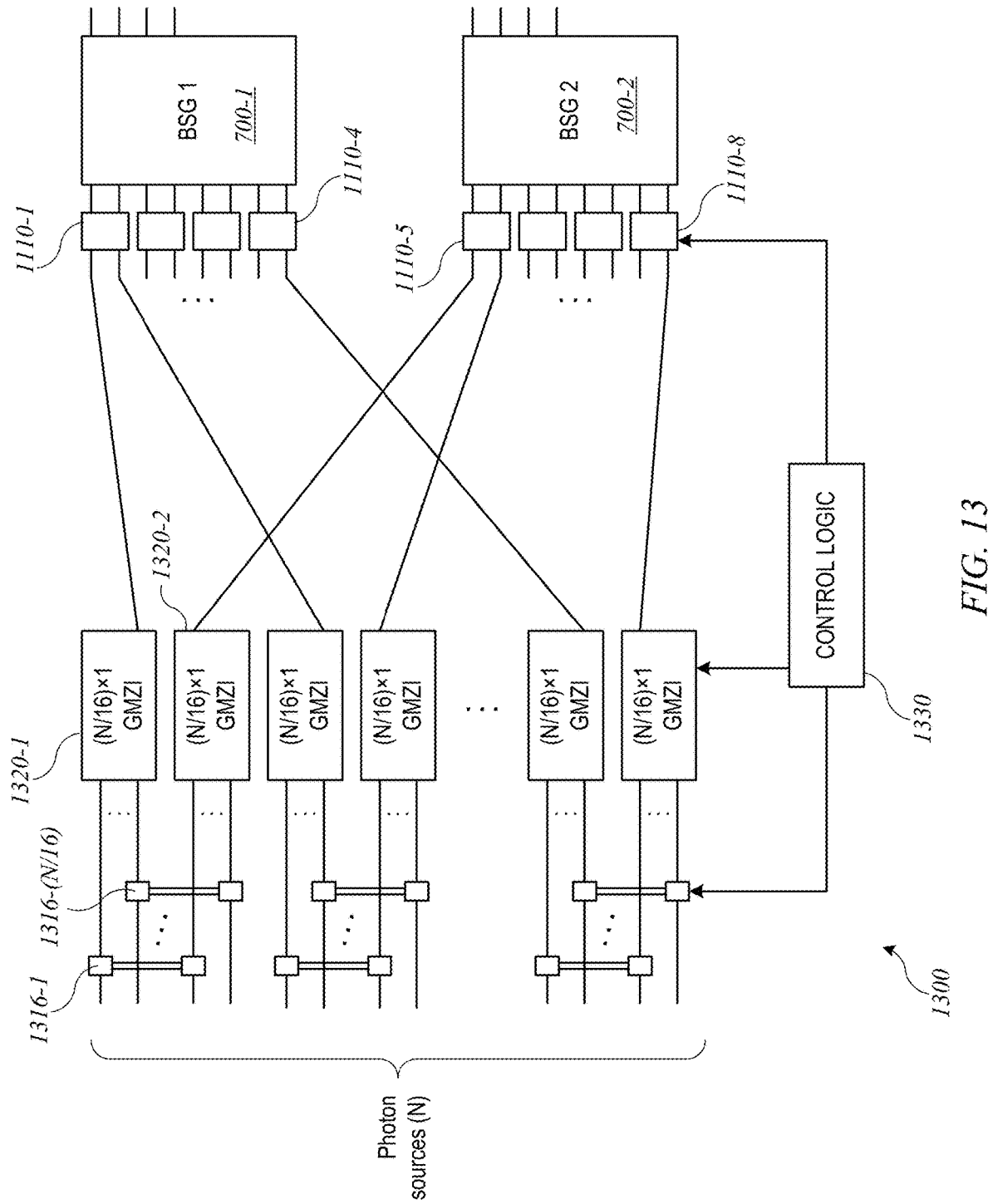
FIG. 13 shows a simplified schematic diagram of an optical circuit according to some embodiments.

FIG. 13 shows a simplified schematic diagram of an optical circuit 1300 according to some embodiments. Like circuit 1200, circuit 1300 includes two Bell state generator circuits 700-1 and 700-2, each of which can be implemented as described above. (Bell state generator 700' of FIG. 11B or other circuits can be substituted). Bell state generator circuits 700-1 and 700-2 can operate concurrently on input photons generated by a set of N photon sources (not explicitly shown in FIG. 13). Inputs of each Bell state generator 700 can be coupled to a set of four 2×2 muxes 1110 as described above. In circuit 1300, each input of each mux 1110 is coupled to the output of a different one of a set of (N/16)×1 multiplexer circuits 1320, each of which can be implemented using a GMZI or other active switching network coupled to a different subset of N/16 of the photon sources. Additional 2×2 muxes 1316 are coupled between inputs of pairs of mux circuits 1320, downstream of the photon sources. Muxes 1316 can be controlled by control logic 1330 to rearrange the photons generated by the N photon sources between pairs of mux circuits 1320. For example, if two of the photon sources coupled to mux circuit 1320-1 each generate a photon and none of the photon sources coupled to mux circuit 1320-2 generates a photon, one of muxes 1316-1 through 1316-(N/16) can be activated to reroute one of the two photons so that instead of entering mux circuit 1320-1, the photon enters mux circuit 1320-2. Muxes 1316 can increase the probability of at least four of mux circuits 1320 generating a photon, which increases the probability that four photons can be delivered to at least one of Bell state generator circuits 700.

Figure 14:
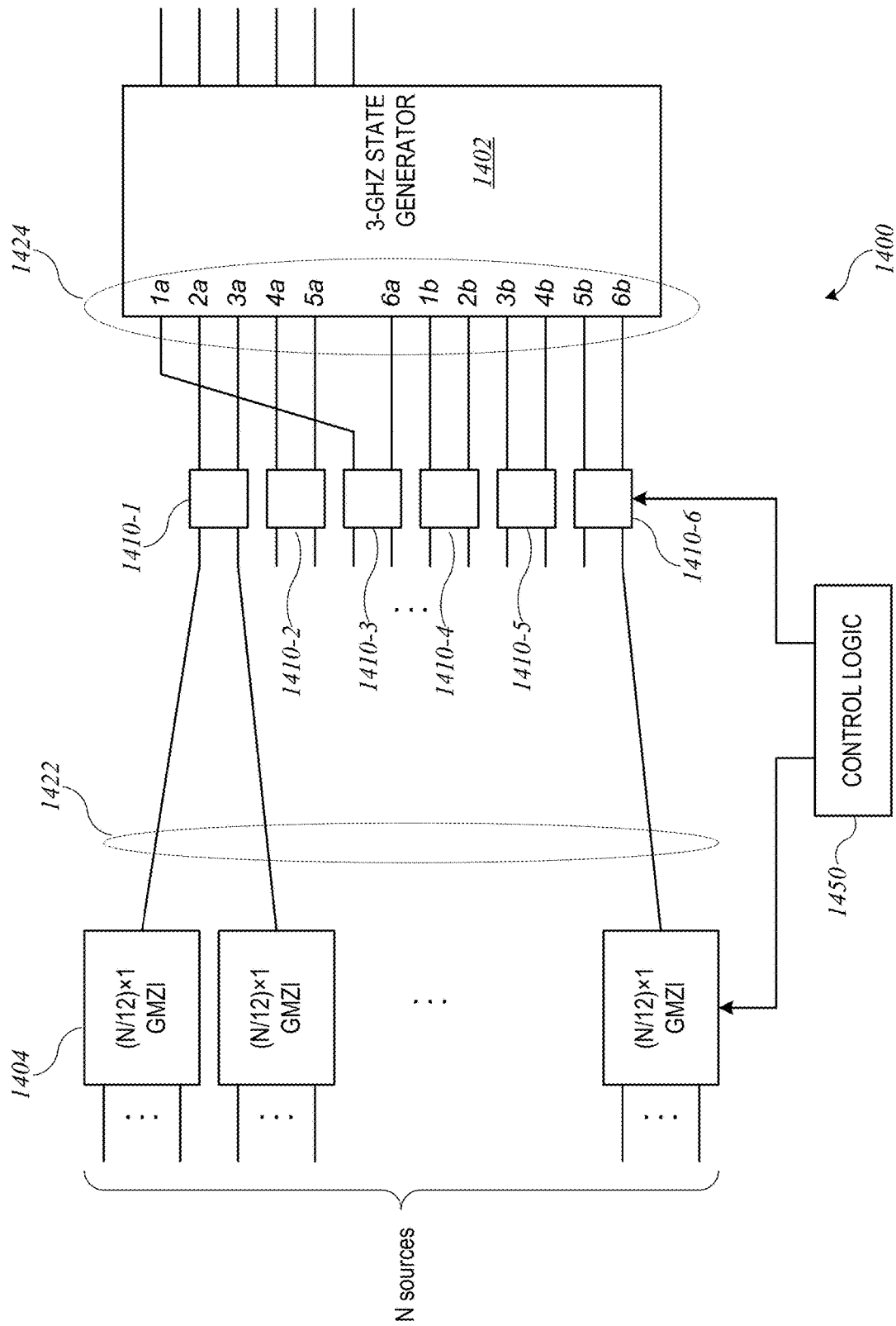
FIG. 14 shows a simplified schematic diagram of an optical circuit according to some embodiments.

While the previous examples illustrate the use of 2×2 muxes to increase the probability of providing a usable input state for a Bell state generator circuit, other embodiments can apply a similar principle to other circuits that operate on groups of photons. For example, FIG. 14 shows a simplified circuit schematic of an optical circuit 1400 according to some embodiments. Circuit 1400 includes a 3-GHZ state generator circuit 1402 that can generate a 3-GHZ state of dual-rail encoded qubits from a group of six input photons. (A 3-GHZ state is described above with reference to Eqs. (7) and (8).) A full description of structure and operation of 3-GHZ state generator circuit 1402 is omitted; for purposes of understanding the present disclosure, it suffices to understand that 3-GHZ circuit 1402 includes twelve input waveguides 1424, individually labeled for convenience as 1a-6a and 1b-6b. Similarly to Bell state generator circuits described above, the input waveguides can be considered as paired (waveguide 1a is paired with waveguide 1b, waveguide 2a with waveguide 2b, etc.), and a usable input state for 3-GHZ circuit 1402 (i.e., an input state that allows 3-GHZ circuit 1402 to generate a 3-GHZ state) has exactly one photon in each pair of input waveguides. Since the choice of which input waveguide in a pair is occupied can be made independently for each pair of waveguides, 3-GHZ circuit has $2^6$=64 usable input states. There are 924 distinct ways to distribute six photons across 12 waveguides. Similarly to circuit 1100 described above, circuit 1400 can be designed to support rearrangement of six photons at outputs 1422 of mux circuits 1404 into one of the 64 usable input states.

To provide photons to 3-GHZ circuit 1402, a number N of photon sources (e.g., heralded single-photon generators as described above) can be provided to a set of twelve multiplexer circuits 1404. Each multiplexer circuit 1404 can be a (N/12)×1 multiplexer circuit and can be implemented using a GMZI. A set of six 2×2 muxes 1410 is disposed between the outputs 1422 of mux circuits 1404 and the inputs 1424 of 3-GHZ circuit 1402. Each 2×2 mux 1410 can be implemented, e.g., using a Mach-Zehnder interferometer (MZI). Each mux 1410 has two inputs coupled to a different pair of multiplexer circuits 1404 and two outputs coupled to two different input waveguides 1424 of GHZ circuit 1402 that belong to different pairs. In the example shown, mux 1410-1 has output modes coupled to input waveguides 2a and 3a of 3-GHZ circuit 1402. Mux 1410-2 has output modes couples to input waveguides 4a and 5a. Mux 1410-3 has output modes coupled to input waveguides 6a and 1a. Mux 1410-4 has output modes coupled to input waveguides 1b and 2b. Mux 1410-5 has output modes coupled to input waveguides 3b and 4b. Mux 1410-6 has output modes coupled to input waveguides 5b and 6b.

Like 2×2 muxes 1110 for Bell state generator circuits described above, 2×2 muxes 1410 can be used to rearrange photons from mux circuits 1404, increasing the number of distributions of photons that can result in a usable input state for 3-GHZ circuit 1402. Each mux 1410 can direct a photon to either of two inputs to 3-GHZ circuit 1402, thereby enabling more of the 924 possible distributions of four photons across 12 waveguides to be used. For the arrangement of muxes 1410 shown in FIG. 14, it can be shown that 666 of the 924 possible distributions (or patterns) of six photons at the outputs 1422 of mux circuits 1404 can be rearranged by operation of muxes 1410 into one or another of the 64 usable input states at 3-GHZ circuit inputs 1424. Further, if blocking switches are used to prevent photons from entering more than six of 3-GHZ circuit inputs 1424, distributions with more than six photons at the outputs 1422 of mux circuits 1404 can also be used to provide usable input states.

As with muxes 1110 in circuit 1100, the particular pattern of connections between muxes 1410 and inputs 1424 of 3-GHZ circuit 1402 determines how many of the possible distributions of six photons at the outputs 1422 of mux circuits 1404 can yield usable input states at 3-GHZ circuit inputs 1424. As described above 3-GHZ circuit 1402 has six pairs of inputs, where "pair 1" includes waveguides 1a and 1b, "pair 2" includes waveguides 2a and 2b, etc.). With the connections shown in FIG. 14, mux 1410-1 can deliver photons to input waveguide 2a of pair 2 and to input waveguide 3a of pair 3; mux 1410-2 can deliver photons to input waveguide 4a of pair 4 and to input waveguide 5a of pair 5; mux 1410-3 can deliver photons to input waveguide 1a of pair 1 and to input waveguide 6a of pair 6; mux 1410-4 can deliver photons to input waveguide 1b of pair 1 and to input waveguide 2b of pair 2; mux 1410-5 can deliver photons to input waveguide 3b of pair 3 and to input waveguide 4b of pair 4; and mux 1410-6 can deliver photons to input waveguide 5b of pair 5 and to input waveguide 6b of pair 6. In this manner, each pair of inputs of 3-GHZ circuit 1402 is coupled to two different muxes 1410, and each mux 1410 is coupled to two different upstream circuits (in this case, two different (N/12)×1 multiplexer circuits 1404. This configuration allows a given pair of inputs 1424 of 3-GHZ circuit 1402 to receive a photon from any one of four different upstream circuits and allows a photon form a given upstream circuit to be delivered to any one of two pairs of inputs 1424 of 3-GHZ circuit 1402. Thus, in a case where one pair of input waveguides 1424 would (in the absence of muxes 1410) receive two photons, one of the two photons can be rerouted to either of two other pairs of input waveguides. For instance, if the pattern of photons at the outputs 1422 of mux circuits 1404 is such that inputs 1a and 1b would both receive photons in the absence of switches 1410, the presence of switches 1410 can be used to reroute one of those photons either to input 6a (using switch 1410-3) or to input 2b (using switch 1410-4), depending on which of input pairs 6 or 2 would not otherwise receive any photon. In this manner, 666 of the 924 possible distributions of six photons at the outputs 1422 of mux circuits 1404 can be rearranged by muxes 1410 to provide usable input states at the 3-GHZ circuit inputs 1424. It is noted that other arrangements of muxes 1410 can also allow an "extra" photon associated with one pair of inputs 1424 to be rerouted to either of two other pairs, and any such arrangement can be used. In some embodiments, additional 2×2 muxes or switches can be added to allow some or all of the remaining 258 possible distributions of six photons at the outputs 1422 of mux circuits 1404 to be rearranged into a usable input state at 3-GHZ circuit inputs 1424. For instance, an additional set of 2×2 muxes can be provided upstream of muxes 1410 (e.g., analogous to switches 1216 of FIG. 12 or switches 1316 of FIG. 13) to further increase the probability of providing a usable input state to 3-GHZ circuit 1402.

Bell state generator 700 and 3-GHZ circuit 1402 are examples of "entanglement circuits" that can generate entangled quantum states from a set of single-photon inputs. Entanglement circuits such as these examples can be understood as operating on qubits represented using a dual-rail encoding, with each qubit encoded on a pair of waveguides as described above. For some types of entanglement circuits, a usable input state can be an input state that corresponds to a set of qubits entering the entanglement circuit in a known logical state (which, for each qubit, can be either logical 0 or logical 1). For a dual-rail encoding, inputting a qubit in a known logical state corresponds to inputting a photon in one or the other (but not both) of a pair of input waveguides, and a usable input state can be an arrangement of photons such that exactly one of the pair of waveguides encoding each qubit is occupied by a photon, as in the Bell state generator and 3-GHZ circuits used in examples above. If photons from a set of non-deterministic photon sources that operate independently of each other are input to the input waveguides, some patterns of photons will correspond to usable input state and others will not. Providing 2×2 muxes between pairs of the photon sources and the input waveguides of the entanglement circuits, as shown in FIGS. 11A, 111B, and 12-14, can allow at least some initially-generated patterns of photons (e.g., photons at the outputs of a set of N×1 multiplexer circuits as shown in FIG. 9A) that do not correspond to a usable input state to be rearranged into a different pattern of photons that does correspond to a usable input state. To optimize the number of patterns of photons that can be rearranged into usable input states, the 2×2 muxes can be coupled to the inputs such that an "extra" photon in the original pattern (e.g., a photon that would result in photons entering both input waveguides of the same pair of input waveguides) can be rerouted to either of two other pairs of input waveguides. By increasing the number of patterns of generated photons that result in usable input states, this optical switching technique can increase the probability that the entanglement circuit generates the desired entangled state. (It should be understood that operation of an entanglement circuit such as a Bell state generator or 3-GHZ circuit may be non-deterministic and that providing a usable input state does not guarantee that the desired entangled state will be produced.) In some embodiments, additional layers of 2×2 muxes can be provided (e.g., switches analogous to switches 1216 of FIG. 12 or switches 1316 of FIG. 13) to further increase the probability of providing a usable input state to the entanglement circuit.

Figure 15:
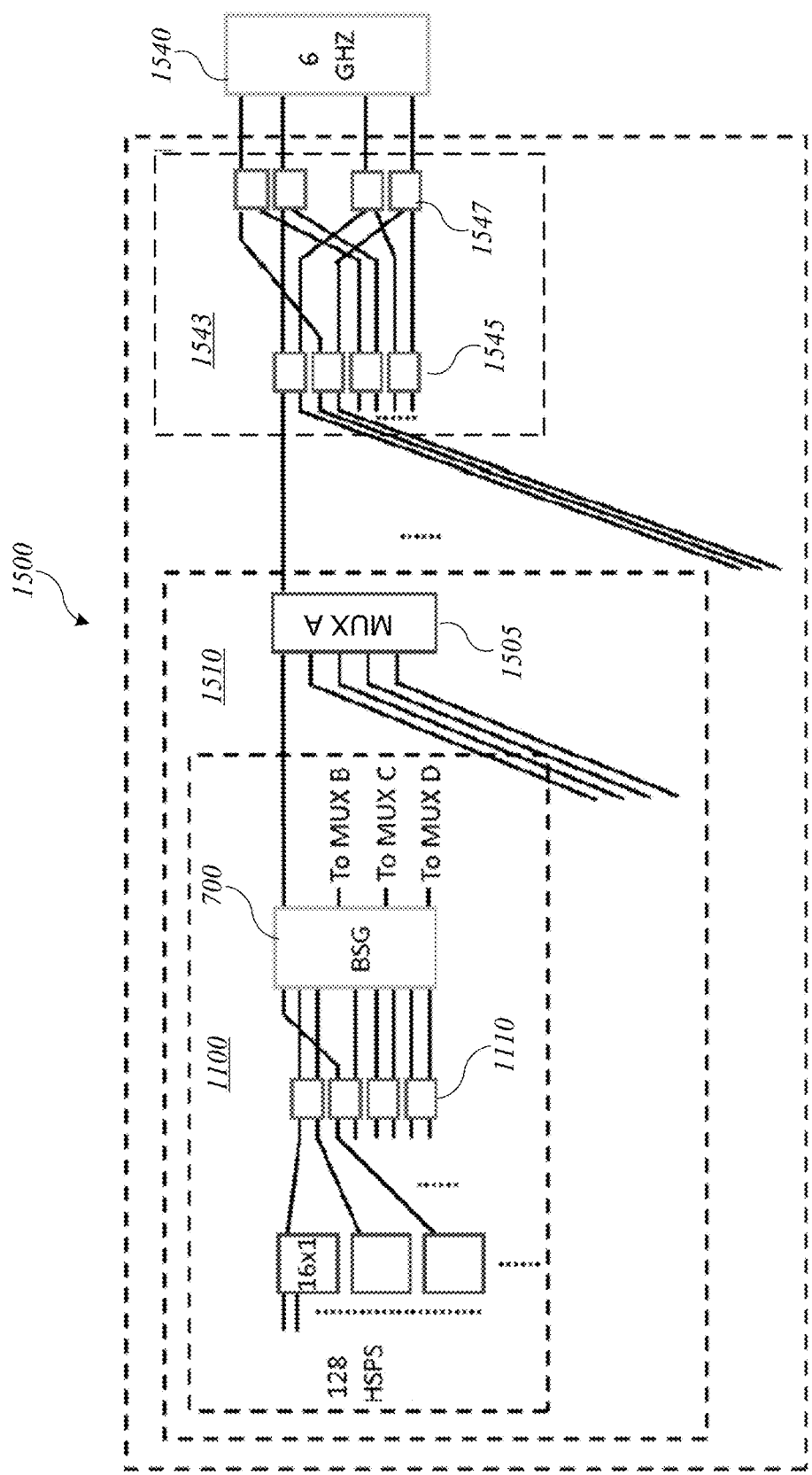
FIG. 15 shows a simplified schematic diagram of an optical circuit according to some embodiments.

In some embodiments, generation of entangled systems of qubits can proceed in stages, and switching techniques of the kind described herein can be applied at each stage. FIG. 15 shows a simplified schematic diagram of an optical circuit 1500 according to some embodiments. Circuit 1500 includes a 6-GHZ circuit 1540 that can generate a 6-GHZ state of dual-rail encoded qubits from a set of four input Bell states. (A 6-GHZ state is an example of an n-GHZ state as described above with reference to Eq. (7)). A full description of structure and operation of 6-GHZ circuit 1540 is omitted; for purposes of understanding the present disclosure, it suffices to understand that 6-GHZ circuit 1540 operates on four dual-rail-encoded Bell states.

FIG. 15 shows a portion of circuit 1500 that can provide four Bell states as input to 6-GHZ circuit 1540. Circuit 1500 includes a number of instances of a subcircuit 1510. Each instance of subcircuit 1510 includes a set of instances of circuit 1100 of FIG. 11A (which includes Bell state generator 700 and 2×2 muxes 1110) and a set of four multiplexers 1505, also referred to as "MUX A," "MUX B," "MUX C," MUX D." For clarity of illustration, only MUX A 1505 is shown; couplings to MUX B, MUX C, and MUX D are indicated by labels on the outputs of Bell state generator 700. In this example, each instance of subcircuit 1510 includes five instances of circuit 1100, and each multiplexer 1505 is a 5×1 multiplexer. The Bell state generator 700 in each instance of circuit 1100 provides four output waveguides. Each output waveguide is coupled to a different one of the four multiplexers 1505. Operation of multiplexers 1505 can be coordinated so that, for a given time bin, all four multiplexers 1505 select inputs corresponding to outputs of the same Bell state generator 700. Thus one of five candidate Bell states can be propagated as the output of each instance of subcircuit 1510.

Circuit 1500 can include multiple instances of subcircuit 1510. For example, there can be eight instances of subcircuit 1510 used to provide four Bell states to 6-GHZ circuit 1540. The coupling between the outputs of eight instances of subcircuit 1510 and inputs of 6-GHZ circuit 1540 is shown for one mode of each of the four Bell states. A switching network 1543 includes a first layer of 2×2 muxes 1545 and a second layer of 2×2 muxes 1547. Each mux 1545 has two input modes, each of which is coupled to a different instance of MUX A 1505. Similarly to 2×2 muxes 1110 in circuit 1100, muxes 1545 can be used to route corresponding modes of different Bell states (e.g., modes provided by different instances of MUX A 1505) to different inputs of 6-GHZ circuit 1540. Muxes 1547 in the second layer provide additional routing flexibility. Although not expressly shown, switching network 1543 can be duplicated for the outputs of the eight instances of MUX B, MUX C, and MUX D. Accordingly, in some embodiments, a Bell state from any instance of Bell state generator 700 in circuit 1500 can be routed to any one of the four input Bell states of 6-GHZ circuit 1540. Operation of different instances of switching network 1543 can be coordinated to preserve the integrity of the Bell states. That is, 3-GHZ circuit 1540 has groups of four input modes, with each group being treated as a Bell state. Accordingly, all four input modes within a group should be coupled to outputs of the same instance of Bell state generator 700, and this coupling can be provided by coordinated operation of different instances of switching network 1543 (e.g., by providing the same set of control signals to the active optical switches within each instance of switching network 1543).

Circuit 1500 is just one example of using layers of 2×2 muxes at different stages in an optical circuit, including stages such as 6-GHZ circuit 1540 for which the input is an entangled state. Those skilled in the art will appreciate that similar techniques can be applied in a variety of optical circuits.

4. OUTPUT SWITCHING FOR AN EXPANDED BELL STATE GENERATOR

Another approach to increasing the probability of producing a Bell state for a given time bin uses an "expanded" Bell state generator ("BSG") circuit. As used herein, an "expanded BSG circuit" refers to a Bell state generator circuit that includes more than four pairs of input waveguides and more than four directional couplers and that produces a Bell state on a subset of its output waveguides.

4.1. Example Expanded Bell State Generator

Figure 16:
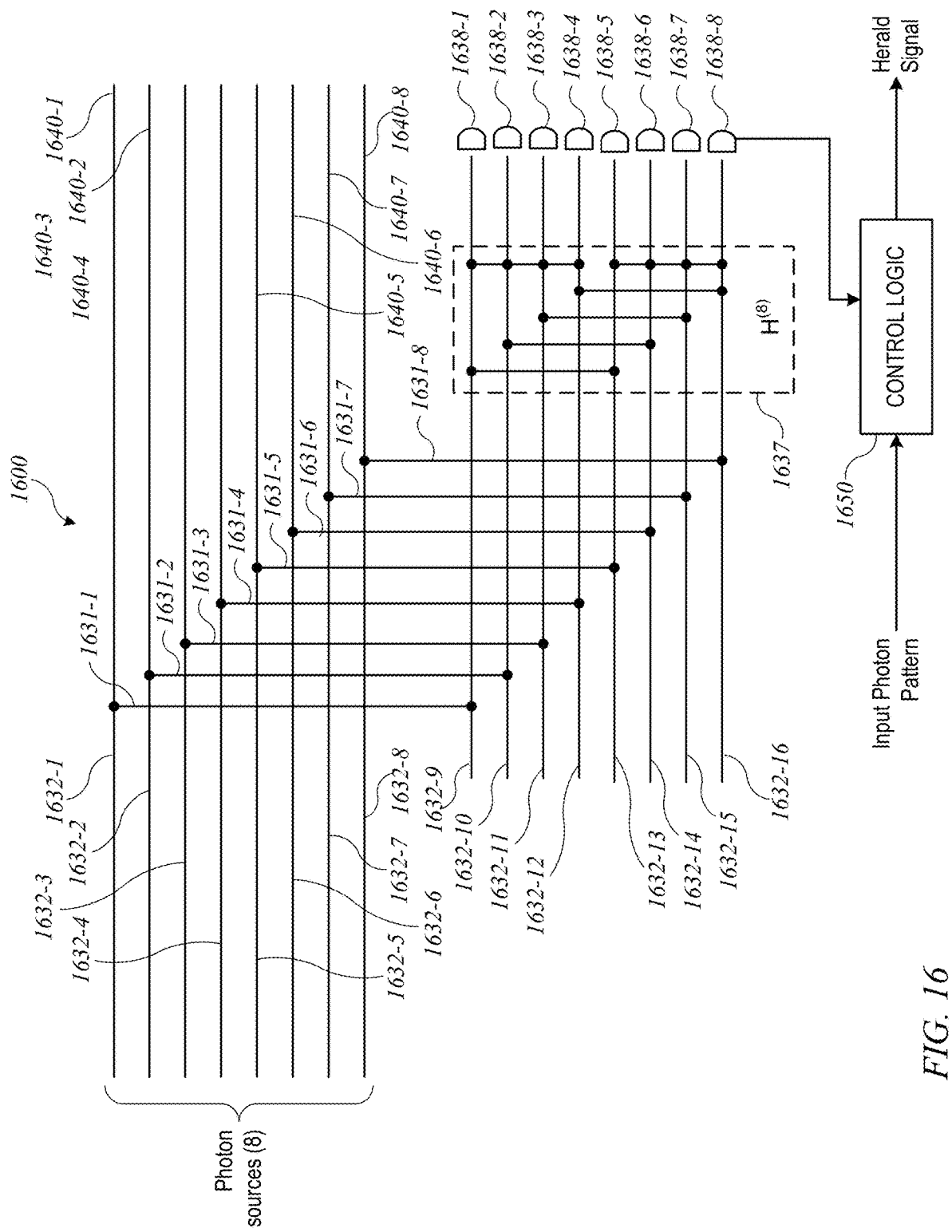
FIG. 16 shows a simplified schematic diagram of an expanded Bell state generator according to some embodiments.

FIG. 16 shows a simplified schematic diagram of an expanded BSG circuit 1600 according to some embodiments. Expanded BSG circuit 1600 has sixteen input waveguides 1632-1 through 1632-16, with each pair of input waveguides 1632-$i$, 1632-($i$+8) (for 1≤$i$≤8) coupled to one of a set of eight directional couplers 1631-1 through 1632-8, each of which can be implemented as described above for directional couplers 731 of FIG. 7. One output of each directional coupler 1631 is coupled to a network 1637 of mode couplers, and the other output of each directional coupler 1631 is propagated as an output mode 1640. Network 1637 can include mode couplers implementing an 8-mode Hadamard transformation (denoted $H^{(8)}$) as described above. A set of eight detectors 1638-1 through 1638-8 is coupled to the outputs of network 1637. In some embodiments, network 1637 can be implemented using a GMZI. Other optical switching networks can be used, provided that network 1637 exhibits the property that a photon entering on any one of the eight inputs to network 1637 has an equal probability of exiting on any one of the eight outputs of network 1637. (In other words, detection of a photon by a particular detector 1638 provides no information as to which one of directional couplers 1631 the photon passed through.) The creation of a Bell state can be heralded by the detection of one photon in each of two detectors 1638. While detectors 1638 do not provide information about which four output waveguides 1640 carry the Bell state, that information can be determined based on which four input waveguides 1632 received photons.

In the example shown, photons from a set of eight photon sources can be provided to input waveguides 1632-1 through 1632-8, so that one input mode of each mode coupler 1631 is coupled to a photon source. The eight photon sources for expanded BSG circuit 1600 can be heralded single photon sources as described above, or each photon source can be the output of an N×1 mux circuit coupled to a set of N heralded single photon sources (e.g., as shown in FIG. 2A). In some embodiments, the photon sources operate non-deterministically, and in a given time bin, any number of photons from 0 to 8 may be produced. Blocking switches (not shown in FIG. 16) can be provided upstream of mode couplers 1631 so that not more than four photons enter mode couplers 1631 in a given time bin. (Examples of input blocking switches for an expanded Bell state generator are described below.)

Control logic 1650 can be implemented using a conventional electronic logic circuit (e.g., as described above with reference to controllers 807-$a$ and 807-$b$ of FIG. 8). Control logic 1650 can receive an input photon pattern indicating which of the eight photon sources produced photons. Control logic 1650 can also receive signals from detectors 1638 indicating whether a photon was detected (and in some embodiments how many photons were detected) by each detector 1638. Based on the pattern of detected photons, control logic 1650 can determine whether a Bell state was created. For example, the creation of a Bell state can be heralded by the detection of one photon in each of two of detectors 1638-1 through 1638-8, and control logic 1650 can determine whether a Bell state is created based on whether one photon was detected in each of two of detectors 1638-1 through 1638-8. If a Bell state is created, control logic 1650 can determine which four of the eight output waveguides 1640-1 through 1640-8 carry the Bell state. While detectors 1638 do not provide information as to which output modes of mode couplers 1637 are occupied by photons, the input photon pattern provides information as to which four mode couplers 1637 received the four photons, and a Bell state, if created, would be carried on the four output waveguides 1640 of the four mode couplers 1637 that received the four photons.

In operation, if four photons arrive simultaneously (i.e., in the same time bin) on any four of input waveguides 1632-1 through 1632-8 in a (spatial) pattern such that exactly one photon is input into four different ones of directional couplers 1631, then four of the eight output waveguides 1640 can carry a Bell state of two qubits. Depending on which four waveguides the photons enter, there are two possible scenarios. In one scenario, the 8-mode Hadamard transfer matrix $H^{(8)}$ implemented by network of mode couplers 1637 can be decomposed into a 4-mode Hadamard transfer matrix $H^{(4)}$ and additional beam splitters $H^{(2)}$, such that a Bell state generator circuit similar to circuit 700 of FIG. 7 can be readily identified in the forward light cone of the photons. An example of this first scenario is shown in FIG. 17A, where input photons arrive via waveguides 1632-1, 1632-3, 1632-5, and 1632-7. The forward light cone (or possible paths) of the input photons through expanded Bell state generator circuit 1600 are shown as solid lines in FIG. 17A, while waveguides or portions thereof that are outside the forward light cone of the input photons are shown as dotted lines. FIG. 17A also shows a decomposition of the 8-mode Hadamard transfer matrix $H^{(8)}$ implemented by network of mode couplers 1637 into a 4-mode Hadamard transfer matrix $H^{(4)}$ (box 1738) and additional beam splitters $H^{(2)}$ (boxes 1739). As can be seen by comparison with FIG. 7, in this scenario, a circuit similar to Bell state generator 700, with an additional detector fan-out (the beam splitters in boxes 1739), can be readily identified. It should be understood that other patterns of photon inputs can also correspond to the first scenario. For example, in the specific implementation shown in FIG. 16, if directional couplers 1637 are assigned numbers 1 through 8, and if a directional coupler 1637 is said to be "active" when it receives one photon as input, then the first scenario obtains for any pattern of input photons for which the bitwise sum (mod 2) of the assigned numbers of active directional couplers adds up to 0. Examples include a pattern in which photons are input into directional coupler numbers (1, 3, 5, 7), as shown in FIG. 17A; a pattern in which photons are input into directional coupler numbers (1, 4, 6, 7); and any other pattern where the sum of the directional coupler numbers of the active directional couplers is even. Where the first scenario obtains, the success probability of expanded Bell state generator circuit 1600 can be the same as the success probability of Bell state generator circuit 700 described above.

Figure 17B:
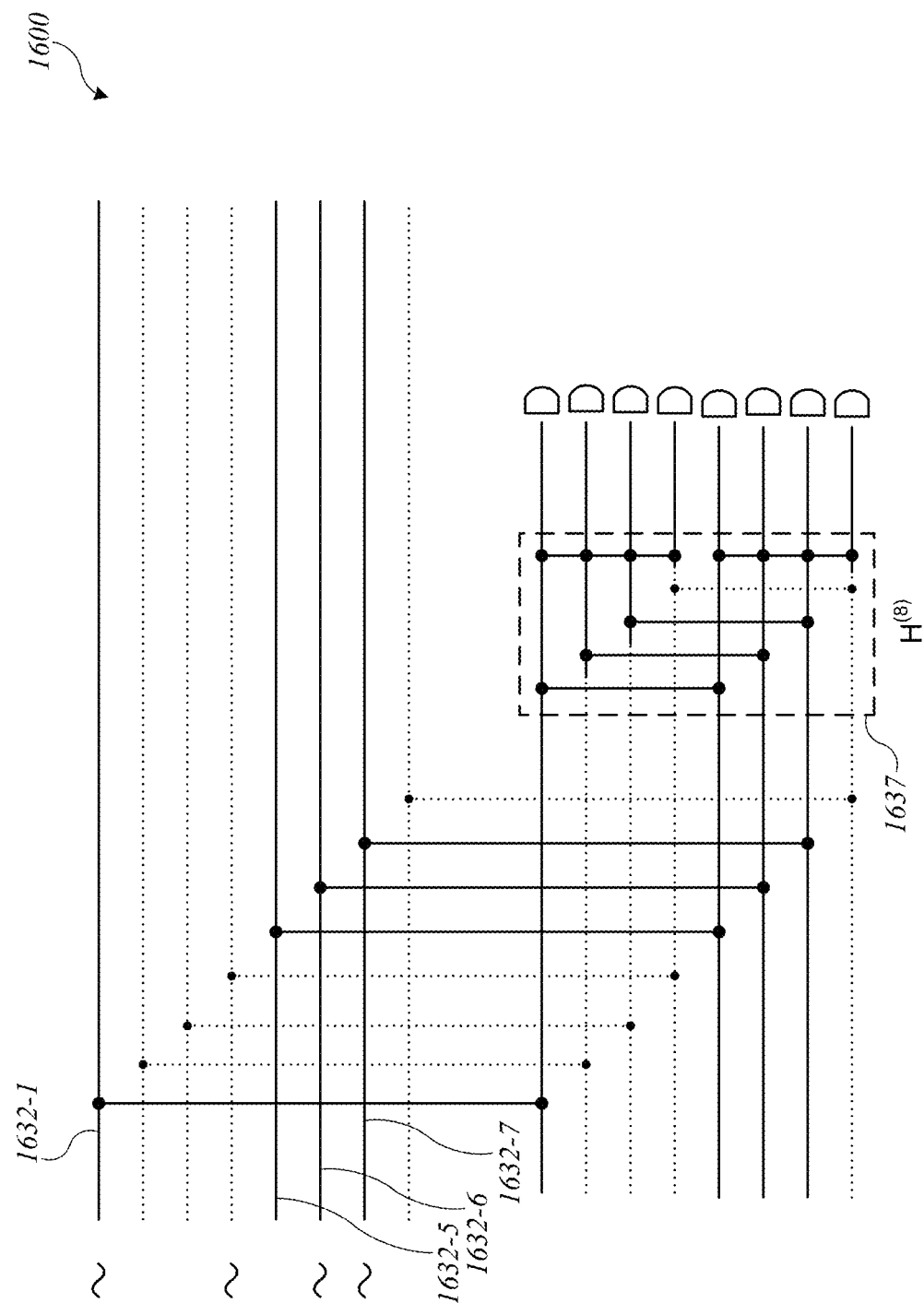

In the other scenario, the 8-mode Hadamard transfer matrix $H^{(8)}$ implemented by network of mode couplers 1637 cannot be decomposed into a 4-mode Hadamard transfer matrix $H^{(4)}$ and additional beam splitters $H^{(2)}$. An example of this second scenario is shown in FIG. 17B, where input photons arrive via waveguides 1632-1, 1632-5, 1632-6, and 1632-7. The forward light cone (or possible paths) of the input photons through expanded Bell state generator circuit 1600 are shown as solid lines in FIG. 17B, while waveguides or portions thereof that are outside the forward light cone of the input photons are shown as dotted lines. In this example, the 8-mode Hadamard transfer matrix $H^{(8)}$ implemented by network of mode couplers 1637 cannot be decomposed into a 4-mode Hadamard transfer matrix $H^{(4)}$ and additional beam splitters $H^{(2)}$. Where the second scenario obtains, Bell states can still be produced, albeit with a lower probability of success (e.g., half the probability of the first scenario).

Referring again to FIG. 16, different detection patterns in detectors 1638 can correspond to different types of Bell states being produced, as with Bell state generator 700 described above. If desired, mode swaps and/or phase shifts can be selectably applied to output modes 1633 in order to cast the Bell state into a particular type (e.g., one of the four two-qubit Bell states defined in Eqs. (3)-(6) above). In some embodiments, such mode swaps and/or phase shifts can be subsumed into subsequent operations without the need for active optical switches to implement selectable mode swapping or phase shifting at the output of expanded Bell state generator 1600.

In the example shown in FIG. 16, photons are (non-deterministically) provided to eight input waveguides 1632-1 through 1632-8, while the other eight input waveguides 1632-9 through 1632-16 are vacuum modes. In some embodiments, photons can be (non-deterministically) provided to all sixteen input waveguides 1632-1 through 1632-16. Blocking switches (not shown in FIG. 16) can be provided on each input waveguide 1632-1 through 1632-16 and controlled so that not more than four photons enter mode couplers 1631 in a given time bin and so that not more than one of the four photons enters any one of mode couplers 1631.

4.2. Additional Expanded Bell State Generators

Figure 18:
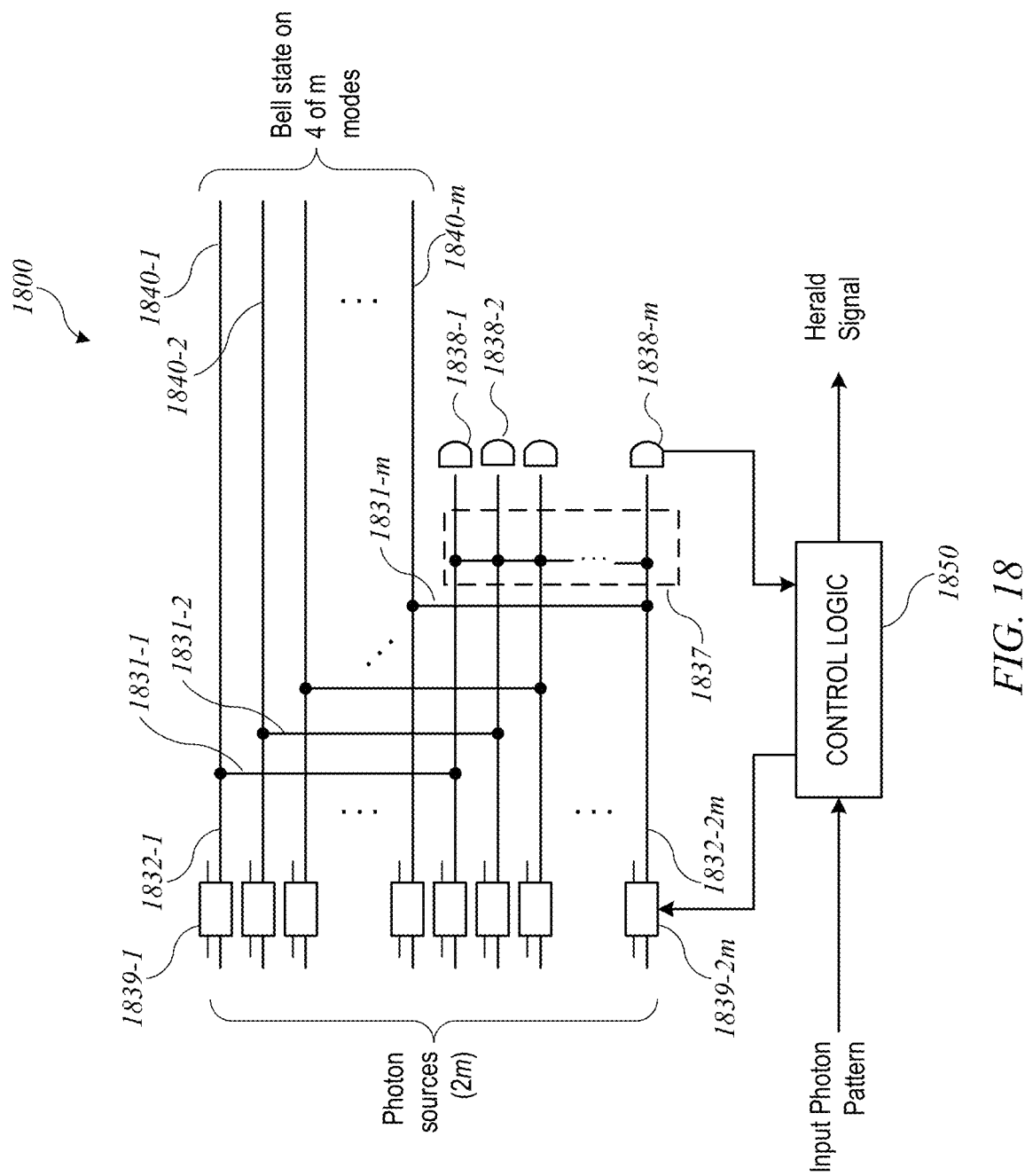
FIG. 18 shows a simplified schematic diagram of an expanded Bell state generator circuit that can be used in some embodiments.

In some embodiments, expanded Bell state generator 1600 can be further expanded to include a larger number of input waveguides and directional couplers. FIG. 18 shows a simplified schematic diagram of an expanded BSG circuit 1800 according to some embodiments. Expanded BSG circuit 1800 has a number 2m of input waveguides 1832-1 through 1832-2m, with each pair of input waveguides coupled to one of a set of m directional couplers 1831-1 through 1831-m, each of which can be implemented as described above for directional couplers 731 of FIG. 7. In the indexing scheme used in FIG. 18A, for 1≤k≤m, input waveguide 1832-k and input waveguide 1832-(k+m) are the pair of inputs to directional coupler 1831-k. The number m can be chosen as desired, as long as m>4. (In the case where m=4, circuit 1800 corresponds to circuit 700 of FIG. 7, and m<4 does not provide enough output waveguides to carry a Bell state in a dual-rail encoding.) In some embodiments, $m=2^q$ for integer q (where q≥3). In the case where q=3 (m=8), expanded BSG circuit 1800 corresponds to expanded BSG circuit 1600. One output of each directional coupler 1831 is coupled to a network 1837 of mode couplers, and the other output of each directional coupler is propagated as an output mode 1840. A set of m detectors 1838-1 through 1838-m is coupled to the outputs of mode-coupler network 1837. Network 1837 can be implemented using one or more GMZIs. In embodiments where $m=2^q$, network 1837 can include a GMZI that implements an m-mode (or qth-order) Hadamard transfer matrix. In other embodiments, for a given value of m, network of mode couplers 1837 can be constructed using an m×m GMZI or other optical switching network that exhibits the property that a photon entering on any one of the m inputs to network 1837 has an equal probability of exiting on any one of the m outputs of network 1837. (In other words, detection of a photon by a particular detector 1838 provides no information as to which one of directional couplers 1831 the photon passed through.) If four photons arrive simultaneously (i.e., in the same time bin) on any four of input waveguides 1832-1 to 1832-2m in a pattern such that exactly one photon is input into four different ones of directional couplers 1831, then four of the m output waveguides 1840 can carry a Bell state of two qubits. The creation of a Bell state can be heralded by the detection of one photon in each of two of detectors 1838-1 through 1838-m. While detectors 1838 do not provide information about which four output waveguides 1840 carry the Bell state, that information can be determined based on which four input waveguides 1832 received photons.

In the example shown, photons from a set of 2m photon sources can be provided to input waveguides 1832-1 through 1832-2m. The 2m photon sources for expanded BSG circuit 1800 can be heralded single photon sources as described above, or each photon source can be the output of an N×1 mux circuit coupled to a set of N heralded single photon sources (e.g., as shown in FIG. 2A). In some embodiments, the photon sources operate non-deterministically, and in a given time bin, any number of photons from 0 to 2m may be produced. Blocking switches 939-1 to 1839-2m can be provided upstream of mode couplers 1831 and can be operated such that not more than four photons enter mode couplers 1831 in a given time bin and so that not more than one photon enters any one of mode couplers 1831.

Control logic 1850 can be implemented using a conventional electronic logic circuit (e.g., as described above with reference to controllers 807-a and 807-b of FIG. 8). Control logic 1850 can receive an input photon pattern indicating which of the 2m photon sources produced photons. If more than four photons were produced, control logic 1850 can operate blocking switches 1839 to select four photons as inputs to Bell state generator circuit 1800. Where more than four photons are available, blocking switches 1839 can be used to select favorable input patterns, which can be patterns for which the probability of successfully generating a Bell state is larger than other patterns. For instance, as described above with reference to FIGS. 17A and 17B, the success probability of an expanded BSG circuit can depend on which four of the directional couplers receive input photons, and the favorable input patterns can correspond to combinations of directional couplers that provide higher success probability.) Operation of blocking switches 1839 can be as described above, and control signals for blocking switches 1839 can be generated based on information as to which photon sources generated photons and knowledge of which input patterns are favorable input patterns. In some embodiments, blocking switches 1839 can be omitted for at least some input waveguides 1832, and other techniques (e.g., sequential triggering of photon sources for different input waveguides 1832, which can be stopped once four photons have been generated) can be used to prevent excess photons from contaminating the result. In some embodiments, instead of blocking switches 1839 at the inputs, blocking switches at a downstream point within expanded BSG circuit 1800 can be used to prevent excess photons from contaminating the result; an example is described below.

Control logic 1850 can also receive signals from detectors 1838 indicating whether a photon was detected (and in some embodiments how many photons were detected) by each detector 1838. Based on the pattern of detected photons, control logic 1850 can determine whether a Bell state was created. For example, the creation of a Bell state can be heralded by the detection of one photon in each of two of detectors 1838, and control logic 1850 can determine whether a Bell state was created based on whether one photon was detected in each of two of detectors 1838. If a Bell state was created, control logic 1850 can determine which four of the m output waveguides 1840-1 through 1840-$m$ carry the Bell state. While detectors 1838 do not provide information as to which output modes of mode couplers 1837 are occupied by photons, the input photon pattern provides information as to which four mode couplers 1837 received the four photons, and a Bell state, if created, would be carried on the four output waveguides 1840 of the four mode couplers 1837 that received the four photons. A herald signal output by control logic 1850 can be a classical electronic signal that can convey any or all of the following information: whether Bell state generation succeeded; which four output waveguides 1840 carry the Bell state (a default signal can be used if Bell state generation did not succeed); and/or whether any of the input photons were received on modes 1832-($m$+1) through 1832-$2m$. As in examples above, whether input photons were received on modes 1832-($m$+1) through 1832-$2m$ can be useful information when determining whether downstream phase shifting and/or mode swapping may be appropriate.

The expanded Bell state generator circuits described herein are illustrative, and variations and modifications are possible. Circuit 1600 can be understood as an implementation of circuit 1800 with m=8. In some embodiments, the source of photons for each input waveguide can be an (N/2m)×1 multiplexer coupled to a set of (N/2m) heralded single photon sources, e.g., as shown in FIG. 9A; accordingly, the number of photon sources can be larger than the number 2m of input waveguides of expanded Bell state generator 1800.

4.3. Output Switching for Expanded Bell State Generators

Expanded BSG circuit 1800 can produce a Bell state on any four of the m output waveguides 1840, depending on which four of the 2m input waveguides 1832 received photons. The four output waveguides 1840 that carry a dual-rail-encoded Bell state for a particular instance of operation can be referred to as the four "rails" of the Bell state. For downstream processing, it may be useful to route the rails of the Bell state onto four specific waveguides. One approach to output routing is to divide the m output waveguides 1840 of expanded BSG circuit 1800 into four groups of m/4 waveguides and use a set of four (m/4)×1 output muxes to reduce the number of waveguides to four. However, a Bell state can be successfully propagated through the four (m/4)×1 output muxes only if each rail is in a different group, which reduces the number of input photon patterns that can be used to generate a Bell state for downstream processing. In some embodiments, a set of 2×2 muxes upstream of expanded BSG circuit 1800 can be used to rearrange the input photon pattern into a pattern that allows a Bell state to be propagated through the four (m/4)×1 output muxes. Implementation can be generally similar to examples described above, e.g., with respect to FIGS. 4A and 4B, albeit with a larger number of switches.

Another approach involves switching at the outputs of the expanded BSG circuit. According to some embodiments, a 2×2 muxing technique can be applied at the output of an expanded BSG circuit (e.g., expanded BSG circuit 1800) to facilitate subsequent output multiplexing to reduce the number of waveguides to four while increasing the number of input photon patterns that can be successfully used.

Figure 19:
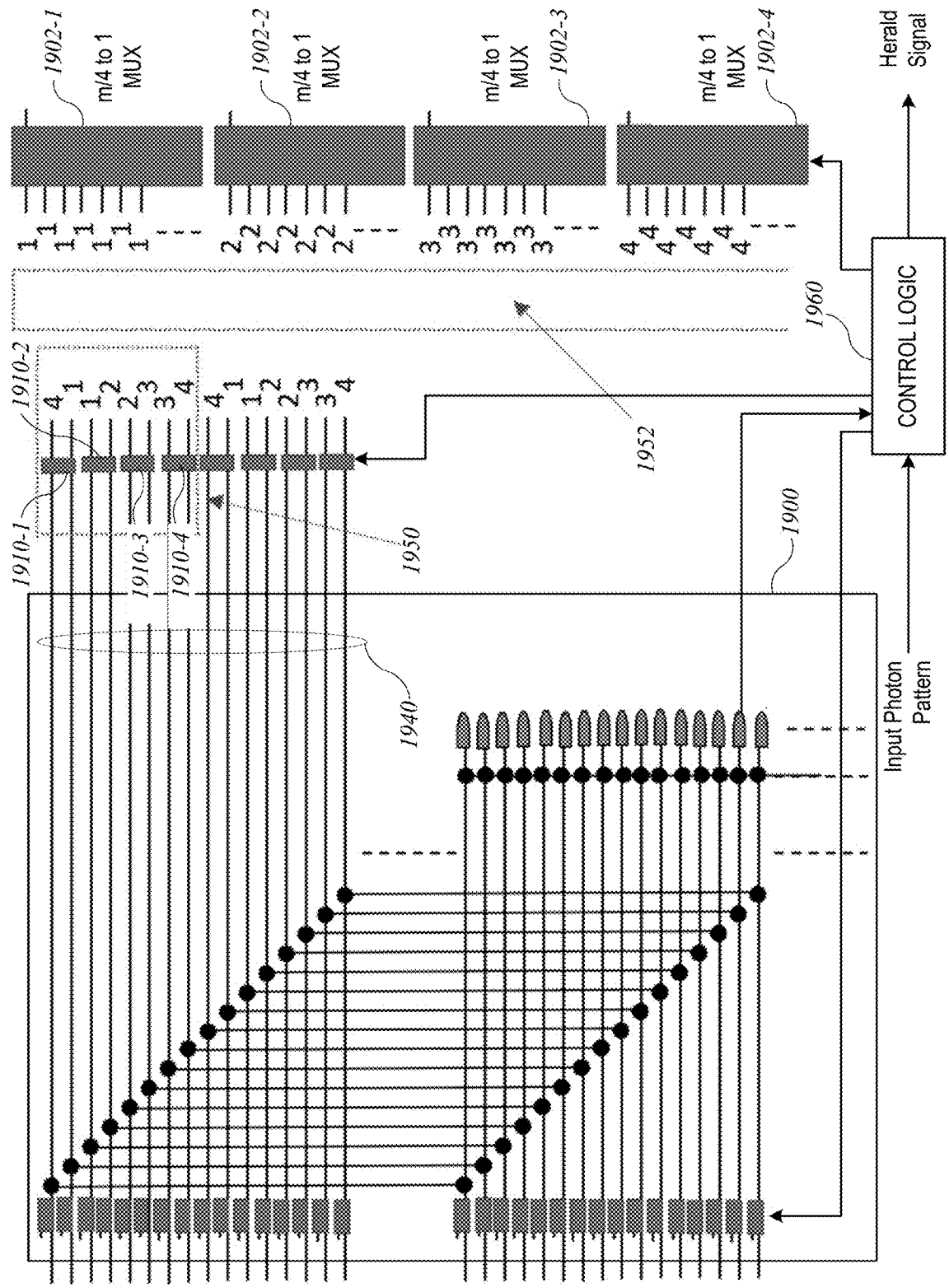
FIG. 19 shows a simplified schematic diagram of an expanded Bell state generator circuit with output switching according to some embodiments.

FIG. 19 shows a simplified schematic diagram of an expanded BSG circuit 1900 with output switching according to some embodiments. Expanded BSG circuit 1900 can be an implementation of expanded BSG circuit 1800. Four (m/4)×1 output multiplexers 1902 are provided to select the four output waveguides 1940 that correspond to the rails of a Bell state for further operations. In some embodiments, a set of 2×2 muxes can be used to increase flexibility in the routing of photons from output waveguides 1940 of expanded BSG circuit 1900 to inputs of multiplexers 1902, increasing the number of input patterns of expanded BSG circuit 1900 for which one the four rails of a resulting Bell state can be routed to each of multiplexers 1902. In the example shown, each group of eight output waveguides 1940 is coupled to a set 1950 of four 2×2 muxes 1910. Each mux 1910 can be implemented as an MZI with inputs coupled to two adjacent output waveguides 1940 and outputs coupled to inputs of two different (m/4)×1 output multiplexers 1902. In FIG. 19, the couplings between outputs of 2×2 muxes 1910 and inputs of (m/4)×1 multiplexers 1902 are indicated using an index (1 to 4) at the end of each output waveguide of each mux 1910. The index (1 to 4) identifies the one of (m/4)×1 multiplexers 1902-1 through 1902-4 to which each output waveguide is coupled. Block 1952 represents a passive crossing network that provides the coupling paths specified by the indices. Within each set 1950 of four adjacent muxes 1910, the same coupling pattern can repeat: the first 2×2 mux 1910-1 has outputs coupled to (m/4)×1 multiplexers 1902-4 and 1902-1, the second 2×2 mux 1910-2 has outputs coupled to (m/4)×1 multiplexers 1902-1 and 1902-2, the third 2×2 mux 1910-3 has outputs coupled to (m/4)×1 multiplexers 1902-2 and 1902-3, and the fourth 2×2 mux 1910-4 has outputs coupled to (m/4)×1 multiplexers 1902-3 and 1902-4. Accordingly, four switch "types" can be defined for muxes 1910: type A has output labels (1,2), type B has output labels (2,3), type C has output labels (3,4), and type D has output labels (4,1). A Bell state on output waveguides 1940 can be successfully rearranged so that one rail is delivered to each of (m/4)×1 multiplexers 1902 in any of the following cases: (1) each rail of the Bell state is received at a 2×2 mux 1910 of a different type (one type A, one type B, one type C, one type D); (2) two rails are received at 2×2 muxes 1910 of a first type (including cases where the two rails are received at the same 2×2 mux 1910) while the other two rails are input to 2×2 muxes 1910 of two other types (e.g., one type A, two type B, one type D); (3) two rails are input to 2×2 muxes 1910 of type A and two rails are input to 2×2 muxes 1910 of type C; and (4) two rails are input to 2×2 muxes 1910 of type B and two rails are input to 2×2 muxes 1910 of type D. In each of these cases, muxes 1910 can be operated so that each of the four rails of the Bell state is provided to a different one of (m/4)×1 multiplexers 1902. Selection of an output for each (m/4)×1 multiplexer 1902 can be determined based on which four output waveguides 1940 of expanded BSG circuit 1900 carry the Bell state and on the switch settings for 2×2 muxes 1910.

Control logic 1960 can be implemented using a conventional electronic logic circuit (e.g., as described above with reference to controllers 807-*a* and 807-*b* of FIG. 8). Similarly to control logic 1850 described above, control logic 1960 can receive an input photon pattern indicating which of the 2m photon sources produced photons and can control the blocking switches of expanded BSG circuit 1900 to select four photons as inputs to expanded BSG circuit 1900. In addition, similarly to control logic 1850, control logic 1960 can receive signals from the detectors of expanded BSG circuit 1900 and can determine, based on the detection pattern, whether a Bell state was created on four of output waveguides 1940. If a Bell state was created, control logic 1960 can determine which four of output waveguides 1940 carry the Bell state.

Based on which four of output waveguides 1940 carry the Bell state, control logic 1960 can determine switch settings for 2×2 muxes 1910 to rearrange the Bell state such that one rail of the Bell state is delivered to each of (m/4)×1 multiplexer circuits 1902.

Figure 20:
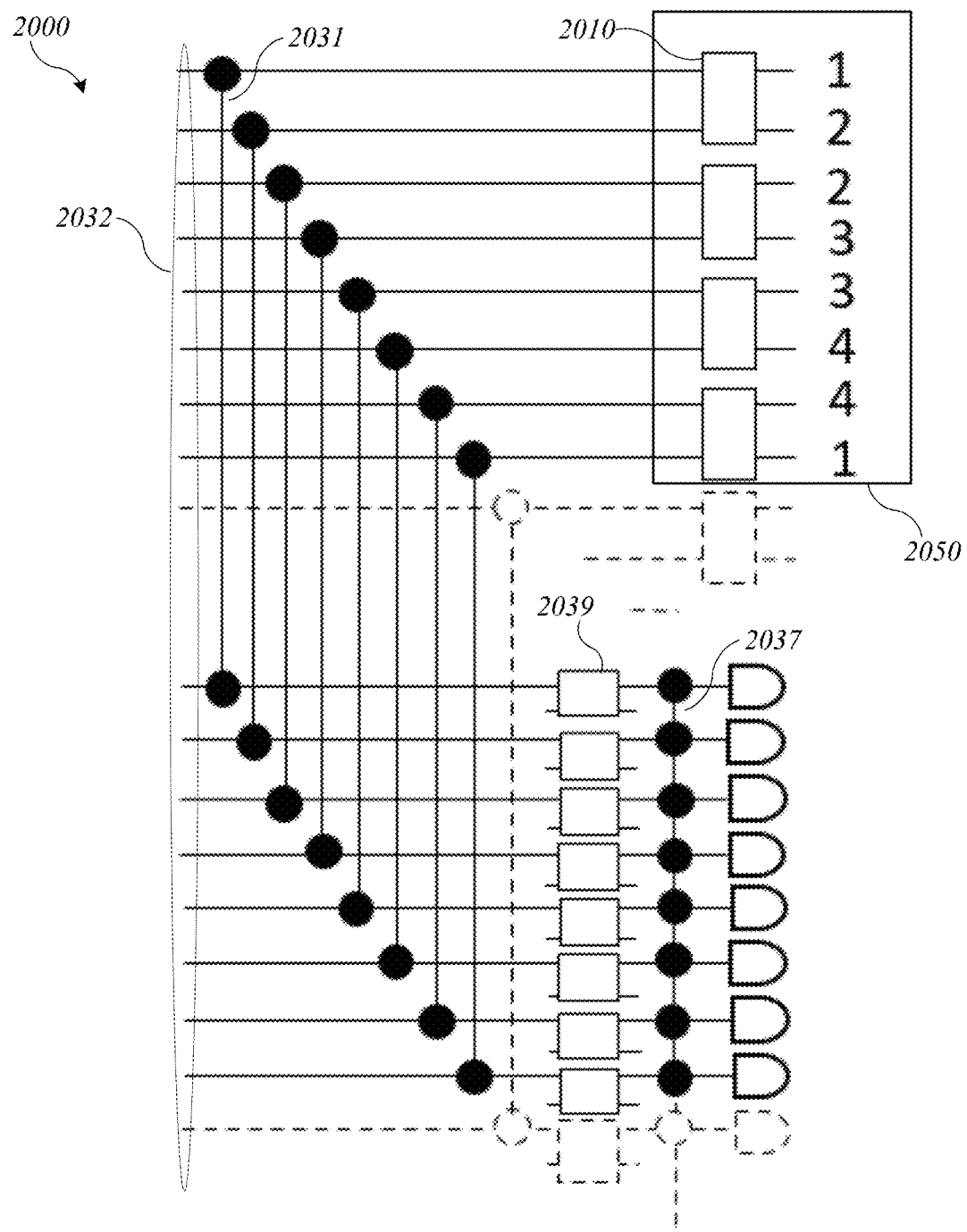
FIG. 20 shows a simplified schematic diagram of an optical circuit according to some embodiments.

In some embodiments, blocking switches 1839 at the inputs to expanded BSG circuit 1800 can be omitted, and blocking switches can be placed elsewhere in the optical circuit. By way of example, FIG. 20 shows a simplified schematic diagram of an optical circuit 2000 according to some embodiments. Circuit 2000 includes an implementation of an expanded BSG circuit similar to expanded BSG circuit 1800. In circuit 2000, however, blocking switches are not present on the 2m input waveguides 2032. Instead, m blocking switches 2039 are disposed between directional couplers 2031 and network of mode couplers 2037. Blocking switches 2039 can be operated to prevent photons from propagating on output waveguides of any directional coupler 2031 that did not receive a photon. Compared to blocking switches 1839 in FIG. 18, which are positioned at the inputs of expanded BSG circuit 1800, the location of blocking switches 2039 in FIG. 20 reduces the number of blocking switches by half, which can also reduce photon loss associated with the presence of the blocking switches. In this example, circuit 2000 also includes 2×2 muxes 2010 at the outputs, arranged in sets 2050, each of which includes four muxes 2010. Muxes 2010 can provide routing similar to muxes 1910 described above. The specific coupling pattern of muxes 2010 in FIG. 20 is slightly different from the coupling pattern of muxes 1910 as shown in FIG. 19, but the underlying principle is the same: each mux 2010 can route photons to two different (m/4)×1 output multiplexers.

5. CONTROL LOGIC IMPLEMENTATION

In some embodiments, control logic such as control logic 1150 of FIG. 11A can determine switch settings for multiplexers and 2×2 muxes based on the pattern of photons produced by a set of N photon sources and the set of usable input states of an entanglement circuit (such as a Bell state generator or 3-GHZ circuit). For example, a truth table can be generated that relates a photon pattern produced by a set of photon sources (which can be determined, e.g., using herald signals generated by heralded single photon sources as described above) to a set of switch settings for the various multiplexing circuits that rearranges the photon pattern into a usable input state for a downstream circuit (or downstream circuit component). A photon pattern can be represented as a string of bits (e.g., bit value of "1" if a photon is present, bit value of "0" if not). In some embodiments, each multiplexer can be controlled by setting the state of one or more internal switches within the multiplexer. Switch settings can be represented using a string of bits, with each bit mapped to a particular switch. For binary switches, one bit per switch can be used. The truth table can be implemented as a lookup table: when a set of input signals representing a photon pattern is received, the photon pattern can be matched to an entry in the lookup table, and the corresponding switch settings can be retrieved.

The complexity of the control logic for a given implementation can be characterized in terms of the number of input bits, number of output bits, and number of entries (or rows) in the lookup table.

Figure 21A:
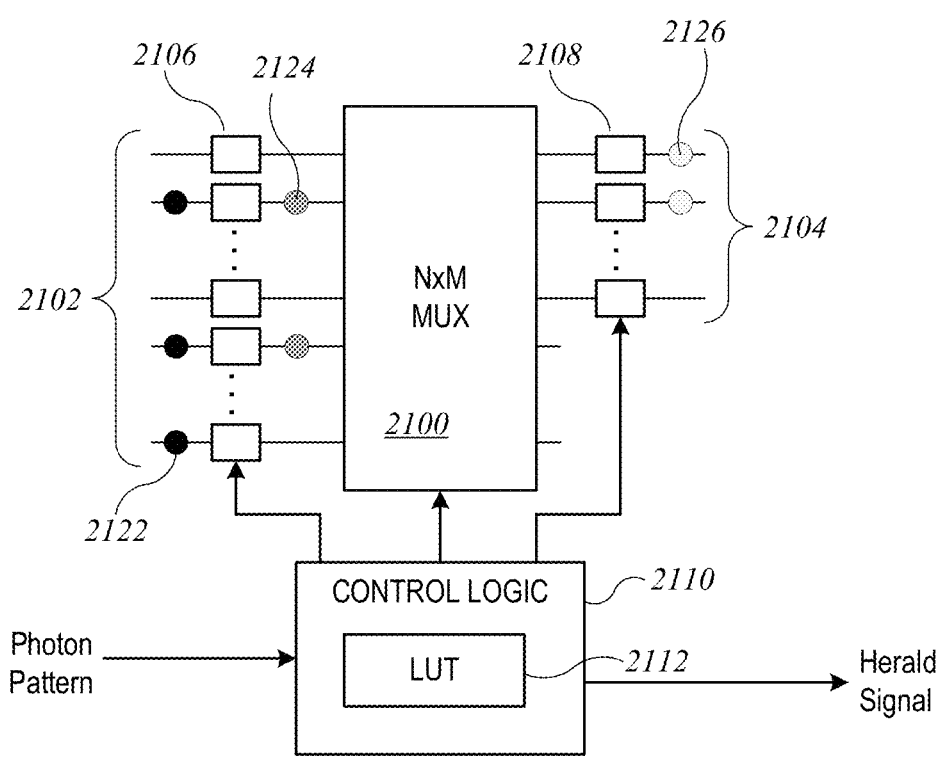
FIGS. 21A-21C illustrate a general approach to implementing a lookup table for a multiplexing circuit according to some embodiments.
Figure 21B:
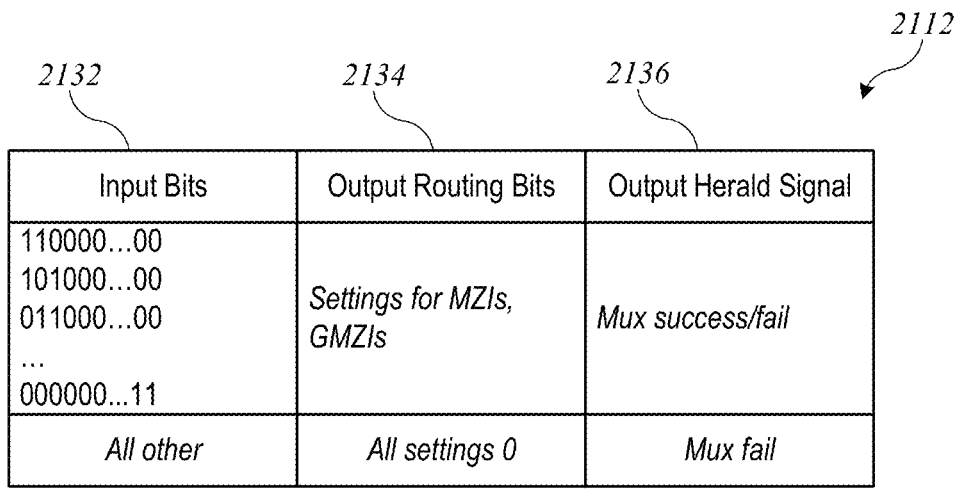
Figure 21C:
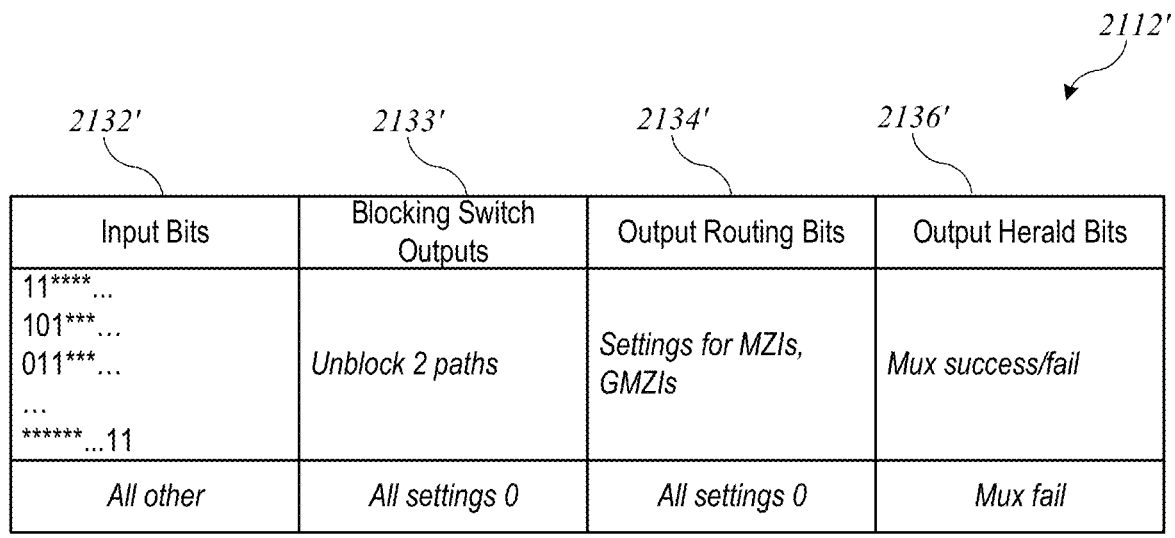

FIGS. 21A-21C illustrate a general approach to implementing a lookup table for a multiplexing circuit according to some embodiments. FIG. 21A shows a generalized N×M mux circuit 2100 according to some embodiments. Circuit 2100 can be, for example, an N×1 multiplexer as shown in FIG. 9A; a layer of 2×2 muxes such as muxes 1110 of FIG. 11A, muxes 1216 of FIG. 12, muxes 1316 of FIG. 13, muxes 1410 of FIG. 14, muxes 1910 of FIG. 19, or muxes 2010 of FIG. 20; a combination of a layer of N×1 multiplexers followed by (or preceded by) 2×2 muxes; or any other N×M multiplexer. Mux circuit 2100 has a set of N input waveguides 2102 and a set of M output waveguides 2104. It is assumed that mux circuit 2100 can be implemented using one or more active optical switches (which can be, e.g., active phase shifters) and that each switch has two states (which can be, e.g., applying a phase shift or not applying a phase shift). In some embodiments, a set of blocking switches 2106 can be provided on input waveguides 2102. Additionally or instead, a set of blocking switches 2108 can be provided on output waveguides 2104.

Control logic 2110, which can be implemented using a conventional electronic logic circuit (e.g., as described above with reference to controllers 807-*a* and 807-*b* of FIG. 8), can include (or access) a lookup table (LUT) 2112. In operation, control logic 2110 can receive an input photon pattern indicating which of input waveguides 2102 are occupied by photons. For instance, the input photon pattern can include a bit received from a heralding detector associated with each photon source as described above. Control logic 2110 can access lookup table 2112 using the input photon pattern to determine a corresponding set of control signals (e.g., switch settings) and can send the control signals to mux circuit 2100 and to blocking switches 2106 and 2108 (if present). In some embodiments, control logic 2110 can also generate a herald output signal, which can be a classical digital logic signal (e.g., one classical bit) indicating whether the mux operation of circuit 2100 succeeded or failed. Success can be signaled if the input photon pattern is one that can be used to produce a usable output state, and failure can be signaled otherwise. Accordingly, the herald output signal can also be determined from lookup table 2112. In some embodiments, the herald output signal can include other information.

For example, the desired output of N×M mux circuit 2100 can include a set of n photons (where n≤M and n≤N) having a particular pattern. In some embodiments where n<N, blocking switches 2106 can be used to reduce the number of input photons to n. In some embodiments where n<M, blocking switches 2108 can be used to reduce the number of input photons to n. In an example illustrated in FIG. 21A, n=2. Input photons (represented by black circles 2122) arrive in a particular pattern corresponding to the input photon pattern. In the example, shown, three input photons are present. Based on the input photon pattern, control logic 2110 can control blocking switches 2108 to block one of the three input photons so that two photons (gray circles 2124) enter N×M mux circuit 2100. Switches within N×M mux circuit 2100 can be operated under control of control logic

2110 to rearrange the two photons onto a desired pair of output paths 2104, as indicated by light circles 2126.

FIGS. 21B and 21C show examples of structures that can be used for lookup table 2112 according to various embodiments. For purposes of illustration, it is assumed that the desired output state consists of n=2 photons distributed in one of a set of one or more usable patterns. FIG. 21B shows a lookup table 2112 for an embodiment in which no blocking switches are present and only input patterns with n=2 photons are accepted. As shown at column 2132, each input photon pattern that includes two photons (patterns with exactly two is) can be represented in the lookup table. For each input pattern, a corresponding set of switch settings for internal components of mux circuit 2110 (e.g., MZIs and/or GMZIs) can be provided at column 2134. In some embodiments, the switch settings can be represented using a bit string with one bit assigned to each switch; the value of the bit determines the state of the switch. In addition, an output herald signal corresponding to the input pattern can be provided at column 2136. The output herald signal indicates success or failure of mux circuit 2100. In some embodiments, not all input patterns having n=2 photons can be rearranged into a usable output pattern, so some entries that indicate two input photons may nevertheless map to a failure output.

In this example, table 2112 can just include entries for input photon patterns from which a usable state can be generated. For instance, table 2112 can include entries for the two-photon input patterns but not for patterns where n 2. In cases where an input pattern does not match an entry in table 2112, control logic 2110 can use a default set of switch settings (e.g., all switch settings 0) and generate a herald signal indicating mux failure, as shown in the last entry of table 2112.

FIG. 21C shows an alternative lookup table 2112' for an embodiment in which blocking switches 2106 and/or 2108 are present and where input patterns with n≥2 photons are acceptable. As shown at column 2132', input patterns can be represented using wildcards (*); a wildcard in a particular bit position indicates that either bit value is treated as a match. Thus for instance, if an input bit pattern is specified in column 2132' as 11**, that pattern would be matched by any input patterns with 1 in the first two positions (including input pattern 110000, 110001, input pattern 110011, etc.). In some embodiments, any input pattern that includes at least two is can be mapped to one of the entries in table 2112'. For each input pattern, a set of blocking switch settings can be provided in column 2133' that unblocks the two of the M input paths that correspond to the two is that are not wildcards and blocks the rest. For instance, if the input pattern matches 11 . . . , then the first two blocking switches 2106 can be set to the unblocked state while other blocking switches 2106 are set to the blocked state; if the input pattern matches 101 . . . , then the first and third blocking switches 2106 can be set to the unblocked state while other blocking switches 2106 are set to the blocked state; and so on. For each input pattern, a corresponding set of switch settings for internal components of mux circuit 2110 (e.g., MZIs and/or GMZIs) can be provided at column 2134', similarly to column 2134 of FIG. 21B. In addition, an output herald signal corresponding to the input pattern can be provided at column 2136', similarly to column 2136 of FIG. 21B. In this example, table 2112' can just include entries for input patterns from which a usable state can be generated. For instance, table 2112' can include entries for patterns with at least two photons (using wildcards to reduce the number of entries) but not for patterns where n<2. In cases where an input pattern does not match an entry in table 2112', control logic 2110** can use a default set of switch settings (e.g., all switch settings 0) and generate a herald signal indicating mux failure.

It should be noted that due to the wildcards, an input photon pattern with more than two photons can match multiple entries in lookup table 2112'. In some embodiments, lookup table access for table 2112' can begin at the first entry. If a matching input bit pattern is found in column 2132', then control logic 2110 can use column 2136' to determine whether the matching input pattern results in success. If so, the matching input pattern can be used to determine settings for blocking switches 2106 (and/or blocking switches 2108) and for the switches of mux circuit 2100. If column 2136' indicates that the matching input pattern results in failure, control logic 2110 can continue searching for matching input patterns until a matching input pattern that results in success is found. If no matching input pattern results in success, then control logic 2110 can use the default set of switch settings (e.g., all switch settings 0) and generate a herald signal indicating mux failure. In some embodiments, the entries in lookup table 2112' can be ordered such that input patterns resulting in the highest probability of success for downstream circuits are searched first.

FIGS. 21A-21C present a general principle of operation that can be applied to any stage of multiplexing in an optical circuit. This principle can be applied to various embodiments described above. For example, referring to FIG. 9B, control logic 950 can access a lookup table similar to table 2112 to control the four (N/4)×1 mux circuits 920. In some embodiments, for each mux circuit 920, a priority encoder can be used to determine a binary number corresponding to the first input port that has a photon. This binary number can be used as the input to a lookup table that provides switch settings to direct the photon from the corresponding input path to the output path. The same lookup table can be used for each mux circuit 920. Each mux circuit 920 can have a herald output indicating whether it succeeds, and the herald output from control logic 950 can indicate success if all four mux circuits 920 succeed.

Similarly, referring to FIG. 10, control logic 1030 can access a lookup table to control the eight (N/8)×1 mux circuits 1020. The lookup table can be similar to the lookup table for control logic 950.

As another example, referring to FIG. 11A, control logic 1150 can access a lookup table for each (N/8)×1 mux circuit 1020, similarly to the lookup table for control logic 950 or 1030. In addition, control logic 1150 can access a separate lookup table that determines switch settings for the set of 2×2 muxes 1110a-1110d. For instance, the lookup table for each (N/8)×1 mux circuit 1020 can include a herald signal indicating success or failure of the mux circuit. The set of herald signals for the eight mux circuits 1020 can be used as the input photon pattern for the set of 2×2 muxes 1110a-1110d. (Thus, the set of 2×2 muxes 1110a-1110d can be regarded as an instance of N×M mux 2100 of FIG. 21A.) If blocking switches are present at the inputs or outputs of 2×2 muxes 1110a-1110d, the same lookup table can provide settings for the blocking switches. In some embodiments, the 256 possible input patterns can be reduced to 66 using wildcards as shown in FIG. 21C.

As yet another example, referring to FIG. 14, control logic 1450 can access a lookup table for each (N/12)×1 mux circuit 1404, similarly to the lookup table for control logic 950 or 1030. In addition, control logic 1450 can access a separate lookup table that determines switch settings for the set of 2×2 muxes 1410-1 through 1410-6. For instance, the lookup table for each (N/12)×1 mux circuit 1404 can include a herald signal indicating success or failure of the mux circuit. The set of herald signals for the twelve mux circuits 1404 can be used as the input photon pattern for the set of 2×2 muxes 1410-1 through 1410-6. (Thus, the set of 2×2 muxes 1410-1 through 1410-6 can be regarded as an instance of N×M mux 2100 of FIG. 21A.) If blocking switches are present at the inputs or outputs of 2×2 muxes 1410-1 through 1410-6, the same lookup table can provide settings for the blocking switches. In some embodiments, the 4096 possible input patterns can be reduced to 666 using wildcards as shown in FIG. 21C.

As still another example, referring to FIG. 18, control logic 1850 can receive an input photon pattern indicating which of the 2m input waveguides of expanded BSG circuit 1800 have photons. Control logic 1850 can access a lookup table to determine settings for blocking switches 1839. As described above, for input photon patterns with more than four photons, the lookup table can be configured to select blocking switch settings that propagate a favorable pattern. The lookup table can include just patterns with four or more photons, and in some embodiments wildcards can be used to reduce the number of entries. In embodiments where multiplexing occurs upstream of expanded BSG circuit 1800 (e.g., where the source of photons for each input waveguide is an (N/2m)×1 multiplexer coupled to a set of (N/2m) heralded single photon sources), control logic 1850 can also access a lookup table usable to control the multiplexers, as described above.

As yet another example, referring to FIG. 19, control logic 1960 can receive an input photon pattern indicating which of the 2m input waveguides of expanded BSG circuit 1900 have photons. Control logic 1960 can access a lookup table to determine settings for blocking switches 1839, for 2×2 muxes 1910, and for (m/4)×1 mux circuits 1902. The lookup table for 2×2 muxes 1910 can have an input pattern indicating which four of the m output waveguides of expanded BSG circuit 1900 carry the Bell state. Herald signals output from control logic 1960 can include whether the Bell state was successfully rearranged by 2×2 muxes 1910, which output waveguides of expanded BSG circuit 1900 carry the Bell state, and whether any mode swaps and/or phase shifts may be appropriate.

The foregoing examples of lookup tables and control logic are illustrative and may be modified. For correct operation of the optical circuit, the control logic should have sufficient time to receive the input photon pattern and set the switches to the desired state before the photons arrive at the switches. This condition can be achieved by providing an appropriate length of waveguide between the heralded single photon sources and the active switches. It should also be understood that active optical switches generally are not lossless, and a herald signal indicating success of a particular circuit does not guarantee that photons are present in the signal waveguides that carry outputs of the particular circuit.

6. GENERALIZED MACH-ZEHNDER INTERFEROMETER (GMZI) IMPLEMENTATIONS

In some embodiments, fast and low-loss optical switch networks can enable scalable quantum information processing using photonic qubits. More specifically, such networks can be employed within a linear-optical quantum computing (LOQC) system, since many such systems relies on non-deterministic processes of single-photon generation, entanglement generation and fusion measurements, and they also have important applications for quantum communications, such as enabling all-photonic quantum repeaters.

Advantageously, one or more embodiments disclosed herein provide for low loss, fast, and minimally-decohering photonic switch networks. Some embodiments provide for switch networks having a minimization of depth and count and are particularly suited for implementations that include active phase shifters, which are historically the largest contributors to the size and amount of noise in switch networks. Examples of switch networks will now be described. Such networks can be used, for instance, in any of the embodiments described above.

Components that can be used in photonic platforms include waveguides, directional couplers, passive and active (fast) phase shifters, crossings, single-photon detectors and heralded single-photon sources (HSPSs). Switch networks can be categorized according to their primary function as follows. N-to-1 (M) muxes (also referred to as N×1 muxes) map one (or multiple M) inputs to designated output ports. The inputs are commonly assumed to be probabilistic and of the same type, although more complicated assumptions apply in some problems. For example, a N-to-4 photon mux extracts groups of four photons from N HSPSs. Sometimes it is necessary to carefully distinguish the number of output (input) ports from the number of principal target outputs (inputs). Most commonly, the excess ports must be populated with the vacuum state, and the switch network is required to access specific distributions ("patterns") of the outputs (inputs) across the ports. We refer to switch networks as permutation networks when their primary purpose is to rearrange (subsets of) inputs, where the inputs should generally be regarded as inequivalent. Furthermore, switch networks are also classified on the basis of the photonic degree of freedom distinguishing their inputs. Schemes based on space and time are the most common, but the use of frequency, orbital angular momentum, and combinations of multiple degrees of freedom has also been proposed.

In some embodiments, Mach-Zehnder Interferometers (MZIs) may be used which are networks that implement identity or swap operations on two inputs. Two possible realizations of this type of circuit are shown in FIGS. 22A and 22B. FIGS. 22A and 22B show building blocks of composite switch networks. FIGS. 22A and 22B show 2-to-2 MZIs that implement identity or swap operations on the inputs. The circuits consist of two directional couplers with an active phase shifter (gray) on one or both arms between them. The push-pull configuration shown in FIG. 22A also has a fixed passive $-\pi/2$ phase shift (white) on one arm and selects between the two operations by setting the top or bottom active phase to $-\pi/2$. The configuration shown in FIG. 22B uses a 0 or $-\pi$ active phase to select the operation. Many switch network architectures are built by connecting multiple MZIs to form various topologies.

The Generalized Mach-Zehnder Interferometer (GMZI) is an extension of an MZI with N>2 inputs and M≥1 outputs, shown in FIG. 22C. This configuration allows a set of permutations to be performed on the inputs, as discussed in further detail below, making this device a powerful block for the construction of composite N-to-1 and N-to-M switch networks. FIG. 22C shows a N-to-M GMZI made of two passive balanced splitter networks (white) and a layer of N active phase shifters (gray). Varying the settings of the active phases selects specific permutations of the N inputs and routes them to M>1 output ports.

There are a number of spatial mux schemes that select one of multiple inputs from distinct locations in space. For example, a N-to-1 GMZI can be used as a mux, since it allows routing of any input to a single output port. The advantages of this scheme are its low constant active phase shifter depth (1) and count (N). However, the total propagation distance and the number of waveguide crossings increase rapidly with N. This downside of the monolithic GMZI structure is obviated by constructing composite switch networks of 2-to-1 MZIs, at the cost of increasing the component depth and count. Two examples of N-to-1 schemes of this kind include the "log-tree" and "chain", both of which can be built with no crossings.

Figure 23A:
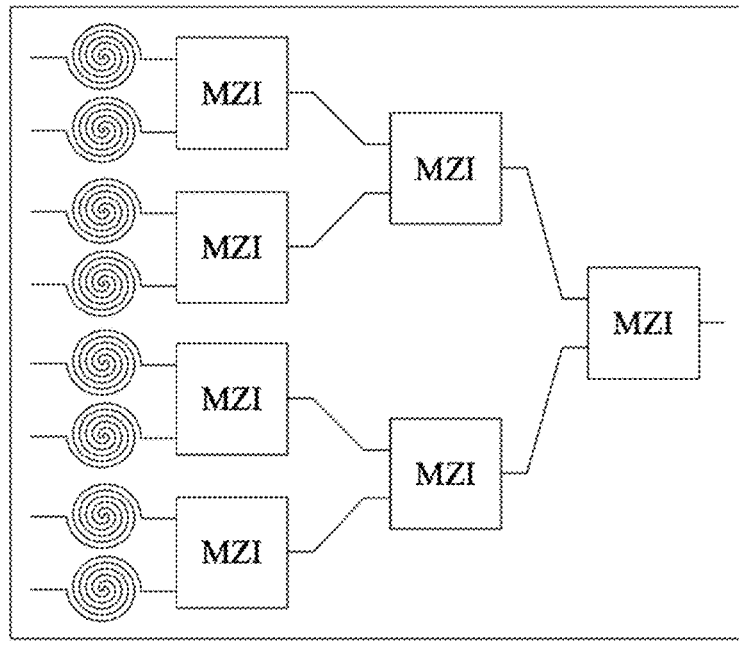
FIGS. 23A and 23B show spatial N-to-1 muxes, with inputs at N spatially-distinct locations (ports), that can be used in some embodiments.
Figure 23B:
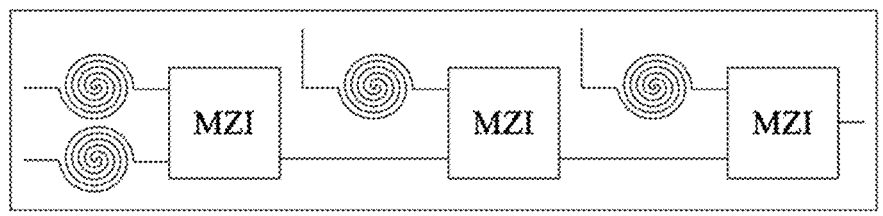

FIGS. 23A and 23B show spatial N-to-1 muxes, with inputs at N spatially-distinct locations (ports). FIG. 23A shows a log-tree mux (N=8 example). 2-to-1 MZIs form a tree structure with $2(2^{\lceil \log_2(N) \rceil}-1)$ active phase shifters arranged in $\lceil \log_2(N) \rceil$ layers. FIG. 23B shows a chain mux (N=4 example). (N−1) MZIs are connected through one output and input to form a line. The active phase shifter count is the same as for the log-tree, but the depth varies between 1 and (N−1).

In a "log-tree", the MZIs form a converging symmetric tree of degree 2, where the chosen input is routed from one of the leaves to the root, as shown in FIG. 23A. An asymmetric variant of this scheme, known as a "chain", includes MZIs cascaded to form a linear topology in which each block selects either the output of the previous block or the new input, as shown in FIG. 23B. The depth of the network traversed by the output depends on the chosen input, which can worsen the interference of resources from different chains, due to imbalanced losses and errors. The switching logic of this scheme presents an interesting advantage: while being very simple and entirely local to each individual MZI, it minimizes the amount of error on by selecting the input available closest to the output. Analysis of these three schemes in the context of single photon multiplexing shows that all three architectures require components with performance well beyond the state-of-the-art to achieve a multiplexing efficiency high enough for use in LOQC.

In temporal multiplexing, resources can be input at the same spatial location but different times, and the aim is to produce an output in a specific time bin. This requires networks with fewer components, but the output time bins become longer. There are two main kinds of temporal schemes: designs with storage devices, such as cavities or fiber loops, and designs based on networks of delays The former simply consist of a storage device and a single 2×2 switch network used to choose whether to store or output each input, as shown in FIG. 24A.

This can be thought of as the temporal version of a chain mux, and it presents the same advantage in terms of switching logic. The log-tree also has a temporal equivalent known as a "binary-division delay network". This scheme consists of a series of MZIs with delays of different lengths between them, as illustrated in FIG. 24B.

Figure 24A:
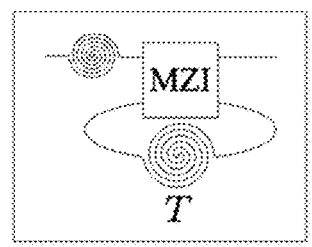
FIGS. 24A and 24B show N-to-1 temporal muxes, with inputs in N distinct time bins, that can be used in some embodiments.
Figure 24B:
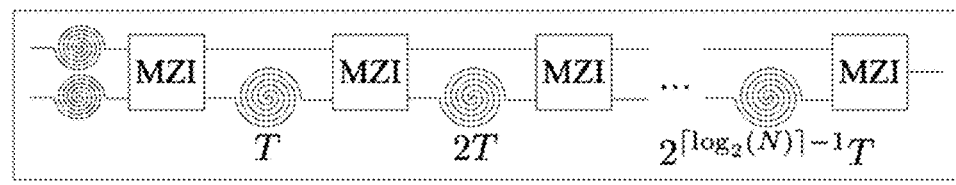

FIGS. 24A and 24B show N-to-1 temporal muxes, with inputs in N distinct time bins. FIG. 24A shows a storage loop scheme (time chain). A 2×2 MZI receives one resource per time bin T and routes it to a storage device (a delay line here) or discards it. After N time bins, the chosen input is output. The number of active phase shifters in the path of the chosen input varies between 1 and N. FIG. 24B shows a binary delay network (time log-tree). The scheme comprises a series of $\lceil \log_2(N) \rceil + 1$ MZIs with delays of lengths $2^n T$ between them, where T is the duration of a time bin at the input and n=0, . . . $\lceil \log_2(N) \rceil - 1$. The active phase shifter depth scales as with the number of input time bins as $\lceil \log_2(N) \rceil$.

The topologies described above can be generalized by replacing each MZI with a GMZI with n inputs, as shown in FIGS. 25A-25D. This introduces a trade-off between the active phase shifter depth and count, which decreases with n, and the number of waveguide crossings and propagation distance within each block, which increases with n. In addition, this modification turns temporal schemes into hybrid networks, where multiple spatially distinct resources are input in each time bin. The trade-offs introduced by the parameter n can be exploited to optimize the structure of these schemes for different regimes of physical error rates.

Figure 25B:
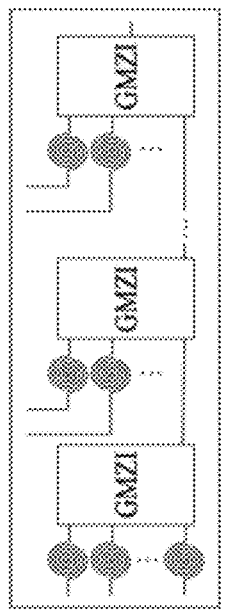
FIGS. 25A-25D show examples of generalized N-to-1 composite multiplexing networks that can be used in some embodiments.
Figure 25C:
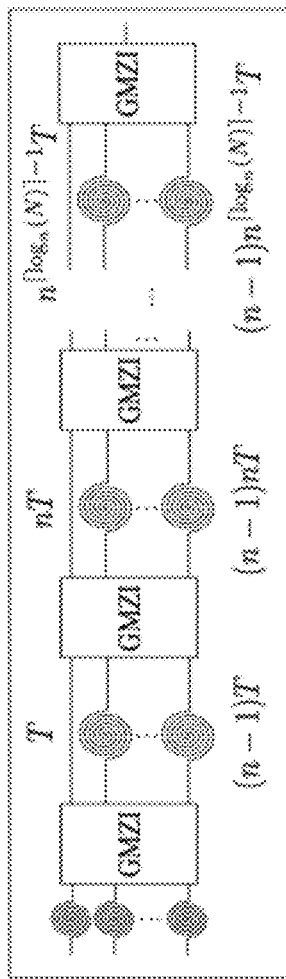
Figure 25D:
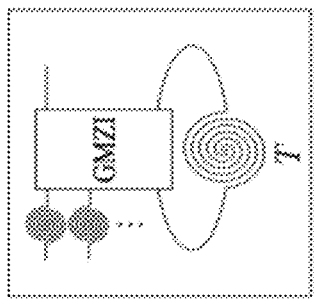
Figure 25A:
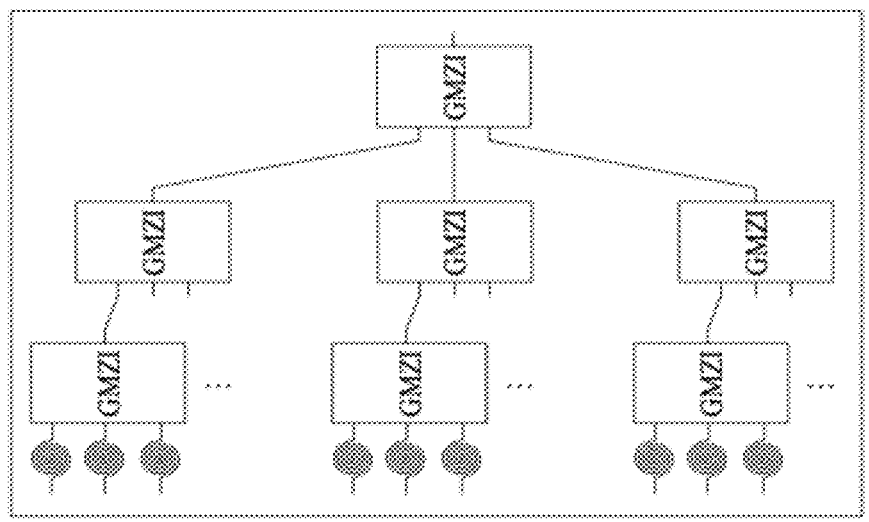

FIGS. 25A-25D show examples of generalized N-to-1 composite multiplexing networks, obtained by replacing the MZI sub-blocks with n×1 GMZIs. FIG. 25A shows a generalized spatial log-tree (n=3 example with some first layer GMZIs omitted for simplicity). The degree of the tree is n and its depth is $\lceil \log_n N \rceil$. FIG. 25B shows a generalized spatial chain. Each stage after the first takes n−1 new inputs, so that the depth of the network varies between 1 and $\lceil (N-1)/(n-1) \rceil$. FIG. 25C shows a generalized delay network (time log-tree). The GMZIs enclose $\lceil \log_n N \rceil$ layers of n−1 delays with lengths $n^i$, . . . $(n-1)n^i$, where i=0, . . . , $\lceil \log_n N \rceil -1$ is the index of the layer of delays. The number of active phase shifters on a path across the scheme is $\lceil \log_n N \rceil + 1$. FIG. 25D shows a generalized storage loop scheme. n−1 inputs enter the GMZI in every time bin. After $\lceil N/(n-1) \rceil$ time bins, the GMZI outputs the chosen input.

In applications such as LOQC, which rely on the interference of multiplexed resources, multiplexing is used to produce synchronized outputs. The schemes described so far achieve this by having a single predetermined output spatiotemporal bin. However, when large output probabilities are needed this leads to a large of resources, which can be understood as follows. The number of available resources for a network of size N follows a binomial distribution with average value $\bar{N}=Np$, where p is the probability of an input being populated. The probability of a network successfully producing an output is then $p_{mux}=1-(1-p)^N$. For the typical situation with large N and small p values, the binomial distribution is well approximated by a Poissonian distribution, and so $p_{mux} \simeq 1 - e^{-Np}$. It follows that the average number of inputs scales as $Np=-\ln(1-p_{mux})$, and so the number of available resources that are not used grows rapidly as $p_{mux}$ approaches 1. An alternative approach that leads to major efficiency improvements is relative multiplexing. Rather than routing resources to single pre-allocated outputs, this technique uses spatial or temporal log-tree networks to synchronize selected inputs in variable space-time locations, chosen depending on the resources available at any particular instant.

N-to-M schemes in the literature are generally based on the spatial degree of freedom. The simplest of these is a GMZI with more than one output, which has the appealing feature of a single layer of N active phase shifters. However, it only gives access to N permutations, and therefore to limited combinations of inputs. Consequently, the N×M GMZI is more useful when used as a permutation network or as a building block for larger schemes. More flexible routing is achieved by using smaller networks to build composite topologies, known as "switch fabrics". However, the component depth and count and the size of the crossing networks of these schemes tend to be large, and these downsides trade against each other, making the networks impractical for use in the field of quantum applications.

Figure 26A:
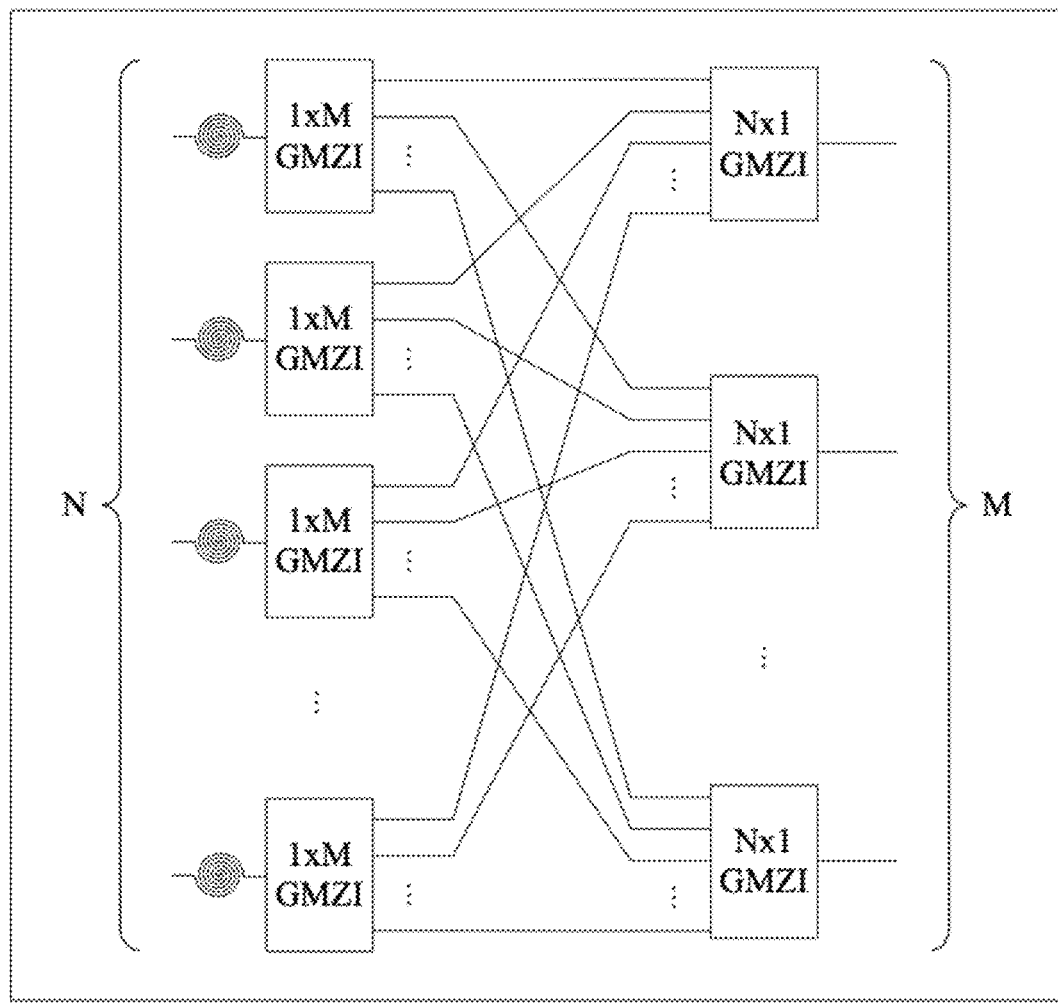
FIGS. 26A and 26B show examples of N-to-M switch networks that can be used in some embodiments.

As an example, Spanke's tree network, shown in FIG. 26A, allows arbitrary rerouting of the inputs with a constant active switch depth of 2, at the cost of a large number of active phase shifters and waveguide crossings. However, the number of active phase shifters and waveguide crossings scales as O(NM). On the other hand, the scheme shown in FIG. 26B avoids large crossing networks, but has an active phase shifter count O(NM) and depth that varies between 1 and M, resulting in variable error rates on the outputs.

Figure 26B:
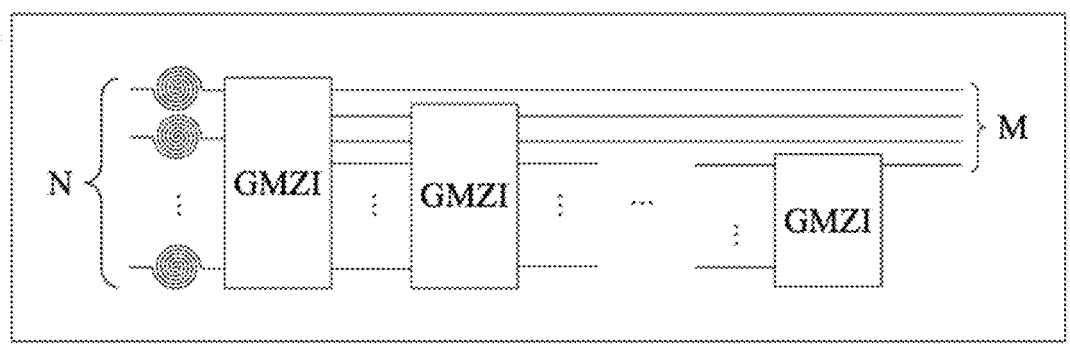

FIGS. 26A and 26B show examples of N-to-M switch networks. FIG. 26A shows a Spanke network. Two layers of interconnected GMZIs allow arbitrary routing of N inputs to M outputs. The fixed active phase shifter depth of 2 makes this scheme interesting, but the scaling of the number of active phase shifters and crossings scaling as (NM) poses challenges for large sizes. FIG. 26B shows a concatenated GMZI. This scheme consists of M concatenated GMZIs with progressively fewer outputs. No complex crossing networks are required between its building blocks, but the O(NM) active phase shifter count and variable depth up to M limit the maximum feasible network size.

For quantum applications, where low error rates are required, N-to-M muxes need to be simplified to reduce the number of active phase shifters, both in total and along the path to the output, as well as the complexity of the crossing networks. The routing algorithms associated with these networks also need to be simplified, to avoid the need for unfeasibly long delays for the inputs. The complexity of the logic is largely determined by its generality, so restricting the operation of the networks to specific tasks is helpful to reduce processing times. These provide guiding principles for the design of additional schemes.

A general switch network implements a set of unitary transfer matrices $U_k$, where each unitary routes light between a subset of input and output ports. If $U_k$ routes light from port t to port s, then its sth row and tth column must be zero apart from $|U_{s,t}|=1$, and similarly for other pairings of input and output ports. The aim of this section is to elucidate the sets of routing operations that are achievable using the simplest form of a many-mode switching network, which is to say one corresponding to transfer matrices $U_k = W D_k V^\dagger$, where the unitary matrices $W$, $V^\dagger$ describe passive interferometers, and the $D_k$ form a set of diagonal phase matrices. The phase matrices are implemented physically using a single layer of fast phase shifters acting on every mode, and for simplicity, we will write D in terms of a phase vector d, $D_{s,t} = d_s \delta_{s,t}$. The discussion below provides a comprehensive treatment of these switch networks and presents several new constructions.

An important class of switch networks is obtained by considering sets of permutation matrices $\{U_k = W D_k V^\dagger\}$. By adding the fixed passive network corresponding to e.g. $U_1^{-1}$ (so, the inverse of an arbitrary permutation from that set), we obtain a new set $\{U_k U_1^{-1}\}\{W D'_k W^\dagger\}$ of pairwise commuting permutation matrices. So it makes sense to restrict the discussion to the case where the $\{U_k\}$ are commuting. Switch networks of this type were introduced above as "generalized Mach-Zehnder interferometers" (GMZIs). Here we need a more precise definition for GMZIs, and we will define them as switch networks having the following specific properties:

(i) $\{U_k = W D_k W^\dagger\}$ is a set of transfer matrices corresponding to commuting permutations of N modes. The entries of $D_k$ are given by roots of unity (up to an overall global phase factor $e^{i\phi_k}$ which can be chosen at will).

(ii) The GMZI switch setting $D_k$ routes light from input port 1 to output port k.

From these properties it is straightforward to prove that the GMZI must have exactly N settings, and that for any choice of input and output port, there is exactly one setting which routes light between the ports.

From a mathematical standpoint, the set of operations implemented by a GMZI on N modes forms an abelian group of order N. This fact is very helpful here as it allows us to characterize the entire family of GMZIs defined by (i), (ii) using well-known results from group theory (namely the basis theorem for finite abelian groups). In particular, for any GMZI, $\{U_k\}$ must be isomorphic to a direct sum of cyclic groups, where the order of each of the cyclic groups is a power of a prime number.

To be more concrete, we define groups of commuting permutations $\mathcal{G}([n_1, n_2, \ldots, n_r])$ generated by matrices $C^{(n_1)} \otimes I^{(n_2)} \otimes I^{(n_3)} \ldots, I^{(n_1)} \otimes C^{(n_2)} \otimes I^{(n_3)} \ldots, I^{(n_1)} \otimes I^{(n_2)} \otimes C^{(n_3)} \ldots$, where $(C^{(n)})_{i,j} = \delta_{i,(j+1 \bmod n)}$ is a cyclic permutation matrix of size n, and $I^{(n_l)}$ is the $n_l \times n_l$ identity matrix, and $\otimes$ is the Kronecker product on matrices (The Kronecker product here acts at the level of linear-optical transfer matrices and should not be confused with tensor product operations on quantum state spaces), and the group operation is matrix multiplication. Then, any GMZI on N modes, satisfying properties (i), (ii) above, must implement a set of permutation operations which corresponds to one of the possibilities for $\mathcal{G}([n_1, n_2, \ldots, n_r])$ with $N = \prod_{l=1}^r n_l$ (up to fixed mode permutations at the input and output).

The different types of GMZIs of fixed size can now be determined using the fact that $\mathcal{G}([n_1, n_2])$ and $\mathcal{G}([n_1 n_2])$ are isomorphic if and only if $n_1$ and $n_2$ are coprime. For example, for N=8, we can identify three fundamentally different types of GMZI.

(i) $\mathcal{G}([2,2,2])$, permutations are generated by Pauli matrices $X \otimes I^{(2)} \otimes I^{(2)}$, $I^{(2)} \otimes X \otimes I^{(2)}$, $I^{(2)} \otimes I^{(2)} \otimes X$.

(ii) $\{\mathcal{G}([4,2])\}$, permutations are generated by matrices $C^{(4)} \otimes I^{(2)}$ where $$C^{(4)} = \begin{pmatrix} & & & 1 \\ 1 & & & \\ & 1 & & \\ & & 1 & \end{pmatrix},$$

and $I^{(4)} \otimes X$.

(iii) $\mathcal{G}([8])$, permutations are generated by matrix $$C^{(8)} = \begin{pmatrix} & & & & & & & 1 \\ 1 & & & & & & & \\ & 1 & & & & & & \\ & & 1 & & & & & \\ & & & 1 & & & & \\ & & & & 1 & & & \\ & & & & & 1 & & \\ & & & & & & 1 & \end{pmatrix}.$$

We refer to GMZIs implementing $\mathcal{G}([2,2,\ldots,2])$, i.e. permutations of the form of swaps on subsets of modes, as "Hadamard-type" GMZIs due the type of passive interferometer which is used (explained below). Similarly, we refer to GMZIs implementing $\mathcal{G}([N])$ as "discrete-Fourier-transform (DFT)-type".

The discussion above characterizes the routing power of linear-optical circuits using one-layer of fast phase shifters in the switch network. In particular, a GMZI on N modes is limited to N routing operations, which is obviously small compared to the N! possible mode rearrangement operations. However, the possibility of implementing different sets of permutation operations is exploited by some of designs for spatial and temporal muxes which are discussed herein. Strictly speaking the limitation to N operations originates in property (ii) above—i.e. the ability to route light from any input port to any output port. More general constructions using a single stage of active phase shifts can be trivially obtained by acting with separate GMZIs on subsets of modes. The resulting transfer matrices are given by the direct sum of the individual GMZIs' transfer matrices. For example, using three MZIs in parallel results in a switch network on 6 modes, allowing 8 different settings. Such a construction can implement abelian groups of permutations of maximum order, which are given in J. M. Burns and B. Goldsmith, Bull. London Math. Soc. 21, 70 (1989), with the number of operations scaling to good approximation as $\sim 3^{N/3}$.

We now turn to linear-optical circuits that can implement the GMZIs defined above. In particular, a circuit that can implement the routing operations $\mathcal{G}[n_1, n_2, \ldots, n_r])$ on $N = \Pi_{l=1}^r n_l$ modes must enact transfer matrices of the form, $$P_k = (C^{(n_1)})^{k_1} \otimes (C^{(n_2)})^{k_2} \otimes \ldots \otimes (C^{(n_r)})^{k_r},$$

with settings vector k where $0 \leq k_l < n_l$ with $l = 1, \ldots, r$. This can be achieved using a circuit with transfer matrices $WD_kW^\dagger$ as follows:

$$W = W^{(n_1)} \otimes W^{(n_2)} \otimes \ldots \otimes W^{(n_r)} \text{ with}$$

$$\left(W^{(n_l)}\right)_{s,t} = \frac{e^{i2\pi st/n_l}}{\sqrt{n_l}},$$

where the $W^{(n_l)}$ are DFT matrices; the kth setting of the fast phase shifters is given by $$D_k = D_{k_1}^{(n_1)} \otimes D_{k_2}^{(n_2)} \otimes \ldots \otimes D_{k_r}^{(n_r)},$$

with $(d_k^{(n)})_s = e^{-i2\pi ks/n}$ for $D_k^{(n)}$.

One route to constructing practical interferometers for W and $W^\dagger$ is to reduce them to networks of beam-splitter and phase-shifter components using generic unitary decompositions from M. Reck et al., Phys. Ref Lett. 73, 58 (1994), or W. R. Clements et al., Optica 3, 1460 (2016). These decompositions have optical depth (number of optical elements encountered on the longest path through the interferometer) scaling as 2N−3 and N respectively. This means that the transmittance along the longest path will scale with an exponent which is proportional to the size parameter N which presents a severe experimental limitation for scaling to large GMZI sizes.

Figure 28A:
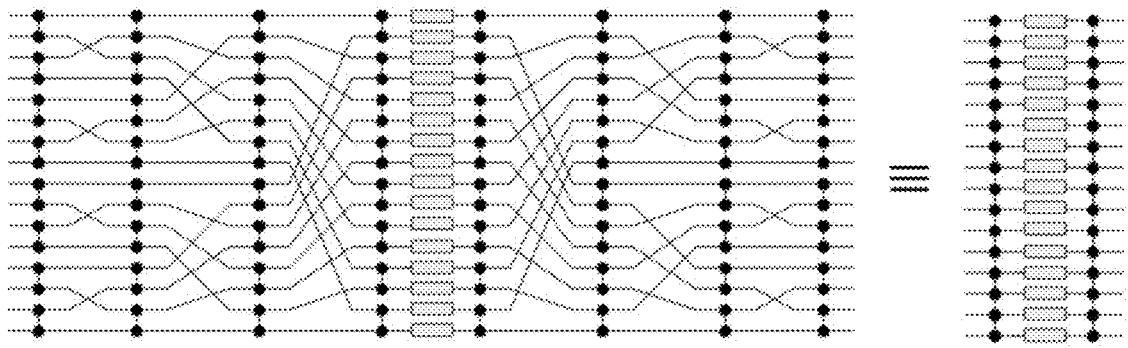
FIGS. 28A and 28B show Hadamard-type GMZI constructions that can be used in some embodiments.

GMZI networks having a lot of special structure allow for specific decompositions of the type given by equation 2700 shown in FIG. 27, where the matrices $S_{\ldots}$ correspond to crossing networks which reorder modes within the interferometer. Since the subexpressions of the form $I^{(N/n_l)} \otimes V^{(n_l)}$ correspond to repeated blocks of modes interfering according to unitary $V^{(n_l)}$, the equation for W in FIG. 27 can be seen to describe stages of local interference separated by crossing networks. Note also that since the bracketed expressions in the decomposition commute there is some freedom in the configuration of the crossing networks, and some of them can be treated as relabelings of modes rather than physical circuit elements. FIG. 28A illustrates the construction of a Hadamard-type GMZI using the decomposition, as well as simplification which is possible when the GMZI is used as a N-to-1 mux.

Figure 28B:
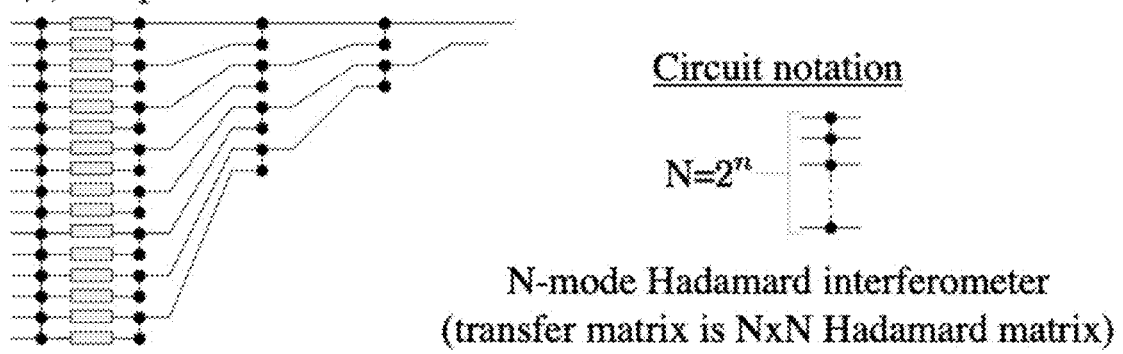

FIGS. 28A and 28B show Hadamard-type GMZI constructions: (i) in FIG. 28A, illustration of a linear-optical circuit for a GMZI on N=16 modes, for which the fast phase shifters are set to configurations of 0 and π to select one of 16 operations from $\mathcal{G}$ ([2,2,2,2]); (ii) in FIG. 28B, possible simplification of the circuit when only one output port is required as is the case when the GMZI is used as a N-to-1 mux. The passive interferometers are constructed following the decomposition of W with stages of interference using 50:50 beam-splitters or directional couplers on pairs of adjacent modes, separated by crossings networks. Note that the phases in the physical interferometer generally differ from the constructions given in the main text, and this implies minor modifications for the transfer matrices and phase-shifter settings.

For more general GMZI types, we note that the unitary matrices $V^{(n_l)}$ can be decomposed into elementary beam-splitter and phase-shifter operations using the generic decomposition methods mentioned above. Alternatively, since the $V^{(n_l)}$ are assumed to be discrete Fourier transforms, they can be recursively decomposed into smaller discrete Fourier transforms acting on sets of local modes $$I^{n_l/(n_l')} \otimes V^{(n_l')}, I^{n_l/(n_l'')} \otimes V^{(n_l'')}$$

(for any sizes satisfying $n_l = n_l' \times n_l''$) together with crossings networks and additional phase shifts.

One more subtle feature of the GMZI constructions that was remarked on above is that the matrices $D_k$ for the GMZIs are determined up to a setting-dependent global phase factor $e^{i\Phi_k}$. In principle these global phases can be freely set over a range $[0,2\pi)$ (provided the active phase shifters themselves are configured with sufficient phase range). For an application such as single-photon multiplexing, the global phase factors have no role in the operation of the switch network. However, they can be useful if the switch network is applied to only some part of the input states (e.g. single rails from dual-rail qubits) or if it is incorporated in larger interferometers. In these cases, additional functionality can be absorbed into the operation of the switch network without adding extra layers of switching.

This idea is very useful for LOQC, where it is often desirable to multiplex some circuit which generates entangled states, whilst also applying internal adaptive corrections to its output. An example of this occurs when multiplexing Bell states from a standard BSG circuit. This circuit produces a Bell state across four modes with probability 3/16, but the Bell states do not conform to dual-rail qubit encoding (i.e. with qubits allocated to fixed pairs of modes) in a third of cases. Although this problem can be addressed using an additional MZI at the mux output to perform an optional mode-swap operation, a more elegant solution is presented in FIGS. 29A-29B.

Figure 29A:
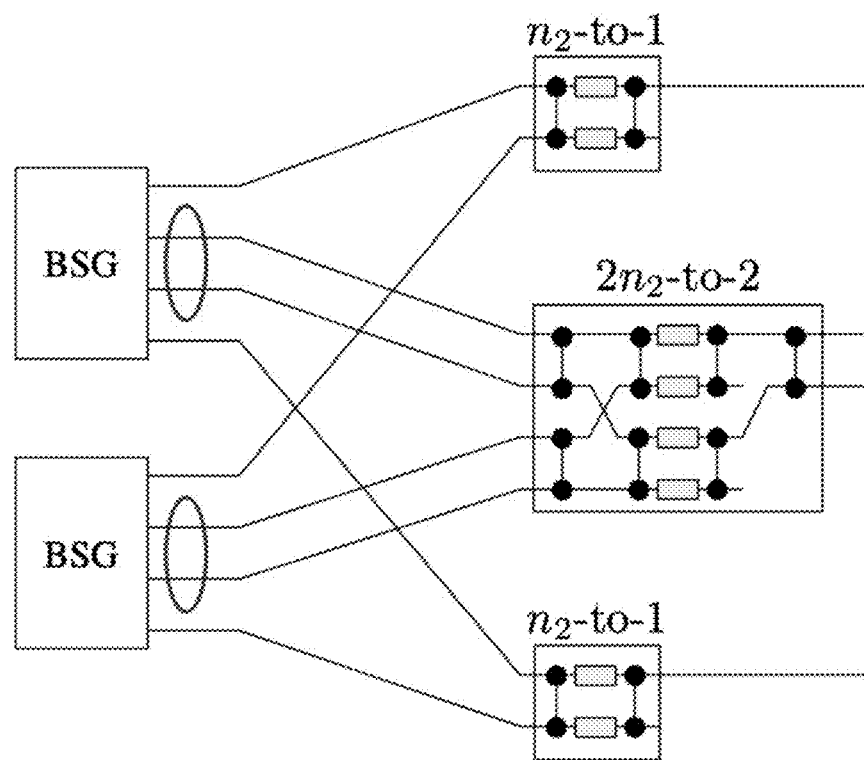
FIGS. 29A and 29B show examples of larger GMZI that can be used in some embodiments.
Figure 29B:
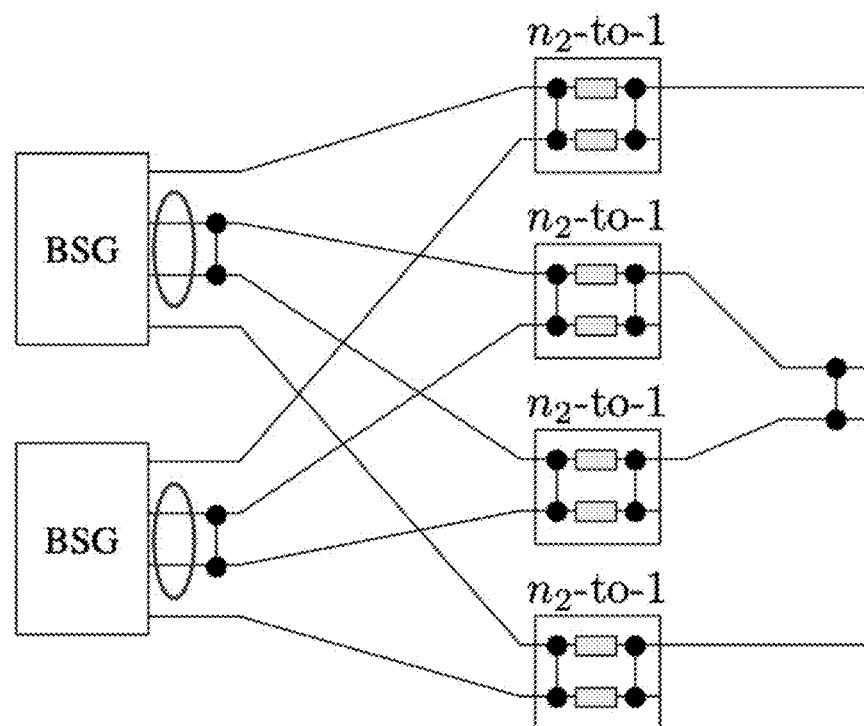

FIGS. 29A and 29B show examples of larger GMZI to implement adaptive swaps of rails while multiplexing Bell states generated with $n_2$ standard BSGs. FIG. 29A shows sending the two rails that might need to be swapped (circled in red) through a single GMZI of size $N = n_1 n_2$ ($n_1 = n_2 = 2$ in this diagram) allows multiplexing and permutation operations to be combined while avoiding the need for an additional switching stage. FIG. 29B shows that the modular structure of the GMZI can be exploited to apply portions of the circuit at different locations and to optimize the physical implementation. In this example, the network which incorporates the swap operation can be decomposed into two 2-to-1 GMZIs with extra directional couplers applied at the output of the BSGs and between the two output rails.

In this approach, a mux on $n_2$ copies of the BSG implements multiplexing and swap operations, using a size $N=n_1n_2$ GMZI on $n_1=2$ inner rails from each BSG, and regular $n_2$-to-1 multiplexing for the outer rails. The ability to permute the rails increases the success probability for generating a dual-rail encoded Bell state from 1/8 to 3/16, and thereby decreases the amount of multiplexing needed to reach any particular target output probability by a factor of ~1.55.

More generally, the transfer matrices associated with a GMZI that implements the routing operations $\mathcal{G}([n_1, n_2])$ are $$P_{(k_1,k_2)} = (C^{(n_1)})^{k_1} \otimes (C^{(n_2)})^{k_2}$$
$$= (C^{(n_1)} \otimes I^{(n_2)})^{k_1} (I^{(n_1)} \otimes C^{(n_2)})^{k_2}.$$

This can be interpreted as $n_1$ separate copies of $n_2$-to-1 GMZIs (second term) with an additional set of permutations of the $n_1$ outputs also available (first term). So, permutations of $n_1$ rails can be implemented while multiplexing each one $n_2$ times by sending all $N=n_1n_2$ inputs through a single larger GMZI rather than smaller separate ones. The key advantage of this method is that the depth and total number of active phase shifters do not change (1 and N respectively).

Using a larger GMZI comes at the cost of increasing the optical depth of the circuit, particularly in terms of waveguide crossings. As seen from the expression of W above, the passive interferometers in a GMZI can be decomposed into smaller networks connected by layers of crossings. This modular structure can be exploited to distribute parts of the circuit across different locations and avoid large on-chip crossing networks. In the BSG example, the implementation shown in FIG. 29B highlights how the first layer of crossings can be realized in a different way, e.g. using long distance phase-stable optical routing, to mitigate the impact of the largest crossing network in the interferometer.

The discussion so far presented a large family of GMZIs and explained their key properties, taking an approach focused on achievable sets of permutations which is different to earlier works. As well as N-to-1 muxing (potentially with extra functionality as explained above, these GMZIs have assorted applications as building blocks for spatial and temporal muxes. Alternative constructions of GMZIs are also possible, and it is valuable to explore them with a view to minimizing practical requirements on fast phase shifters. However, it is not feasible to exhaust all possible GMZI designs, as some properties for Hadamard matrices are not known. Instead we will highlight some specific new constructions with useful properties.

One observation is that phase swing requirements (where the swing is defined per phase shifter as the difference between the maximum and minimum phase shifts across all GMZI settings) can sometimes be reduced by introducing fixed phase-shift offsets. For some of the constructions above, the phase shifter settings correspond to complete sets of roots of unity, and the phase swing is w for Hadamard interferometers and $>\pi$ for the other GMZI types. Table 1 shows examples of reduced swing for GMZI sizes $N=2,3,4$ including examples of GMZIs with reduced phase swing using fixed phase-shift offsets. It is assumed that all the fast phase shifter components are identical and access the same range of phase shifts (which is minimized). Note that the use of offsets necessitates modification of the GMZI transfer matrices by additional phase factors corresponding to setting-dependent "global" phases at the output.

TABLE 1

| GMZI type | Phase offsets | Comment |
| --- | --- | --- |
| Hadamard $N = 2$ | $(-3\pi/2, 0)$ | Swing reduced from $\pi$ to $\pi/2$, coinciding with MZI variant in FIG. 22A. |
| DFT $N = 3$ | $(-4\pi/3, 0, 0)$ | Swing reduced from $4\pi/3$ to $2\pi/3$. |
| Hadamard $N = 4$ | $(-\pi, 0, 0, 0)$ | Swing unchanged at $\pi$, but for each setting only one phase shifter is set to $\pi$ and the others to 0. |

To find some more subtle constructions, we can consider general constraints on GMZIs implementing transfer matrices $U_k=WD_kV^\dagger$ on N modes, which are required to act minimally as N-to-1 muxes. It is straightforward to prove a lemma stating that (a), V in this case must be proportional to a complex Hadamard matrix (i.e. V must satisfy $|V_{s,t}|=1/\sqrt{N}$ as well as being unitary), and (b) the phase vectors $d_k$ must be orthogonal. A simple consequence of this result is that it is never possible to construct any GMZI for which the phase-shifter swing is less than $\pi/2$ (since it is never possible to achieve 0 for the real part of $\langle d_k, d_{k'} \rangle$). Similarly, when the phase-shifter values are restricted to $\{0, \pi/2\}$ it is not possible to find more than 2 orthogonal vectors $d_k$ for any even value of N (and never more than 1 for odd values of N), which is to say that it is not possible to do better than a 2-to-1 mux.

As another application of this lemma, one can look for sets of orthonormal phase vectors $\{d_k\}$ and construct a GMZI which uses these as phase settings for a N-to-1 mux, by choosing V to have row vectors $v_k=d_k$, and any unitary W with first row vector $w_1=(1,1,\ldots,1)/\sqrt{N}$. An interesting and non-trivial example of such a set of phase vectors is given in Table 2. More specifically the able below shows examples of six orthogonal phase vectors with a subset $d_1,\ldots,d_4$ having a reduced phase swing of $2\pi/3$ (compared to $4\pi/3$ for the entire set). A $N=6$ GMZI constructed using these settings can implement a 4-to-1 mux which has phase swing of only $2\pi/3$ (by restricting to the first four phase-shifter settings). Furthermore, it is easily seen that this example is not related to the constructions above since the only possibility would be the GMZI implementing $\mathcal{G}([6])\cong\mathcal{G}([3,2])$, for which individual phase settings range on six values (compared to three in Table 2).

TABLE 2

Settings for a N = 6 GMZI acting as a 6-to-1 mux $d_1 = (1, 1, 1, e^{-2i\pi/3}, e^{-2i\pi/3}, e^{-2i\pi/3})/\sqrt{6}$
$d_2 = (1, e^{-2i\pi/3}, e^{-2i\pi/3}, 1, e^{-2i\pi/3}, 1)/\sqrt{6}$
$d_3 = (e^{-2i\pi/3}, 1, e^{-2i\pi/3}, e^{-2i\pi/3}, 1, 1)/\sqrt{6}$
$d_4 = (e^{-2i\pi/3}, e^{-2i\pi/3}, 1, 1, 1, e^{-2i\pi/3})/\sqrt{6}$
$d_5 = (1, e^{-2i\pi/3}, e^{-4i\pi/3}, e^{-2i\pi/3}, 1, e^{-4i\pi/3})/\sqrt{6}$
$d_6 = (e^{-2i\pi/3}, 1, e^{-4i\pi/3}, 1, e^{-2i\pi/3}, e^{-4i\pi/3})/\sqrt{6}$ Finally, we turn to a new way of using GMZIs when phase settings are modified from those connecting single input and output ports. Taking Hadamard-type GMZIs with transfer matrices $U_k=WD_kW^\dagger$ on N modes, consider first when the phase vector $d_{k'}$ for $D_{k'}$ is modified so that $-\pi$ phases are set to a (common) value $-\phi$, while the 0 phases are unchanged. In this case $U_{k'}$ is modified to $$\tilde{U}_{k'}(\phi) = e^{-i\phi/2}\left[\cos\left(\frac{\phi}{2}\right)I^{(N)} + i\sin\left(\frac{\phi}{2}\right)U_{k'}\right].$$

This unitary maps a single photon incident at one input port to a superposition across the mode at the input and the output under the permutation $U_k$, with weighting controlled by the value of $\phi$. Further modification of the phase settings can achieve mappings from one input to arbitrary pairs of output ports suppose it is desired to map from input port $p_1$ to output ports $q_1$ and $q_2$, then this can be implemented by finding the (unique) settings $k_1$, $k_2$ with $U=WD_{k_{1(2)}}W^{\dagger}$: $p \mapsto q_{1(2)}$, and choosing phase vector $$\vec{\partial} = e^{-i\phi/2}\left[\cos\left(\frac{\phi}{2}\right)d_k + i\sin\left(\frac{\phi}{2}\right)d_{k'}\right].$$

The transfer matrix for the GMZI is then $$\tilde{U}(\phi) = e^{-\frac{i\phi}{2}}\left[\cos\left(\frac{\phi}{2}\right)U_k + i\sin\left(\frac{\phi}{2}\right)U_{k'}\right],$$

where the individual phase settings are taken from the set $\{0, -\phi, -\pi, -\pi-\phi\}$. Note that a second input port $p_2$ is also mapped to the pair $q_1$ and $q_2$, where $U_k U_{k'}: p_1 \mapsto p_2$. We call a GMZI used according to the equation above for $\tilde{U}(\phi)$ a switchable pairwise coupler and it can be useful in spatial and temporal muxes (with the proviso that paired ports receive the vacuum state to avoid contamination of the intended input).

7. ADDITIONAL EMBODIMENTS

As foregoing examples illustrate, a set of 2×2 muxes can be used to rearrange a group of photons propagating in a set of waveguides, which can increase the probability of providing a pattern of photons that corresponds to a usable input state of a downstream circuit. It will be appreciated that embodiments described herein are illustrative and can be modified. Although some examples may make reference to use-cases related to quantum computing, where photons may be used to implement systems of qubits, it should be apparent from this disclosure that the switching techniques described herein are applicable in other photonic circuits where a particular spatial arrangement of photons is desired. It should also be understood that providing a usable input state to a particular downstream circuit may not guarantee that the downstream circuit generates a desired output state. For example, the Bell state generators described herein operate non-deterministically, and a usable input state does not necessarily result in a Bell state at the outputs.

Further, embodiments described above include references to specific materials and structures (e.g., optical fibers), but other materials and structures capable of producing, propagating, and operating on photons can be substituted. Switching techniques are described above in the context of optical/photonic circuits; however similar techniques may be applied to synchronize and/or spatially align other types of propagating signals.

Control logic to control the switches and other optical components described herein can be implemented as a digital electronic logic circuit with an arrangement of logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). Control logic can be implemented on-chip with the waveguides, beam splitters, detectors and/or and other photonic circuit components or off-chip as desired. In some embodiments, photon sources, detectors, optical switches, and/or other optical circuit components can be coupled to an off-chip computer system having a processor and a memory, and the off-chip computer system can be programmed to execute some or all of the control logic.

It should be understood that all numerical values used herein are for purposes of illustration and may be varied. In some instances ranges are specified to provide a sense of scale, but numerical values outside a disclosed range are not precluded. Terms such as "synchronized" or "simultaneous" (or "same" or "identical") should be understood in the engineering rather than the mathematical sense: finite design tolerances can be defined, and events separated by less than the design tolerance may be treated as synchronized or simultaneous. A "time bin" refers to a temporal mode that distinguishes different photonic states in the same waveguide (or spatial mode), and photons in the same time bin may be referred to as arriving "concurrently" or "simultaneously" at a particular point. The duration of a time bin can be defined based on characteristics of the optical circuits (e.g., there may be some variation in the delay between pumping a photon source and obtaining an output photon from the source), and successive time bins can be separated by arbitrary time periods.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added. The terms "upstream" and "downstream" are used to refer to the direction of photon propagation through an optical circuit, with photons propagating from upstream components toward downstream components, and do not signify any particular physical direction. In some embodiments, the physical direction of photon propagation can be the same or different for different waveguides or different portions of an optical circuit.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. An optical circuit comprising:
   an entanglement circuit configured to generate an entangled state on a set of output waveguides from an input state received on a set of input waveguides, wherein an input state corresponds to a pattern of photons in the input waveguides, wherein a set of usable input states for the entanglement circuit is defined such that each usable state corresponds to an input state that is usable to generate the entangled state, and wherein the set of usable input states for the entanglement circuit includes fewer than all possible input states;
   a first set of 2×2 muxes, each 2×2 mux in the first set having two inputs and two outputs, each input of each 2×2 mux in the first set being coupled to a different one of a plurality of upstream circuits, and each output of each 2×2 mux in the first set being coupled to a different one of the input waveguides of the entanglement circuit; and control logic configured to control the 2×2 muxes in the first set to provide a usable input state based on a pattern of photons provided to the inputs of the 2×2 muxes in the first set and on the set of usable input states for the entanglement circuit.

2. The optical circuit of claim 1 wherein the plurality of upstream circuits includes a plurality of optical multiplexers, each optical multiplexer having a plurality of input waveguides coupled to a plurality of independent source circuits and an output waveguide.

3. The optical circuit of claim 2 wherein each of the 2×2 muxes in the first set has inputs coupled to the output waveguides of two different ones of the optical multiplexers.

4. The optical circuit of claim 2 wherein the entanglement circuit includes a pair of Bell state generators and wherein the plurality of upstream circuits further includes:

a second set of 2×2 muxes, each 2×2 mux in the second set having two inputs and two outputs, each input of each 2×2 mux in the second set being coupled to the output waveguide of a different one of the optical multiplexers and each output of each 2×2 muxes in the second set being coupled to the input of a different one of the 2×2 muxes in the first set.

5. The optical circuit of claim 2 wherein the independent source circuits are heralded single photon sources.

6. The optical circuit of claim 1 wherein the entanglement circuit includes a Bell state generator circuit.

7. The optical circuit of claim 1 wherein the entanglement circuit includes a 3-GHZ state generator circuit.

8. The optical circuit of claim 1 wherein the input waveguides of the entanglement circuit are configured as two or more pairs of input waveguides and wherein the usable input states are input states where exactly one photon is provided to one input waveguide of each pair of input waveguides of the entanglement circuit.

9. The optical circuit of claim 8 wherein each output of each 2×2 mux in the first set being coupled to one input waveguide of each of two different pairs of input waveguides of the entanglement circuit.

10. An optical circuit comprising:

a Bell state generator configured to generate a Bell state on a set of four output waveguides from an input state received on a set of eight input waveguides that includes four pairs of input waveguides, each pair of input waveguides coupled to a different one of a set of four directional couplers, wherein a usable input state for the Bell state generator is defined as a state that includes exactly one photon in one of the input waveguides of each of the four pairs of input waveguides;

four 2×2 muxes, each 2×2 mux having two inputs and two outputs, each input of each 2×2 mux being coupled to a different one of a plurality of upstream circuits, and each output of each 2×2 mux being coupled to one input waveguide of each of two different pairs of input waveguides of the Bell state generator; and control logic configured to control the 2×2 muxes to provide a usable input state based on an input pattern of photons provided to the 2×2 muxes and on a set of usable input states for the Bell state generator.

11. The optical circuit of claim 10 further comprising:
a set of N heralded single photon sources, wherein N is greater than 8; and a set of eight (N/8)×1 multiplexer circuits, each (N/8)×1 multiplexer circuit coupled to receive photons from a different subset of the set of N heralded single photon sources and to provide photons to one input of one of the 2×2 muxes.

12. The optical circuit of claim 11 wherein the control logic is coupled to the set of N heralded single photon sources and to the set of eight (N/8)×1 multiplexer circuits and wherein the control logic is further configured to control the eight (N/8)×1 multiplexer circuits to deliver a group of four photons having a particular input pattern to the 2×2 muxes.

13. The optical circuit of claim 10 wherein:

the two outputs of a first one of the 2×2 muxes are a first output coupled to a first input waveguide of a first pair of the four pairs of input waveguides of the Bell state generator and a second output coupled to a first input waveguide of a second pair of the four pairs of input waveguides of the Bell state generator;

the two outputs of a second one of the 2×2 muxes are a first output coupled to a first input waveguide of a third pair of the four pairs of input waveguides of the Bell state generator and a second output coupled to a first input waveguide of a fourth pair of the four pairs of input waveguides of the Bell state generator;

the two outputs of a third one of the 2×2 muxes are a first output coupled to a second input waveguide of the second pair of the four pairs of input waveguides of the Bell state generator and a second output coupled to a second input waveguide of the third pair of the four pairs of input waveguides of the Bell state generator; and the two outputs of a fourth one of the 2×2 muxes are a first output coupled to a second input waveguide of the first pair of the four pairs of input waveguides of the Bell state generator and a second output coupled to a second input waveguide of the fourth pair of the four pairs of input waveguides of the Bell state generator.

14. An optical circuit comprising:

an entanglement circuit configured to generate an entangled state on a set of output waveguides from an input state received on a set of input waveguides that includes six pairs of input waveguides, wherein a usable input state for the entanglement circuit is defined as including exactly one photon in one input waveguide of each pair of input waveguides;

six 2×2 muxes, each 2×2 mux having two inputs and two outputs, each input of each 2×2 mux being coupled to a different one of a plurality of upstream circuits, and each output of each 2×2 mux being coupled to one input waveguide of each of two different pairs of input waveguides of the entanglement circuit; and control logic configured to control the 2×2 muxes to provide a usable input state based on a pattern of photons provided to the inputs of the 2×2 muxes and on a set of usable input states for the entanglement circuit.

15. The optical circuit of claim 14 further comprising:
a set of N heralded single photon sources, wherein N is greater than 12; and a set of twelve (N/12)×1 multiplexer circuits, each (N/12)×1 multiplexer circuit coupled to receive photons from a different subset of the set of N heralded single photon sources and to provide photons to one input of one of the 2×2 muxes.

16. The optical circuit of claim 15 wherein the control logic is coupled to the set of N heralded single photon sources and to the set of twelve (N/12)×1 multiplexer circuits and wherein the control logic is further configured to control the twelve (N/12)×1 multiplexer circuits to deliver a group of four photons having a particular input pattern to the 2×2 muxes.

17. The optical circuit of claim 14 wherein:
the two outputs of a first one of the 2×2 muxes are a first output coupled to a first input waveguide of a first pair of the six pairs of input waveguides of the entanglement circuit and a second output coupled to a first input waveguide of a second pair of the six pairs of input waveguides of the entanglement circuit;
the two outputs of a second one of the 2×2 muxes are a first output coupled to a first input waveguide of a third pair of the six pairs of input waveguides of the entanglement circuit and a second output coupled to a first input waveguide of a fourth pair of the six pairs of input waveguides of the entanglement circuit;
the two outputs of a third one of the 2×2 muxes are a first output coupled to a first input waveguide of a fifth pair of the six pairs of input waveguides of the entanglement circuit and a second output coupled to a first input waveguide of a sixth pair of the six pairs of input waveguides of the entanglement circuit;
the two outputs of a fourth one of the 2×2 muxes are a first output coupled to a second input waveguide of the second pair of the six pairs of input waveguides of the entanglement circuit and a second output coupled to a second input waveguide of the third pair of the six pairs of input waveguides of the entanglement circuit;
the two outputs of a fifth one of the 2×2 muxes are a first output coupled to a second input waveguide of the fourth pair of the six pairs of input waveguides of the entanglement circuit and a second output coupled to a second input waveguide of the fifth pair of the six pairs of input waveguides of the entanglement circuit; and
the two outputs of a sixth one of the 2×2 muxes are a first output coupled to a second input waveguide of the first pair of the six pairs of input waveguides of the entanglement circuit and a second output coupled to a second input waveguide of the sixth pair of the six pairs of input waveguides of the entanglement circuit.

\* \* \* \* \*